United States Patent
Kim et al.

(10) Patent No.: US 12,363,215 B2
(45) Date of Patent: Jul. 15, 2025

(54) ELECTRONIC DEVICE INCLUDING ANTENNA

(71) Applicant: SAMSUNG ELECTRONICS CO., LTD., Suwon-si (KR)

(72) Inventors: Jongmin Kim, Suwon-si (KR); Kyonghwan Cho, Suwon-si (KR); Sangho Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 335 days.

(21) Appl. No.: 17/728,142

(22) Filed: Apr. 25, 2022

(65) Prior Publication Data

US 2022/0311851 A1   Sep. 29, 2022

Related U.S. Application Data

(63) Continuation of application No. PCT/KR2022/004229, filed on Mar. 25, 2022.

(30) Foreign Application Priority Data

Mar. 25, 2021 (KR) .................. 10-2021-0038741

(51) Int. Cl.
*H04M 1/02* (2006.01)
*G06F 1/16* (2006.01)
(Continued)

(52) U.S. Cl.
CPC ........ *H04M 1/0277* (2013.01); *G06F 1/1658* (2013.01); *H01Q 1/243* (2013.01);
(Continued)

(58) Field of Classification Search
CPC ............. H04M 1/0277; H04M 1/0266; H04M 2201/06; H04M 2201/38; G06F 1/1658;
(Continued)

(56) References Cited

U.S. PATENT DOCUMENTS 8,384,604 B2   2/2013   Niederkorn et al.
8,583,187 B2   11/2013  Kim et al.
(Continued)

FOREIGN PATENT DOCUMENTS

CN         111987415       11/2020
KR    10-2009-0004235       1/2009
(Continued)

OTHER PUBLICATIONS

Search Report dated Jul. 7, 2022 issued in International Patent Application No. PCT/KR2022/004229.
(Continued)

*Primary Examiner* — Justin Y Lee
(74) *Attorney, Agent, or Firm* — Nixon & Vanderhye, P.C.

(57) ABSTRACT

According to an embodiment of the disclosure, an electronic device may include: a front plate, a rear plate disposed opposite the front place, a side surface part surrounding at least a part of a space between a front plate and the rear plate, a support disposed in the space and laterally surrounded by the side surface part, communication circuitry configured to transmit and/or receive a signal having a selected or designated frequency band through a conductive unit comprising a conductive material having at least a part thereof included in the side surface part, a display disposed between the support and the front plate and visible through the front plate, a first circuit substrate electrically connected to the display, disposed between the display and the support, and that a display driving circuit is disposed thereon, a second circuit substrate electrically connected to the display, disposed between the display and the support, and that a touch controller IC is disposed thereon, a first conductive sheet having at least a part thereof disposed between the support and the first circuit substrate, and a second conductive sheet
(Continued)

disposed in the support between the display and the support and including a first conductive area overlapping the first conductive sheet when viewed over the rear plate and a second conductive area extending from the first conductive area and overlapping the second circuit substrate.

20 Claims, 32 Drawing Sheets

(51) Int. Cl.
  *H01Q 1/24* (2006.01)
  *H01Q 1/38* (2006.01)
  *H01Q 1/52* (2006.01)
(52) U.S. Cl.
  CPC ............... *H01Q 1/38* (2013.01); *H01Q 1/526* (2013.01); *H04M 1/0266* (2013.01); *H04M 2201/06* (2013.01); *H04M 2201/38* (2013.01)
(58) Field of Classification Search
  CPC .......... H01Q 1/243; H01Q 1/38; H01Q 1/526; H01Q 1/40; H01Q 1/52
  See application file for complete search history.

(56) References Cited

U.S. PATENT DOCUMENTS

| | | | |
|---|---|---|---|
| 10,312,571 B2 | 6/2019 | Edwards et al. | |
| 10,447,326 B2 | 10/2019 | Song et al. | |
| 10,971,809 B2 | 4/2021 | Shin et al. | |
| 11,196,847 B2 | 12/2021 | Jang et al. | |
| 11,252,268 B2 | 2/2022 | Lee et al. | |
| 2013/0027892 A1 | 1/2013 | Lim et al. | |
| 2016/0261023 A1 | 9/2016 | DiNallo et al. | |
| 2018/0084636 A1* | 3/2018 | Pakula | H01M 50/247 |
| 2020/0372850 A1* | 11/2020 | He | G06F 1/16 |
| 2021/0044029 A1 | 2/2021 | Yoon et al. | |

FOREIGN PATENT DOCUMENTS

| | | |
|---|---|---|
| KR | 10-2010-0135294 | 12/2010 |
| KR | 10-1496823 | 2/2015 |
| KR | 10-2016-0108137 | 9/2016 |
| KR | 10-2019-0029445 | 3/2019 |
| KR | 10-1958667 | 3/2019 |
| KR | 10-2019-0106555 | 9/2019 |
| KR | 10-2020-0046246 | 5/2020 |
| KR | 10-2021-0017215 | 2/2021 |
| KR | 10-2021-0058732 | 5/2021 |
| KR | 10-2021-0135817 | 11/2021 |
| KR | 10-2022-0015824 | 2/2022 |
| KR | 10-2022-0034413 | 3/2022 |
| KR | 10-2022-0126523 | 9/2022 |
| KR | 10-2022-0128212 | 9/2022 |

OTHER PUBLICATIONS

Extended Search Report dated Jul. 12, 2024 in European Patent Application No. 22776153.3.

* cited by examiner

ELECTRONIC DEVICE INCLUDING ANTENNA

CROSS-REFERENCE TO RELATED APPLICATIONS

This application is a continuation of International Application No. PCT/KR2022/004229 designating the United States, filed on Mar. 25, 2022, in the Korean Intellectual Property Receiving Office and claiming priority to Korean Patent Application No. 10-2021-0038741, filed on Mar. 25, 2021, in the Korean Intellectual Property Office, the disclosures of which are incorporated by reference herein in their entireties.

BACKGROUND

Field

The disclosure relates to an electronic device including an antenna.

Description of Related Art

As the wireless communication technology develops, electronic devices, such as smartphones, are widely used in daily life, and thus the use of content is increasing. The electronic device may include a plurality of antennas for supporting various communication technologies.

As the width of an available application is increased, the number of antennas included in an electronic device continues to increase. The electronic device becomes slim, whereas parts for various functions are added. Accordingly, it becomes more difficult to design, in a limited space, an antenna for securing radiation performance for a desired frequency band or securing coverage (communication range) while reducing an electrical influence with various elements within the electronic device.

SUMMARY

Embodiments of the disclosure may provide an electronic device including an antenna for improving or securing antenna radiation performance or securing coverage.

According to an example embodiment of the disclosure, an electronic device may include: a front plate, a rear plate disposed opposite the front place, a side surface part surrounding at least a part of a space between a front plate and the rear plate, a support disposed in the space and laterally surrounded by the side surface part, communication circuitry configured to transmit and/or receive a signal having a selected or designated frequency band through a conductive unit comprising a conductive material having at least a part thereof included in the side surface part, a display disposed between the support and the front plate and visible through the front plate, a first circuit substrate electrically connected to the display, disposed between the display and the support, and that a display driving circuit is disposed thereon, a second circuit substrate electrically connected to the display, disposed between the display and the support, and that a touch controller integrated circuit (IC) is disposed thereon, a first conductive sheet at least partially disposed between the support and the first circuit substrate, and a second conductive sheet disposed in the support between the display and the support and including a first conductive area overlapping the first conductive sheet when viewed over the rear plate and a second conductive area extending from the first conductive area and overlapping the second circuit substrate.

The electronic device including an antenna according to various example embodiments of the disclosure can improve or secure antenna radiation performance or secure coverage by reducing an electromagnetic influence on an antenna.

In addition, an effect which may be obtained due to various embodiments of the disclosure may be directly or implicitly disclosed in the detailed description of embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described with reference to the accompanying drawings.

Figure 1:
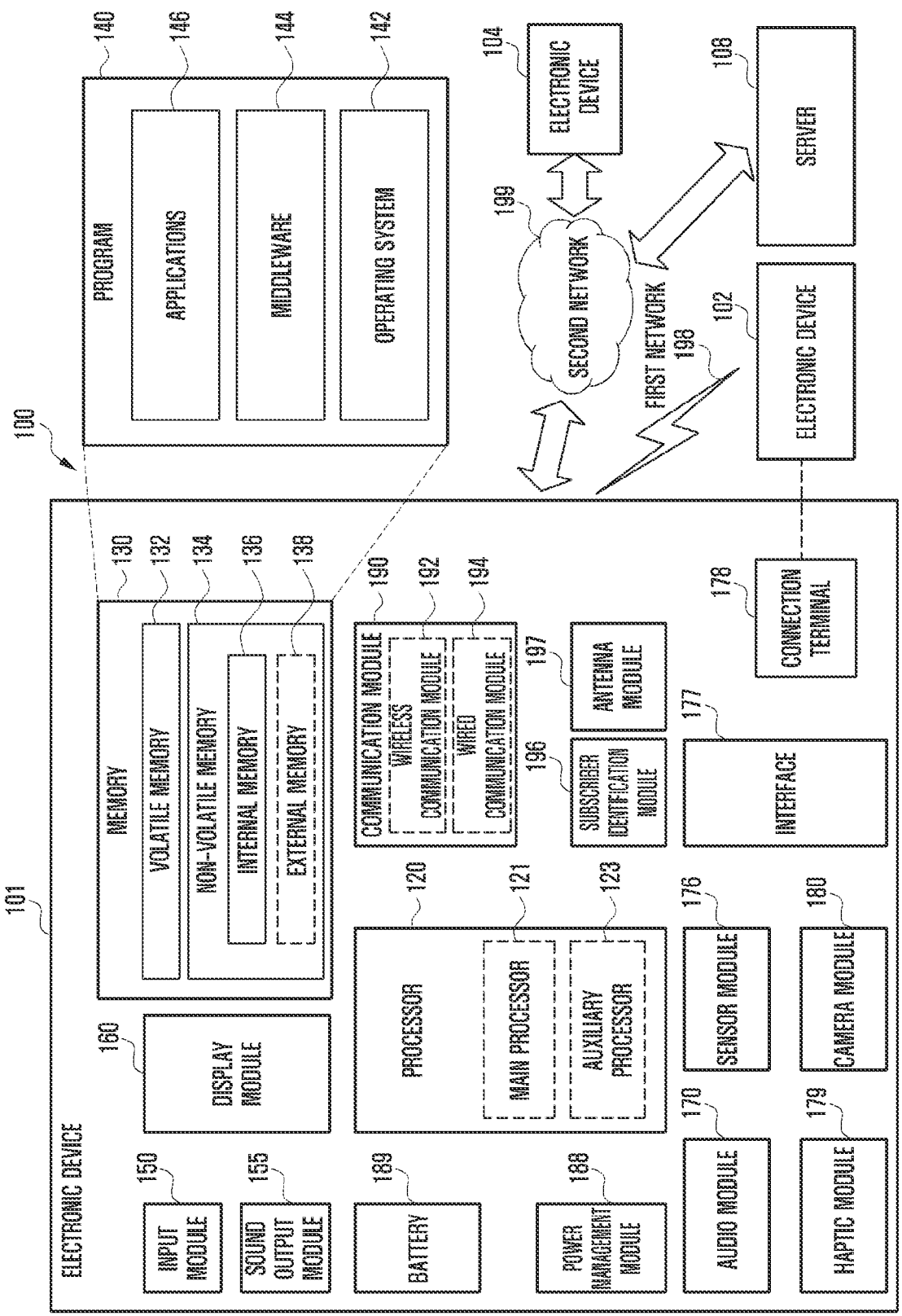
FIG. 1 is a block diagram illustrating an example electronic device in a network environment according to various embodiments.

FIG. 1 is a block diagram illustrating an example electronic device 101 in a network environment 100 according to various embodiments.

With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semisupervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., through wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., through wires), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
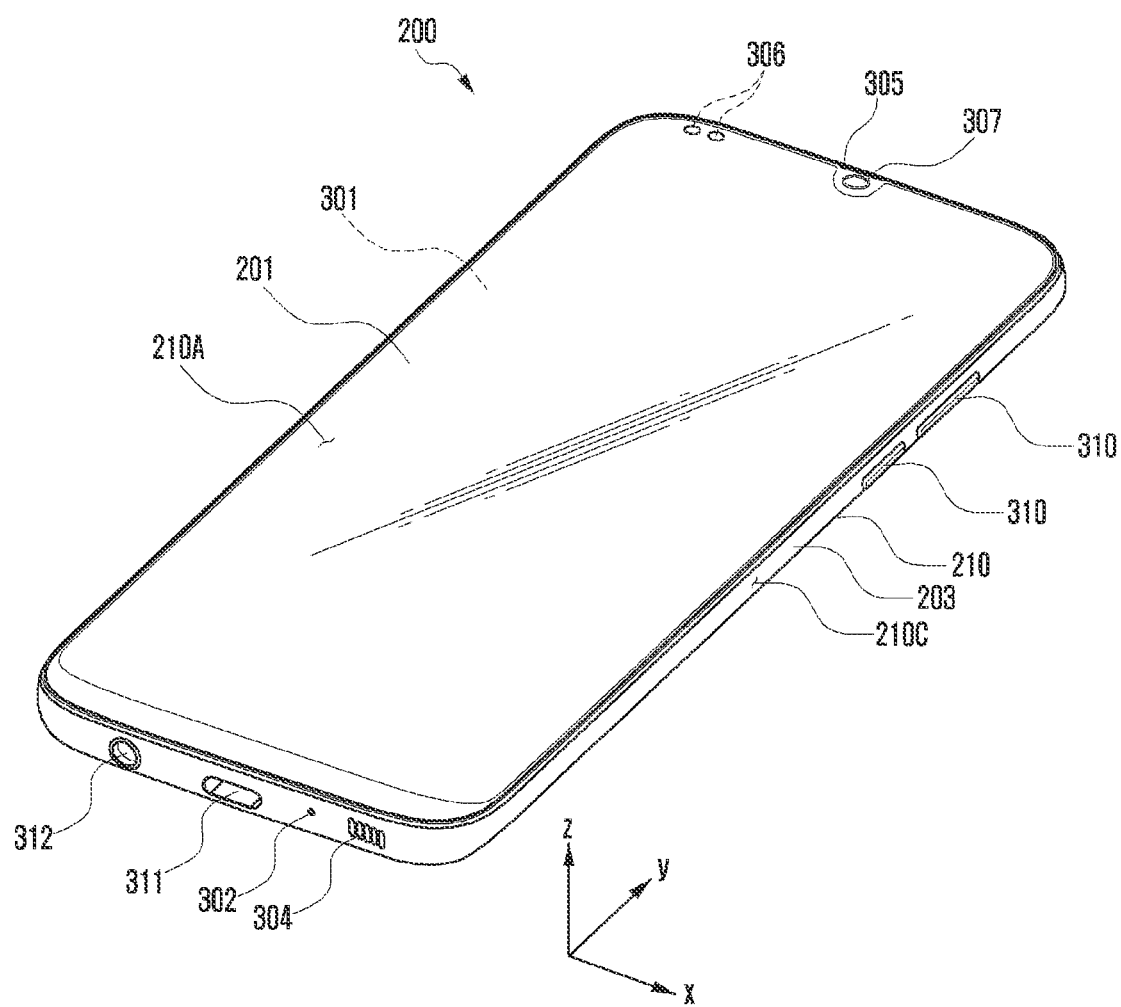
FIG. 2 is a front perspective view of the electronic device according to various embodiments.
Figure 3:
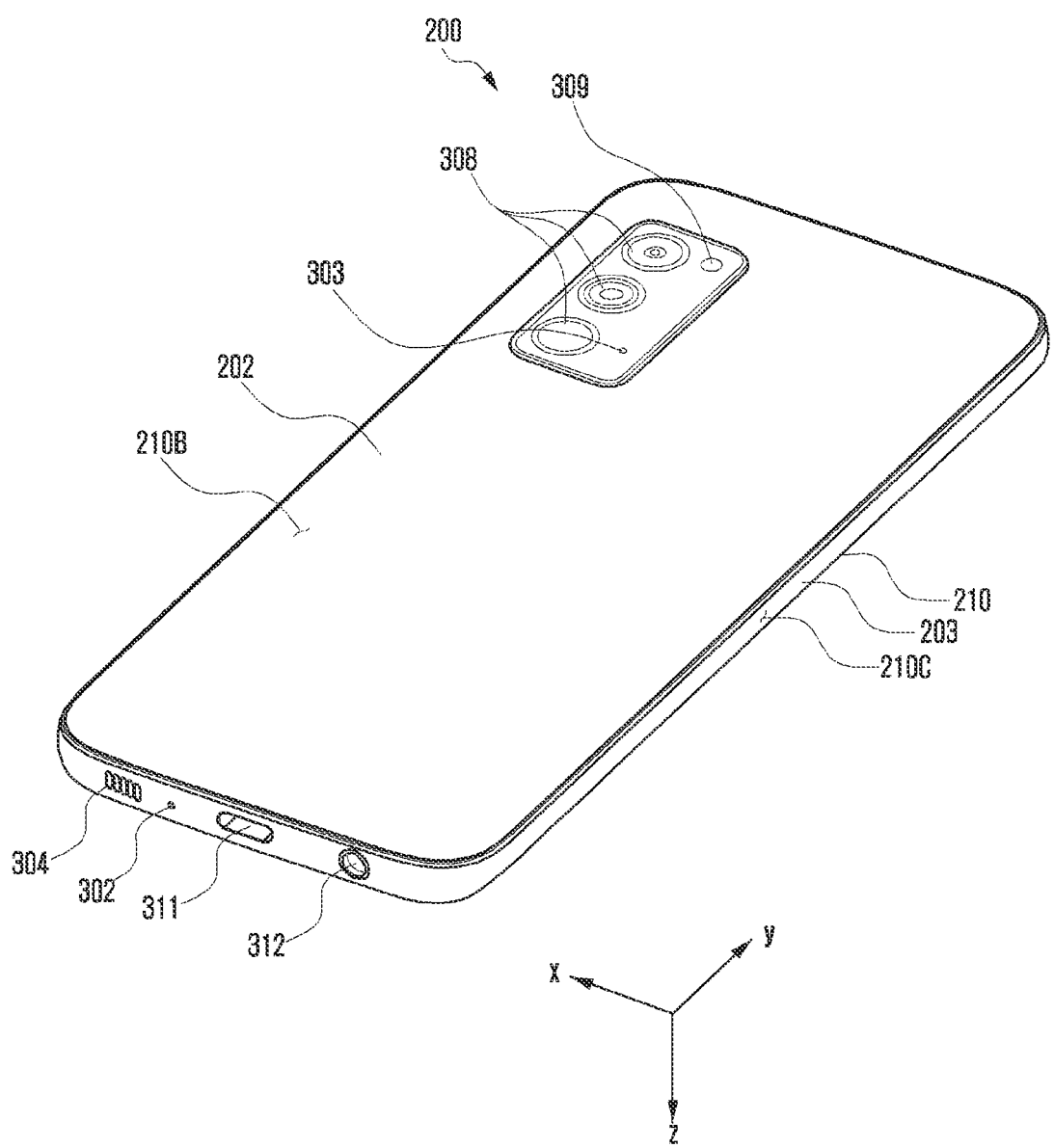
FIG. 3 is a rear perspective view of the electronic device of FIG. 2 according to various embodiments.

FIG. 2 is a front perspective view of the electronic device 200 according to various embodiments. FIG. 3 is a rear perspective view of the electronic device 200 of FIG. 2 according to various embodiments.

With reference to FIGS. 2 and 3, in an embodiment, the electronic device 200 (e.g., the electronic device 101 in FIG. 1 may include a housing 210, including a first surface (or a front) 210A, a second surface (or a rear) 210B, and a side surface 210C surrounding a space between the first surface 210A and the second surface 210B. In an embodiment, the housing 210 may denote a structure that forms at least a part of the first surface 210A, the second surface 210B, and the side surface 210C. The first surface 210A may be formed by a front plate (or a first plate) 201 (e.g., a glass plate or polymer plate including various coating layers) at least a part of which is substantially transparent. The second surface 210B may be formed by a rear plate (or the second plate) 202 that is substantially opaque. The rear plate 202 may be made of coating or colored glass, ceramic, polymer, metal (e.g., aluminum, stainless steel (STS) or magnesium) or a combination of at least two of the materials, for example. The side surface 210C may be formed by a side surface bezel structure (or "the side surface member", "a side surface part", "a side surface portion", or "side surface") 203 with which the front plate 201 and the rear plate 202 are combined. The side surface bezel structure 203 may include metal and/or polymer. In an embodiment, the rear plate 202 and the side surface bezel structure 203 may be integrated and formed, and may include the same material (e.g., a metal material such as aluminum).

According to an embodiment, the electronic device 200 may include at least one of a display 301, a first audio module 302, a second audio module 303, a third audio module 304, a fourth audio module 305, a sensor module 306, a first camera module 307, a plurality of second camera modules 308, a light-emitting module 309, an input module 310, a first connection terminal module 311 or a second connection terminal module 312. In an embodiment, at least one of the elements of the electronic device 200 may be omitted or the electronic device 200 may additionally include another element.

A display region (e.g., a screen display region or an active region) of the display 301 may be visually exposed (e.g., visible) through the front plate 201, for example. In an embodiment, the electronic device 200 may be implemented to maximize and/or increase a display region viewed through the front plate 201 (e.g., a large screen or a full screen). For example, the display 301 may be implemented to have an outside generally having the same shape as an outside shape of the front plate 201. For another example, an interval between the outside of the display 301 and the outside of the front plate 201 may be formed to be generally identical with each other. In an embodiment, the display 301 may include a touch sensing circuit. In an embodiment, the display 301 may include a pressure sensor capable of measuring the intensity (pressure) of a touch. In an embodiment, the display 301 may be combined with a digitizer (e.g., an electromagnetic induction panel) for detecting an electronic pen (e.g., a stylus pen) using a magnetic field method or may be disposed to be adjacent to the digitizer.

The first audio module 302 may include a first microphone disposed within the electronic device 200 and a first microphone hole formed in the side surface 210C in accordance with the first microphone, for example. The second audio module 303 may include a second microphone disposed within the electronic device 200 and a second microphone hole formed in the second surface 210B in accordance with the second microphone, for example. A location of the audio module or the number thereof relating to the microphone is not limited to the illustrated example and may be various. In an embodiment, the electronic device 200 may include a plurality of microphones used to detect the direction of a sound.

The third audio module 304 may include a first speaker disposed within the electronic device 200 and a first speaker hole formed in the side surface 210C in accordance with the first speaker, for example. The fourth audio module 305 may include a second speaker disposed within the electronic device 200 and a second speaker hole formed in the first surface 210A in accordance with the second speaker, for example. In an embodiment, the first speaker may include an external speaker. In an embodiment, the second speaker may include a receiver for communication, and the second speaker hole may be denoted as a receiver hole. A location of the third audio module 304 or the fourth audio module 305 or the number thereof is not limited to the illustrated example and may be various. In an embodiment, the microphone hole and the speaker hole may be implemented as one hole. In an embodiment, the third audio module 304 or the fourth audio module 305 may include a piezo speaker from which a speaker hole has been omitted.

The sensor module 306 may generate an electrical signal or a data value in response to an internal operating state or external environment state of the electronic device 200, for example. In an embodiment, the sensor module 306 may include an optical sensor disposed within the electronic device 200 in accordance with the first surface 210A. The optical sensor may include a proximity sensor or an illuminance sensor, for example. The optical sensor may be aligned with an opening formed in the display 301. External light may be introduced into the optical sensor through the front plate 201 and the opening of the display 301. In an embodiment, the optical sensor may be disposed at the bottom of the display 301. The location of the optical sensor is not visually distinguished (or exposed), and the optical sensor may perform a related function. For example, the optical sensor may be disposed at the back of the display 301 or below or beneath the display 301. In an embodiment, the optical sensor may be disposed by being aligned with a recess formed in the back of the display 301. The optical sensor may be disposed to overlap at least a part of a screen, and may perform a sensing function while not being exposed to the outside. In this case, some region of the display 301 at least a part of which overlaps the optical sensor may include a different pixel structure and/or wiring structure compared to another region. For example, some region of the display 301 at least a part of which overlaps the optical sensor may have a different pixel density compared to another region. In an embodiment, a plurality of pixels may not be disposed in some region of the display 301 at least a part of which overlaps the optical sensor. In an embodiment, the electronic device 200 may include a bio sensor (e.g., a fingerprint sensor) disposed below or beneath the display 301. The bio sensor may be implemented using an optical method, an electrostatic method or an ultrasonic method, and a location of the bio sensor or the number thereof may be various. The electronic device 200 may further include at least one of other various sensor modules, for example, a gesture sensor, a gyro sensor, an atmospheric pressure sensor, a magnetic sensor, an acceleration sensor, a grip sensor, a color sensor, an infrared (IR) sensor, a temperature sensor or a humidity sensor.

The first camera module 307 (e.g., the front camera module) may be disposed within the electronic device 200 in accordance with the first surface 210A, for example. The plurality of second camera modules 308 (e.g., rear camera modules) may be disposed within the electronic device 200 in accordance with the second surface 210B, for example. The first camera module 307 and/or the plurality of second camera modules 308 may include one or a plurality of lens, an image sensor and/or an image signal processor. A location the first camera module or the second camera module or the number thereof is not limited to the illustrated example and may be various.

According to an embodiment, the display 301 may include an opening aligned with the first camera module 307. External light may reach the first camera module 307 through the front plate 201 and the opening of the display 301. In an embodiment, the opening of the display 301 may be formed in a notch form along a location of the first camera module 307. In an embodiment, the first camera module 307 may be disposed at the bottom of the display 301. The location of the first camera module 307 is not visually distinguished (or exposed), and the first camera module 307 may perform a related function (e.g., image photographing). For example, the first camera module 307 may be disposed at the back of the display 301 or below or beneath the display 301, and may include a hidden display rear camera (e.g., an under display camera (UDC)). In an embodiment, the first camera module 307 may be disposed by being aligned with a recess formed in the back of the display 301. The first camera module 307 may be disposed to overlap at least a part of a screen, and may obtain an image of an external subject while being not visually exposed (e.g., visible) to the outside. In this case, some region of the display 301 at least a part of which overlaps the first camera module 307 may include a different pixel structure and/or wiring structure compared to another region. For example, some region of the display 301 at least a part of which overlaps the first camera module 307 may have a different pixel density compared to another region. The pixel structure and/or the wiring structure formed in some region of the display 301 at least a part of which overlaps the first camera module 307 can reduce a loss of light between the outside and the first camera module 307. In an embodiment, a pixel may not be disposed in some region of the display 301 at least a part of which overlaps the first camera module 307. In an embodiment, the electronic device 200 may further include a light-emitting module (e.g., a light source) disposed within the electronic device 200 in accordance with the first surface 210A. The light-emitting module may provide state information of the electronic device 200 in a light form, for example. In an embodiment, the light-emitting module may provide a light source operating in conjunction with an operation of the first camera module 307. The light-emitting module may include an LED, an IR LED or a xenon lamp, for example.

According to an embodiment, the plurality of second camera modules 308 may have different attributes (e.g., view angles) or functions, and may include a dual camera or a triple camera, for example. The plurality of second camera modules 308 may include a plurality of camera modules including lenses having different view angles. The electronic device 200 may control to change a view angle of the camera module performed in the electronic device 200 based on a user's selection. The plurality of second camera modules 308 may include at least one of a wide angle camera, a telescopic camera, a color camera, a monochrome camera or an infrared (IR) camera (e.g., a time of flight (TOF) camera, structured light camera). In an embodiment, the IR camera may operate as at least a part of the sensor module. The light-emitting module 309 (e.g., a flash) may include a light source for the plurality of second camera modules 308. The light-emitting module 309 may include an LED or a xenon lamp, for example.

The input module 310 may include one or more key input devices, for example. The one or more key input devices may be disposed in the opening formed in the side surface 210C, for example. In an embodiment, the electronic device 200 may not include some or all of the key input devices, and a key input device not included in the electronic device 200 may be implemented as a soft key using the display 301. A location of the input module 310 or the number thereof may be various. In an embodiment, the input module 310 may include at least one sensor module.

The first connection terminal module (e.g., a first connector module or a first interface terminal module) 311 may include a first connector (or a first interface terminal) disposed within the electronic device 200 and a first connector hole formed in the side surface 210C in accordance with the first connector, for example. The second connection terminal module (e.g., a second connector module or a second interface terminal module) 312 may include a second connector (or a second interface terminal) disposed within the electronic device 200 and a second connector hole formed in the side surface 210C in accordance with the second connector, for example. The electronic device 200 may transmit and/or receive power and/or data to and/or from an external electronic device electrically connected to the first connector or the second connector. In an embodiment, the first connector may include a universal serial bus (USB) connector or a high definition multimedia interface (HDMI) connector. In an embodiment, the second connector may include an audio connector (e.g., a headphone connector or an earset connector). A location of the connection terminal module or the number thereof is not limited to the illustrated example and may be various.

Figure 4:
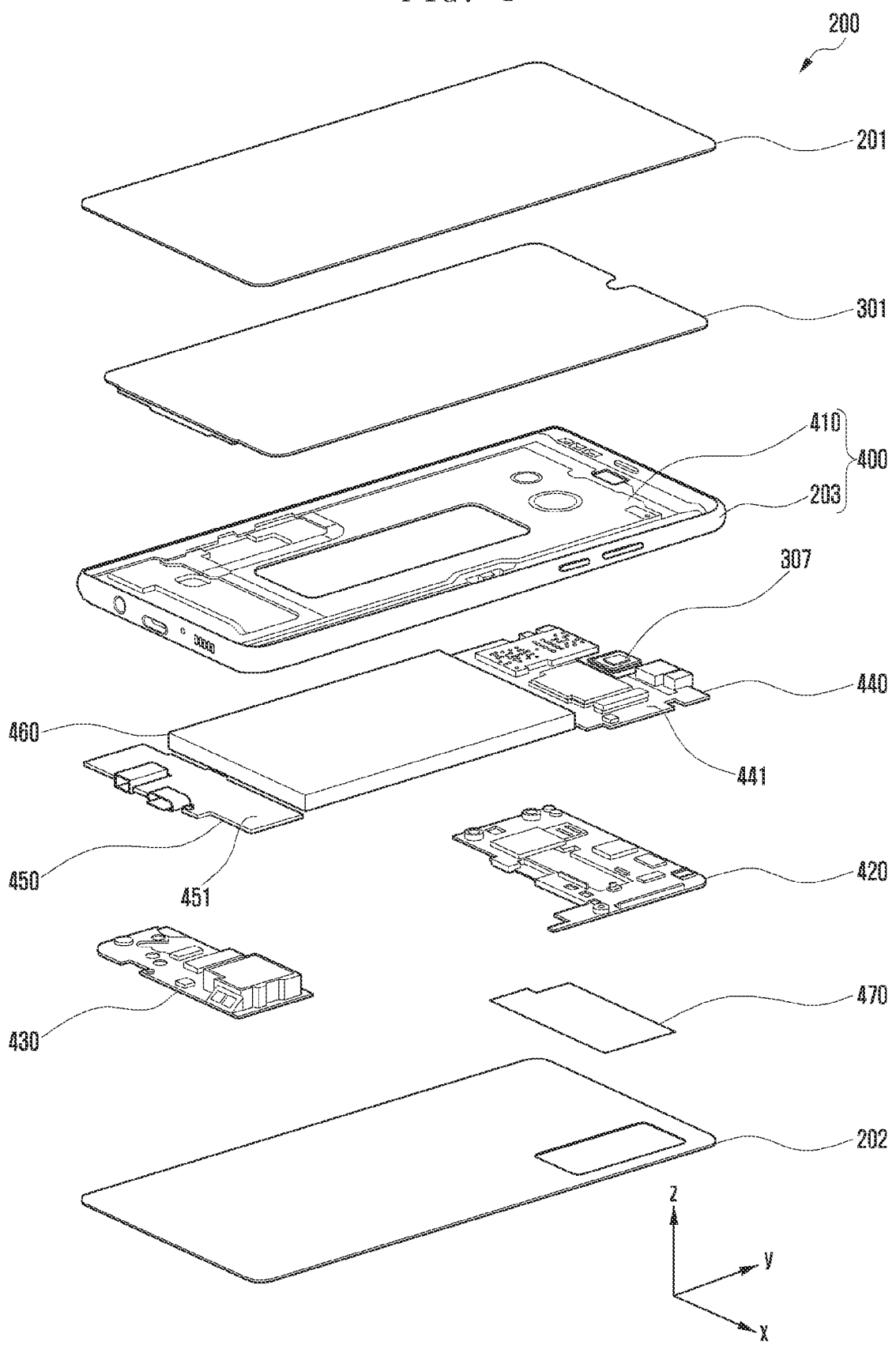
FIG. 4 is an exploded perspective view of the electronic device of FIG. 2 according to various embodiments.

FIG. 4 is an exploded perspective view of the electronic device 200 of FIG. 2 according to various embodiments.

With reference to FIG. 4, in an embodiment, the electronic device 200 may include the front plate 201, the rear plate 202, the side surface bezel structure (e.g., including a side surface part) 203, a first support member (e.g., support) 410, a second support member (e.g., support) 420, a third support member (e.g., support) 430, the display 301, a first board assembly (e.g., including a board) 440, a second board assembly (e.g., including a board) 450, a battery 460 and/or an antenna structure (e.g., including an antenna) 470. In an embodiment, at least one (e.g., the second support member 420 or the third support member 430) of the elements of the electronic device 200 may be omitted, or the electronic device 200 may additionally include another element(s).

The first support member 410 may be disposed within the electronic device 200, for example, and may be connected to the side surface bezel structure 203 or may be integrated and formed with the side surface bezel structure 203. The first support member 410 may be made of a metal material and/or a non-metallic material (e.g., polymer), for example. In an embodiment, a conductive unit included in the first support member 410 may play an electromagnetic shielding role for the display 301, the first board assembly 440 and/or the second board assembly 450. The first support member 410 and the side surface bezel structure 203 may be together denoted as a front case 400. The first support member 410 is a portion where elements, such as the display 301, the first board assembly 440, the second board assembly 450 or the battery 460 in the front case 400, are disposed, and may contribute to the durability or stiffness (e.g., twisting stiffness) of the electronic device 200. In an embodiment, the first support member 410 may be denoted as a bracket, a mounting plate or a support structure.

The display 301 may be disposed between the first support member 410 and the front plate 201, for example, and may be disposed on one surface of the first support member 410. The first board assembly 440 and the second board assembly 450 may be disposed between the first support member 410 and the rear plate 202, for example, and may be disposed on the other surface of the first support member 410. The battery 460 may be disposed between the first support member 410 and the rear plate 202, for example, and may be disposed in the first support member 410.

According to an embodiment, the first board assembly 440 may include a first printed circuit substrate 441 (e.g., a printed circuit board (PCB) or a printed circuit board assembly (PBA)). The first board assembly 440 may include various electronic parts electrically connected to the first printed circuit substrate 441. The electronic parts may be disposed in the first printed circuit substrate 441 or may be electrically connected to the first printed circuit substrate 441 through an electrical path, such as a cable or a flexible PCB (FPCB). With reference to FIGS. 2 and 3, the electronic parts may include the second microphone included in the second audio module 303, the second speaker, included in the fourth audio module 305, the sensor module 306, the first camera module 307, the plurality of second camera modules 308, the light-emitting module 309 or the input module 310, for example.

According to an embodiment, the second board assembly 450 may be disposed by being isolated from the first board assembly 440 with the battery 460 interposed therebetween when viewed over the front plate 201 (e.g., when viewed in a −z axis direction). The second board assembly 450 may include a second printed circuit substrate 451 electrically connected to the first printed circuit substrate 441 of the first board assembly 440. The second board assembly 450 may include various electronic parts electrically connected to the second printed circuit substrate 451. The electronic parts may be disposed in the second printed circuit substrate 451 or may be electrically connected to the second printed circuit substrate 451 through an electrical path, such as a cable or an FPCB. With reference to FIGS. 2 and 3, the electronic parts may include the first microphone included in the first audio module 302, the first speaker included in the third audio module 304, the first connector included in the first connection terminal module 311 or the second connector included in the second connection terminal module 312, for example.

According to an embodiment, the first board assembly 440 or the second board assembly 450 may include a primary PCB (or a main PCB or a master PCB), a second printed circuit substrate (or a slave PCB) disposed to partially overlap the primary PCB and/or an interposer substrate between the primary PCB and the secondary PCB.

The battery 460 is an apparatus for supplying power to at least one element of the electronic device 200, and may include a primary cell which cannot be recharged or a secondary cell which can be recharged or a fuel cell, for example. The battery 460 may be integrated and disposed within the electronic device 200, and may be disposed in a way to be attachable to and detachable from the electronic device 200.

According to an embodiment, the second support member 420 may be disposed between the first support member 410 and the rear plate 202, and may be coupled with the first support member 410 using a fastening element, such as a bolt. At least a part of the first board assembly 440 may be disposed between the first support member 410 and the second support member 420, and the second support member 420 may cover and protect the first board assembly 440. At least a part of the third support member 430 may be isolated from the second support member 420 with the battery 460 interposed therebetween and disposed, when viewed over the rear plate 202 (e.g., when viewed in a +z axis direction). The third support member 430 may be disposed between the first support member 410 and the rear plate 202, and may be coupled with the first support member 410 using a fastening element, such as a bolt. At least a part of the second board assembly 450 may be disposed between the first support member 410 and the third support member 430, and the third support member 430 may cover and protect the second board assembly 450. The second support member 420 and/or the third support member 430 may be made of a metal material and/or a non-metallic material (e.g., polymer). In an embodiment, the second support member 420 may play an electromagnetic shielding role for the first board assembly 440. The third support member 430 may play an electromagnetic shielding role for the second board assembly 450. In an embodiment, the second support member 420 and/or the third support member 430 may be denoted as a rear case.

According to an embodiment, an integrated board assembly including the first board assembly 440 and the second board assembly 450 may be implemented. For example, when viewed over the rear plate 202 (e.g., when viewed in the +z axis direction), the board assembly may include a first part and a second part disposed to be isolated from each other with the battery 460 interposed therebetween, and a third part extending between the battery 460 and the side surface bezel structure 203 and connecting the first part and the second part. The third part may be implemented to be substantially rigid. In an embodiment, the third part may be implemented to be substantially flexible. In an embodiment, an integrated support member including the second support member 420 and the third support member 430 may be implemented.

According to an embodiment, the antenna structure 470 may be disposed between the second support member 420 and the rear plate 202. In an embodiment, the antenna structure 470 may be disposed between the battery 460 and the rear plate 202. The antenna structure 470 may be implemented in the form of a film, such as an FPCB, for example. The antenna structure 470 may include at least one conductive pattern used as a loop type radiator. For example, the at least one conductive pattern may include a spiral conductive pattern (e.g., a plane coil or a pattern coil) having a plane form. In an embodiment, the at least one conductive pattern included in the antenna structure 470 may be electrically connected to wireless communication circuitry (or a wireless communication module) included in the first board assembly 440. For example, the at least one conductive pattern may be used for short-range wireless communication, such as near field communication (NFC). For another example, the at least one conductive pattern may be used for magnetic secure transmission (MST) for the transmission and/or reception of a magnetic signal. In an embodiment, the at least one conductive pattern included in the antenna structure 470 may be electrically connected to a power transmission and reception circuit included in the first board assembly 440. The power transmission and reception circuit may wirelessly receive power from an external electronic device or wirelessly transmit power to an external electronic device using the at least one conductive pattern. The power transmission and reception circuit may include a power management module, and may include a power management integrated circuit (PMIC) or a charger integrated circuit (IC), for example. The power transmission and reception circuit may charge the battery 460 using power wirelessly received using the conductive pattern.

The electronic device 200 may further include various elements depending on its providing form. All such elements may not be enumerated due to various modifications depending on a convergence trend of the electronic device 200, but an element having a level equivalent to that of the aforementioned elements may be additionally included in the electronic device 200. In various embodiments, specific elements may be excluded from the elements depending on their providing forms or may be replaced with other elements.

Figure 5:
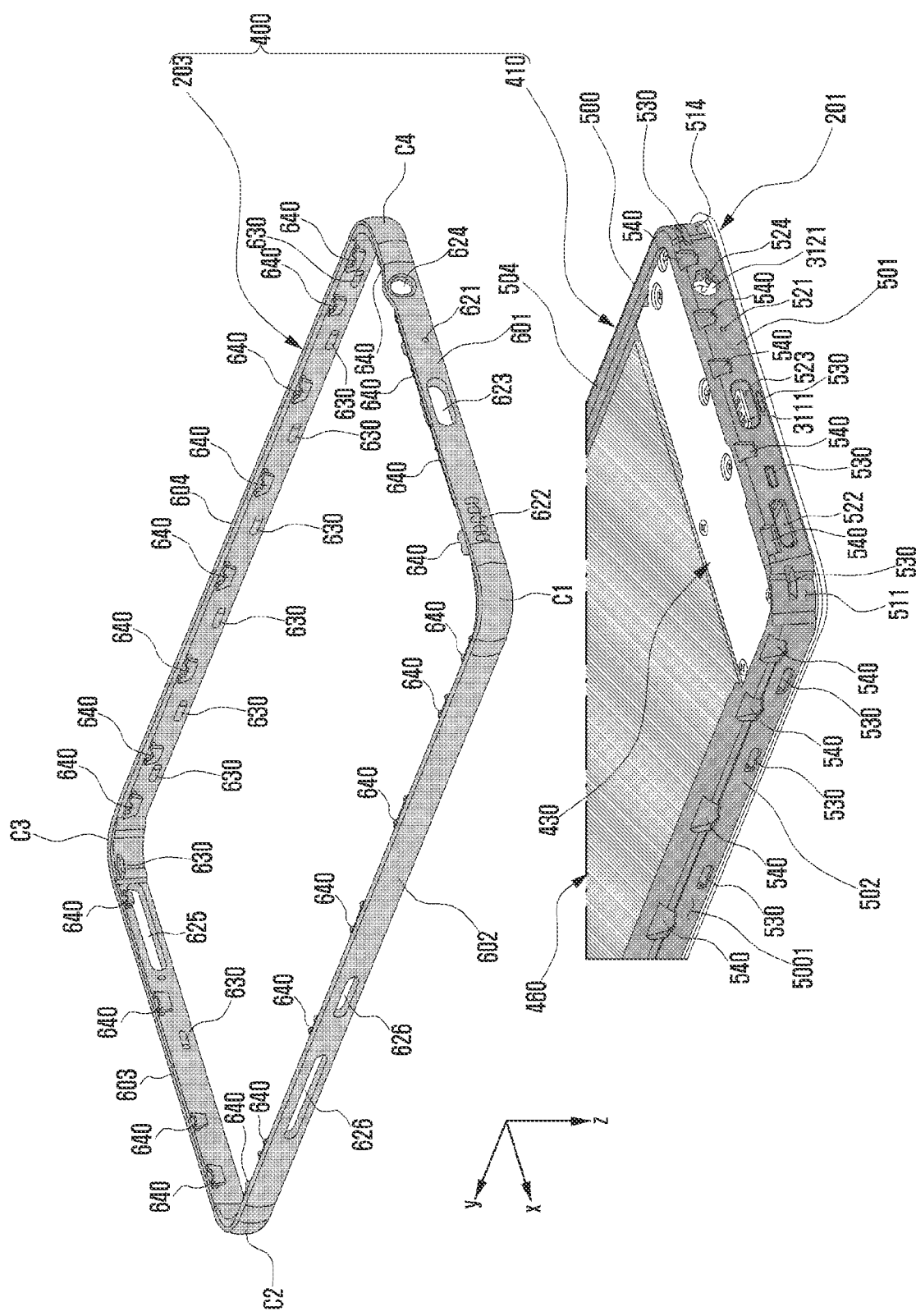
FIG. 5 is a partial exploded perspective view illustrating a front plate, a front case, a third support and a battery according to various embodiments.
Figure 6:
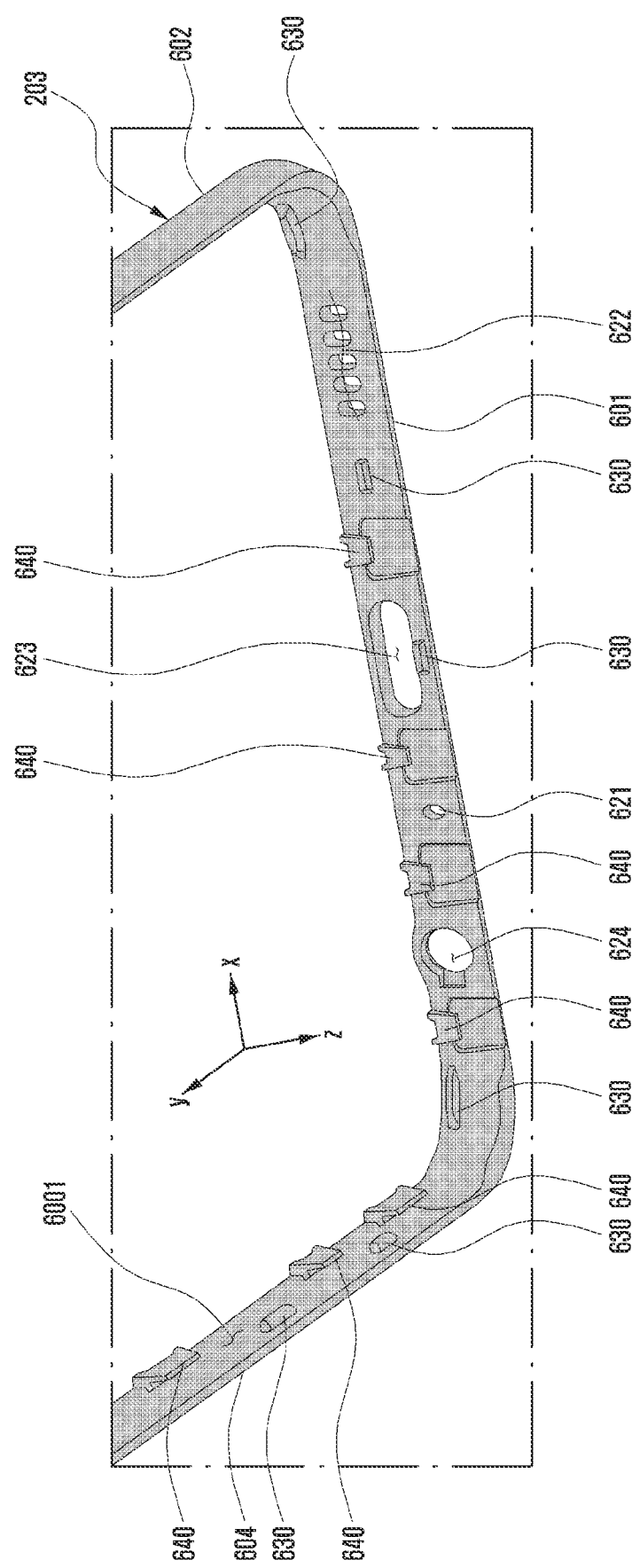
FIG. 6 is a partial perspective view illustrating a part of a side surface bezel structure according to various embodiments.

FIG. 5 is a partial exploded perspective view illustrating the front plate 201, the front case 400, the third support member 430 and/or the battery 460 according to various embodiments. FIG. 6 is a partial perspective view illustrating a part of the side surface bezel structure 203 according to various embodiments.

With reference to FIGS. 5 and 6, in an embodiment, the side surface bezel structure (or the side surface member) 203 of the front case 400 may be implemented in the form of a rectangular ring not having a divided part. An external appearance (e.g., the side surface 210C in FIG. 2) of the electronic device 200 formed as the side surface bezel structure 203 may have aesthetics having a sense of beauty having unity, which does not have a divided line. The side surface bezel structure 203 may include a first bezel unit (or a first bezel portion) 601, a second bezel unit (or a second bezel portion) 602, a third bezel unit (or a third bezel unit) 603 and/or a fourth bezel unit (a fourth bezel unit) 604, for example. The first bezel unit 601 and the third bezel unit 603 may be isolated from each other and extended in parallel thereto. The second bezel unit 602 may connect one end of the first bezel unit 601 and one end of the third bezel unit 603. The fourth bezel unit 604 may connect the other end of the first bezel unit 601 and the other end of the third bezel unit 603, and may be isolated from the second bezel unit 602 and extended in parallel thereto. Each of a first corner unit (or a first curved or bent portion) C1 where the first bezel unit 601 and the second bezel unit 602 are connected, a second corner unit (or a second curved or bent portion) C2 where the second bezel unit 602 and the third bezel unit 603 are connected, a third corner unit (or a third curved or bent portion) C3 where the third bezel unit 603 and the fourth bezel unit 604 are connected and/or a fourth corner unit (or a fourth curved or bent portion) C4 where the first bezel unit 601 and the fourth bezel unit 604 are connected may be formed in a round form. The first bezel unit 601 and the third bezel unit 603 each may have a first length extending in an x axis direction. The second bezel unit 602 and the fourth bezel unit 604 each may have a second length extending in a y axis direction and being greater than the first length. In an embodiment, the first length and the second length may be substantially identically formed.

According to an embodiment, in order to reduce damage to a corner unit (e.g., the first corner unit C1, the second corner unit C2, the third corner unit C3 or the fourth corner unit C4) with respect to an external impact applied to the electronic device 200 in a situation, such as the dropping of the electronic device 200, the corner unit may be formed to be thicker than the first bezel unit 601, the second bezel unit 602, the third bezel unit 603, and the fourth bezel unit 604 when viewed in a z axis direction.

According to an embodiment, the side surface bezel structure 203 may include a non-metallic material. For example, the side surface bezel structure 203 may include polymer, such as engineering plastic (e.g., polycarbonate (PC) or polymethyl methacrylate (PMMA)). For another example, the side surface bezel structure 203 may include a material (e.g., fiber reinforced plastic (FRP)) in which various reinforcing materials, such as glass fiber or carbon fiber, are mixed with engineering plastic. According to an embodiment, the side surface bezel structure 203 may include polymer resin, such as polyether ether ketone, polyphenylene sulfide, polybutylene terephthalate, polyimide or polycarbonate.

According to an embodiment, the side surface bezel structure 203 may include ceramic. The side surface bezel structure 203 may include zirconia ceramic, for example. In an embodiment, the side surface bezel structure 203 may be implemented as a ceramic structure including aluminum oxide (Al2O3), silicon carbide (SIC) or silicon nitride (Si3N4). The side surface bezel structure 203 including the ceramic may have gloss, for example, and may contribute to aesthetics of the electronic device 200. In an embodiment, the side surface bezel structure 203 may be made of various other ceramics or a combination of at least one ceramic.

According to an embodiment, the side surface bezel structure 203 may be made of a non-metallic material, such as ceramic, and thus can prevent an electric shock. For example, an unwanted alternating current having a high voltage may be supplied from an external power supply to the electronic device 200 due to a defect in or damage to the external power supply. The alternating current having a high voltage may leak into the first support member 410, but the side surface bezel structure 203 can prevent such a leakage current from flowing into the human body.

According to an embodiment, the first bezel unit 601, the second bezel unit 602, the third bezel unit 603 or the fourth bezel unit 604 may include at least one opening. For example, the first bezel unit 601 may include a first microphone hole 621 of the first audio module 302 (refer to FIG. 2). For example, the first bezel unit 601 may include a first speaker hole 622 of the third audio module 304 (refer to FIG. 2). For example, the first bezel unit 601 may include a first connector hole 623 of the first connection terminal module 311 (refer to FIG. 2). For example, the first bezel unit 601 may include a second connector hole 624 of the second connection terminal module 312 (refer to FIG. 2). For example, the third bezel unit 603 may include a third connector hole 625 corresponding to the third connector for attaching and detaching an external storage medium (e.g., a memory card such as a secure digital (SD) card or a subscriber identity module (SIM)) card). For example, the second bezel unit 602 may include key holes 626 corresponding to key input devices (e.g., the input module 310 in FIG. 2).

According to an embodiment, the first support member 410 (e.g., a bracket) of the front case 400 may include a connection structure 500 combined with the side surface bezel structure 203. The connection structure 500 may be a rectangular ring form extending along the side surface bezel structure 203. The side surface bezel structure 203 may be moved in a direction (e.g., the +z axis direction) from the rear plate 202 (refer to FIG. 3) to the front plate 201 (refer to FIG. 3), and may be combined with the connection structure 500. The connection structure 500 may include a first connection unit 501 corresponding to the first bezel unit 601 of the side surface bezel structure 203, a second connection unit 502 corresponding to the second bezel unit 602 of the side surface bezel structure 203, a third connection unit (not illustrated) corresponding to the third bezel unit 603 of the side surface bezel structure 203 or a fourth connection unit 504 corresponding to the fourth bezel unit 604 of the side surface bezel structure 203, for example. The connection structure 500 may include a first corner connection unit 511 connecting the first connection unit 501 and the second connection unit 502 and corresponding to the first corner unit C1 of the side surface bezel structure 203. The connection structure 500 may include a second corner connection unit (not illustrated) connecting the second connection unit 502 and the third connection unit and corresponding to the second corner unit C2 of the side surface bezel structure 203. The connection structure 500 may include a third corner connection unit (not illustrated) connecting the third connection unit and the fourth connection unit 504 and corresponding to the third corner unit C3 of the side surface bezel structure 203. The connection structure 500 may include a fourth corner connection unit 514 connecting the first connection unit 501 and the fourth connection unit 504 and corresponding to the fourth corner unit C4 of the side surface bezel structure 203.

According to an embodiment, the connection structure 500 may include a plurality of hole structures. For example, the first connection unit 501 may include a first hole structure 521 aligned with the first microphone hole 621 of the side surface bezel structure 203. The first microphone (not illustrated) of the first audio module 302 (refer to FIG. 2) may be disposed in accordance with the first hole structure 521. The first connection unit 501 may include a second hole structure 522 aligned with the first speaker hole 622 of the side surface bezel structure 203. The first speaker (not illustrated) of the third audio module 304 (refer to FIG. 2) may be disposed in accordance with the second hole structure 522. The first connection unit 501 may include a third hole structure 523 aligned with the first connector hole 623 of the side surface bezel structure 203. A first connector 3111 of the first connection terminal module 311 (refer to FIG. 2) may be disposed in accordance with the third hole structure 523. The first connection unit 501 may include a fourth hole structure 524 aligned with the second connector hole 624 of the side surface bezel structure 203. A second connector 3121 of the second connection terminal module 312 (refer to FIG. 2) may be disposed in accordance with the fourth hole structure 524. The third connection unit (not illustrated) may include a fifth hole structure (not illustrated) aligned with the third connector hole 625 of the side surface bezel structure 203. The third connector (not illustrated) may be disposed in accordance with the fifth hole structure. The second connection unit 502 may include sixth hole structures (not illustrated) aligned with the key holes 626 of the side surface bezel structure 203. The key input devices 310 (refer to FIG. 2) may be disposed in accordance with the sixth hole structures.

According to an embodiment, the connection structure 500 of the first support member 410 may include a first internal surface 5001 of the front case 400 that faces the side surface bezel structure 203. The first internal surface 5001 may be an area for coupling or a connection with the side surface bezel structure 203 in the connection structure 500. The side surface bezel structure 203 may include a second internal surface 6001 of the front case 400 that faces the first internal surface 5001. The second internal surface 6001 may be an area for coupling or a connection with the connection structure 500 in the side surface bezel structure 203.

According to an embodiment, the first support member 410 may include a non-conductive unit (or a non-conductive structure) (not illustrated) of a non-metallic material and a conductive unit (or a conductive structure) (not illustrated) of a metal material combined with the non-conductive unit. A part of the non-conductive unit may be disposed in the connection structure 500 of the first support member 410. At least a part of the conductive unit may be disposed in the connection structure 500 of the first support member 410.

According to an embodiment, a plurality of fastening structures which supports the attachment and detachment of the side surface bezel structure 203 to and from the connection structure 500 may be included between the side surface bezel structure 203 and the connection structure 500 of the first support member 410.

According to an embodiment, the plurality of first fastening structures may include a plurality of hooks 630 formed in the second internal surface 6001 and a plurality of hook fastening units 530 formed in the and the first internal surface 5001, for example. The plurality of hook fastening units 530 may include an under-cut structure (or a latch structure) having a recess or groove form corresponding to the plurality of hooks (or hook structures) 630. When the side surface bezel structure 203 is moved in a direction (e.g., the +z axis direction) from the rear plate 202 (refer to FIG. 3) to the front plate 201 and combined with the connection structure 500, the plurality of hooks 630 may be fastened to the plurality of hook fastening units 530 in a snap-fit manner.

According to an embodiment, a plurality of second fastening structures may include a plurality of support units 640 formed in the second internal surface 6001 and a plurality of insertion units 540 formed in the first internal surface 5001, for example. When viewed over the front plate 201 (e.g., a −z axis direction), the plurality of second fastening structures may be formed at locations that do not overlap a plurality of first fastening structures including the plurality of hooks 630 and the plurality of hook fastening units 530. The plurality of insertion units 540 may include a fitting structure (or a fit structure) having a recess or a groove shape corresponding to the plurality of support units 640. When the side surface bezel structure 203 is moved in a direction (e.g., the +z axis direction) from the rear plate 202 (refer to FIG. 3) to the front plate 201 and combined with the connection structure 500, the plurality of support units 640 may be inserted into the plurality of insertion units 540. The plurality of second fastening structures including the plurality of support units 540 and the plurality of insertion units 540 may guide a location or direction where the side surface bezel structure 203 is combined with the connection structure 500.

According to an embodiment (not illustrated), a buffering member (or a buffering material) capable of reducing an external impact may be disposed between the first internal surface 5001 and the second internal surface 5002. The buffering member can reduce damage to the side surface bezel structure 203 in accordance with an external impact, or may contribute to maintaining coupling between the side surface bezel structure 203 and the connection structure 500.

According to an embodiment, a part of the first fastening structure, including some of the plurality of hooks 630 and some of the plurality of hook fastening units 530 corresponding thereto, may be disposed at a first height in a first direction (e.g., the −z axis direction) from the front plate 201 to the rear plate 202 (refer to FIG. 4). The first fastening structure disposed at the first height may be denoted as the "first fastening structure having the first height." A part of the first fastening structure, including some of the plurality of hooks 630 and some of the plurality of hook fastening units 530 corresponding thereto may be disposed at second height smaller than the first height in the first direction. The first fastening structure disposed at the second height may be denoted as the "first fastening structure having the second height." The first fastening structure having the first height may be disposed to be more isolated from the display 301 (refer to FIG. 4) than the second fastening structure having the second height. A part of the conductive unit included in the front case 400 may be used as an antenna radiator disposed near the side surface bezel structure 203. The antenna radiator has a form extending along at least a part of the side surface bezel structure 203, for example, and at least a part thereof may be disposed in the connection structure 500 of the first support member 410. The antenna radiator may have a spatial location relation with at least one first fastening structure. For example, a form of the antenna radiator may be differently implemented depending on a location of at least one first fastening structure in a limited design area (e.g., the connection structure 500). When being implemented in accordance with the first fastening structure having the first height, the antenna radiator can be easily implemented in a way to have a form isolated from the display 301 in a limited design area (e.g., the connection structure 500), compared to a comparison example in which an antenna radiator is implemented in accordance with the first fastening structure having the second height. As at least a part of the antenna radiator is far away from the display 301, antenna radiation performance can be secured because an electromagnetic influence (e.g., an antenna gain loss, noise, electromagnetic interference (EMI) or a crosstalk attributable to a close conductor) of the display 301 on the antenna radiator is reduced. For example, as at least a part of the antenna radiator is far away from the display 301, electromagnetic isolation for the display 301 may be increased. The size of the antenna radiator may be reduced in the limited design area, but this may make it difficult to form durability or a desired resonant frequency. The first fastening structure having the first height may facilitate an implementation of the antenna radiator because the size or durability of the antenna radiator is secured. The first fastening structure having the first height can facilitate an implementation thereof because an electrical length (e.g., an antenna length) based on a wavelength of the antenna radiator is secured. The first fastening structure having the first height may contribute to securing coupling durability between the connection structure 500 and the side surface bezel structure 203, compared to a comparison example in which the first fastening structure having the first height is omitted. If all of the plurality of first fastening structures is implemented as the first fastening structures having the first height, coupling durability between the connection structure 500 and the side surface bezel structure 203 may be degraded. Accordingly, the first fastening structure having the second height may be applied to the first fastening structure that does not substantially affect antenna radiation performance.

According to an embodiment, the connection structure 500 may be referred to as an element included in the side surface bezel structure 203, not an element included in the first support member 410. In an embodiment, the side surface bezel structure 203 may be implemented to include the connection structure 500.

According to an embodiment, the side surface bezel structure 203 and the connection structure 500 may be integrated and formed.

According to an embodiment, the side surface bezel structure 230 and the first support member 410 may be integrated and formed.

Figure 7:
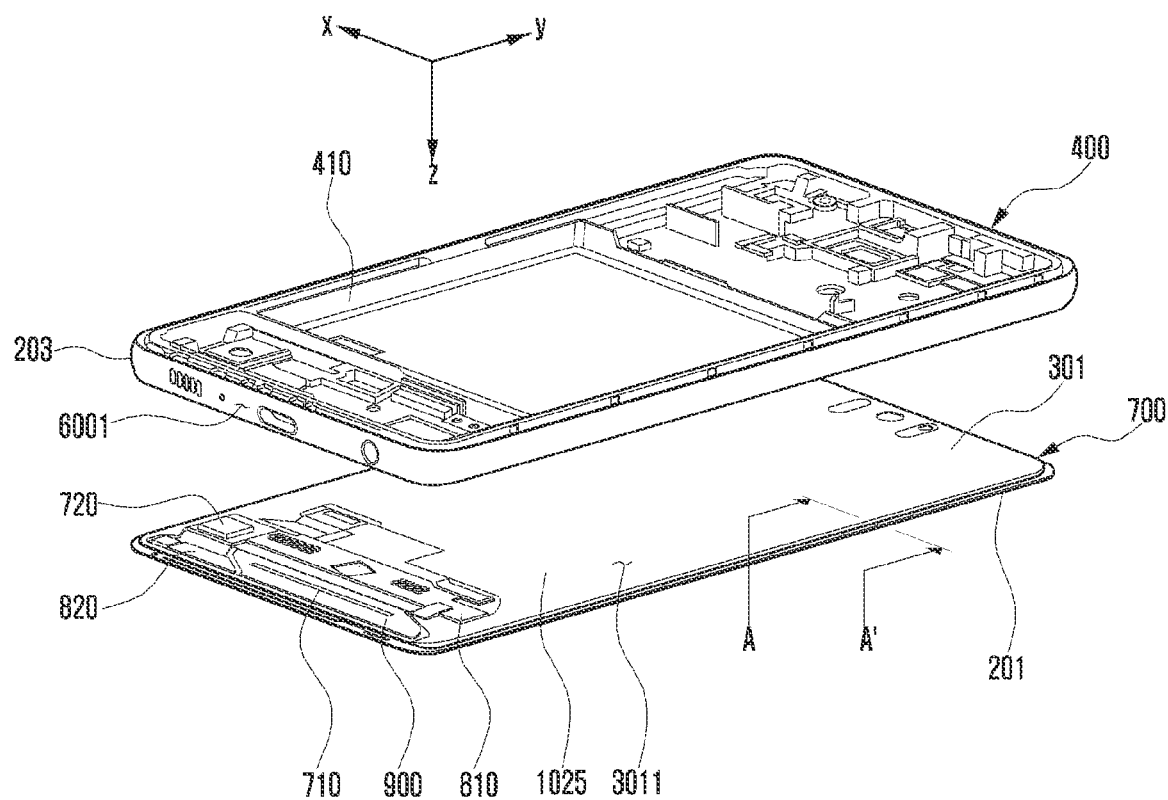
FIG. 7 is a partial exploded perspective view of the front case and a display assembly according to various embodiments.
Figure 8:
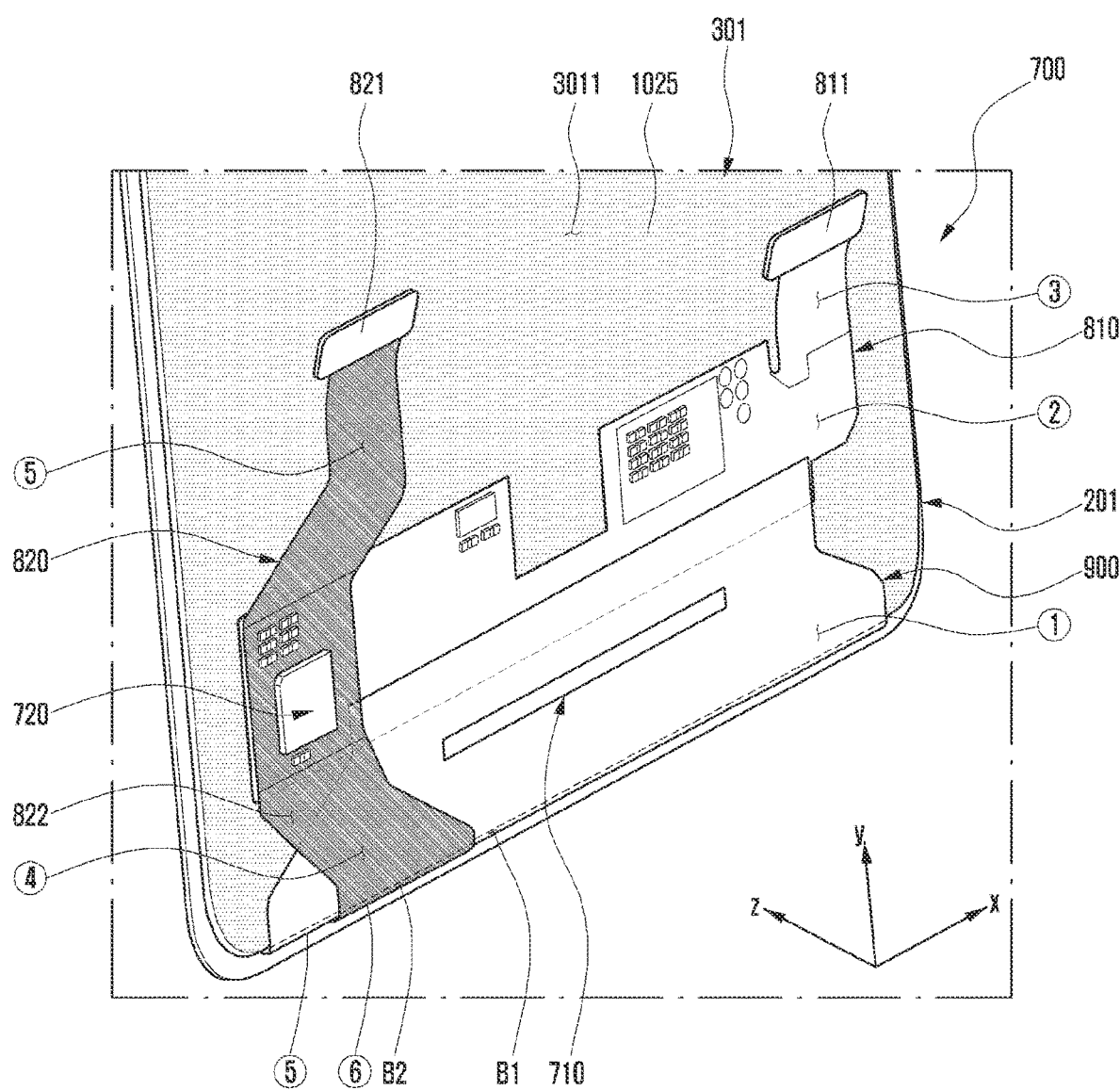
FIG. 8 is a partial perspective view illustrating the display assembly according to various embodiments.
Figure 9:
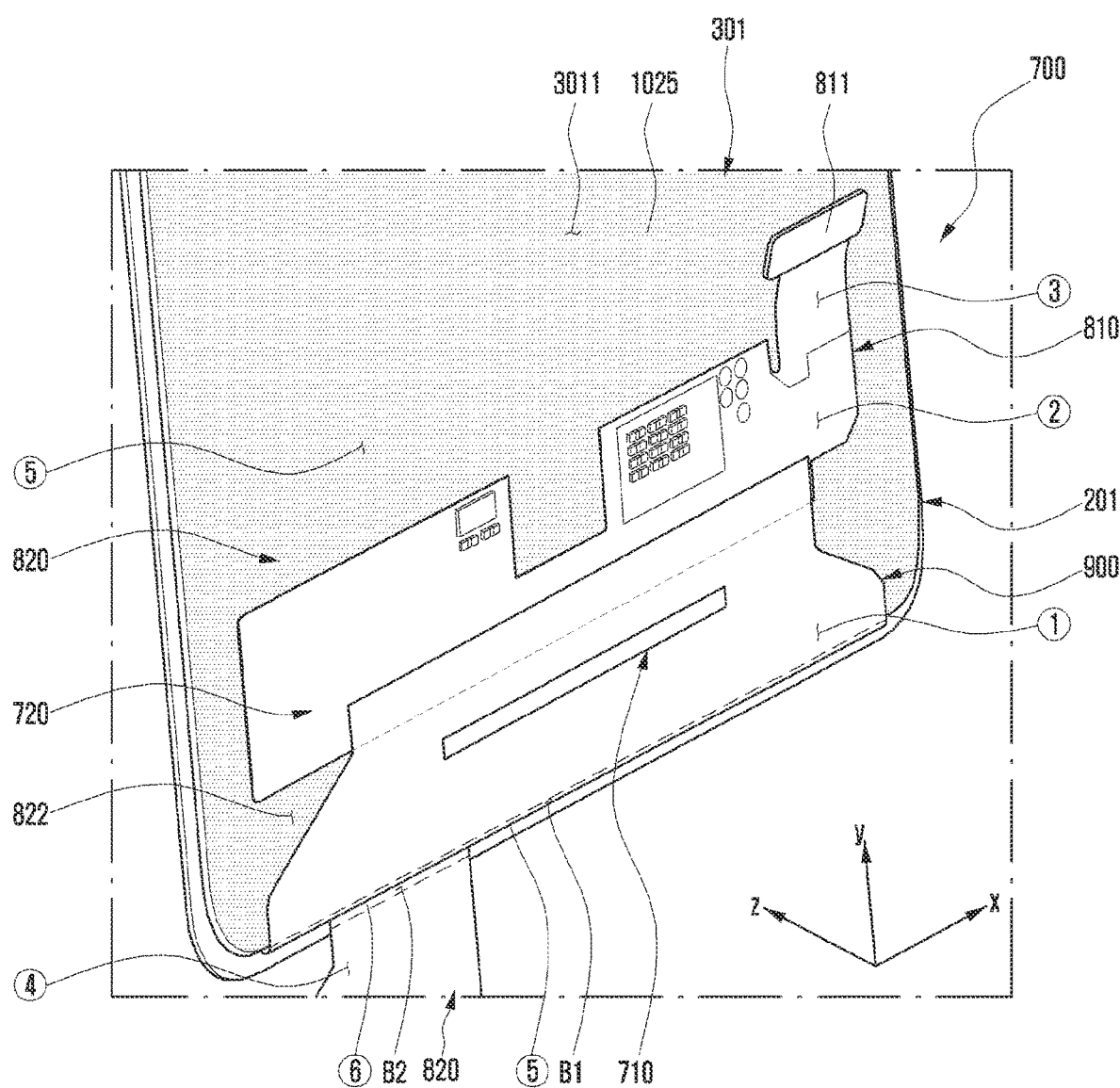
FIG. 9 is a partial perspective view illustrating the display assembly before a second printed circuit board is disposed on the back of a display according to various embodiments.
Figure 10:
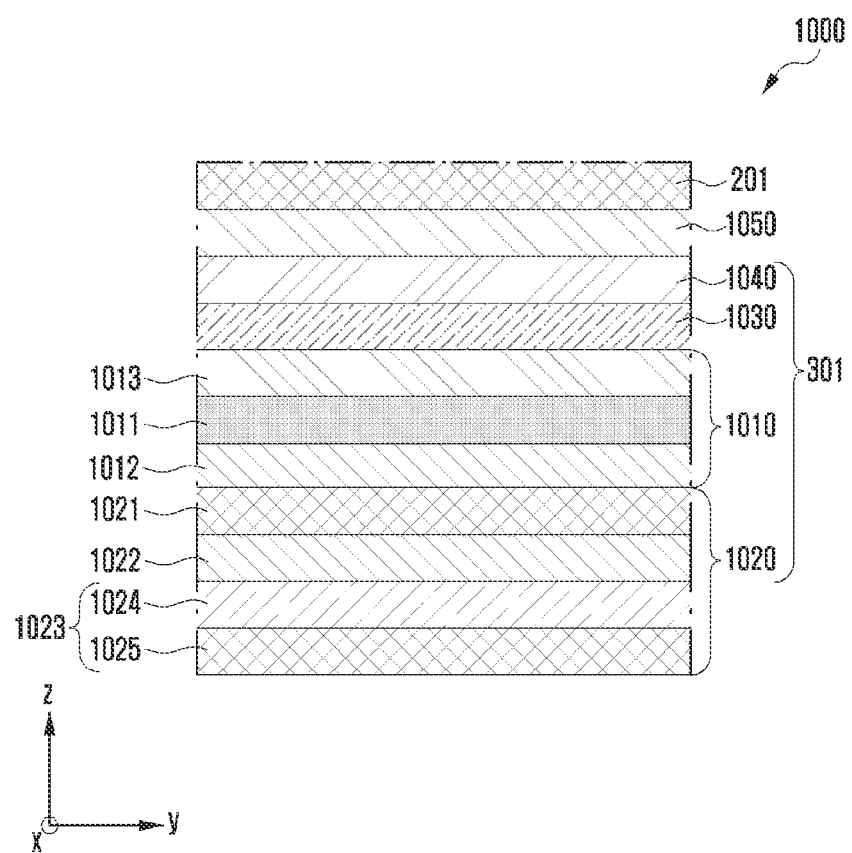
FIG. 10 is a cross-sectional view illustrating an example structure of the display assembly taken along line A-A' in FIG. 7 according to various embodiments.

FIG. 7 is a partial exploded perspective view illustrating the front case 400 and a display assembly 700 according to various embodiments. FIG. 8 is a partial perspective view illustrating the display assembly 700 according to various embodiments. FIG. 9 is a partial perspective view illustrating the display assembly 700 before a second printed circuit substrate 820, for example, is disposed on a back 3011 of the display 301 according to various embodiments. FIG. 10 is a cross-sectional view 1000 of the display assembly 700 taken along line A-A' in FIG. 7 according to various embodiments.

With reference to FIGS. 7, 8, and 9, in an embodiment, the display assembly 700 may include the front plate 201, the display 301, a display driving circuit 710, a touch controller integrated circuit (IC) 720, a first flexible printed circuit substrate 810, a second flexible printed circuit substrate 820 and/or a film substrate 900. The display assembly 700 may be combined with the side surface bezel structure 203 and the front case 400 including the first support member 410. For example, the front plate 201 may be combined with the front case 400 using an adhesive member (not illustrated). The adhesive member may be disposed between the front case 400 and the front plate 201 along the side surface bezel structure 203. The adhesive member may be disposed to be adjacent to an edge of the front plate 201 in a ring shape.

With reference to FIG. 10, in an embodiment, the cross-section 1000 may include the front plate 201, the display 301, and a transparent adhesive member 1050 for optics. The cross-section structure 1000 illustrated in FIG. 10 schematically illustrates an example stack relation between elements, and each of the elements may be formed in various thicknesses. The front plate 201 (e.g., a transparent cover or a window) may cover the display 301, and can protect the display 301 against the outside. In an embodiment, the front plate 201 may include a plurality of layers. For example, the front plate 201 may have a form in which various coating layers are disposed on a polymer plate or a glass plate. The display 301 may be combined with the front plate 201 using the transparent adhesive member 1050 for optics. The transparent adhesive member 1050 for optics may be disposed between the front plate 201 and the display 301, and may include an optical clear adhesive (OCA), optical clear resin (OCR) or super view resin (SVR), for example.

According to an embodiment, the display 301 may include a display panel 1010, a lower panel 1020, a touch sensing circuit 1030 and/or an optical layer 1040.

According to an embodiment, the display panel 1010 may include a light-emitting layer 1011 and a thin film transistor (TFT) substrate 1012. The light-emitting layer 1011 may include a plurality of pixels implemented as a light-emitting element, such as an organic light emitting diode (OLED) or micro LED, for example. The light-emitting layer 1011 may be disposed in the TFT substrate 1012 through organic evaporation. The TFT substrate 1012 may be disposed between the light-emitting layer 1011 and the lower panel 1020. The TFT substrate 1012 may denote a structure in which at least one TFT is disposed in a substrate (e.g., a rigid glass substrate) using a series of processes such as deposition, patterning, and etching. At least one TFT may adjust the on or off of a pixel or brightness of a pixel by controlling a current for a light-emitting element of the light-emitting layer 1011. At least one TFT may be implemented as an amorphous silicon (a-Si) TFT, a liquid crystalline polymer (LCP) TFT, a low-temperature polycrystalline oxide (LTPO) TFT or a low-temperature polycrystalline silicon (LTPS) TFT, for example. The display panel 1010 may include a storage capacitor. The storage capacitor may maintain a voltage signal for a pixel, may maintain a voltage inputted to a pixel within one frame or can reduce a change in the gate voltage of a TFT attributable to a leakage current during an emission time. The storage capacitor can maintain a voltage applied to a pixel at a given time interval according to a routine (e.g., initialization, data write) for controlling at least one TFT.

According to an embodiment, the display panel 1010 may be implemented based on an OLED. The display panel 1010 may include an encapsulation layer 1013 that covers the light-emitting layer 1011. An organic material and an electrode that generate light in the OLED may lose its emission characteristic due to a very sensitive response to oxygen and/or moisture. Accordingly, the encapsulation layer 1013 can seal or protect the light-emitting layer 1011 so that oxygen and/or moisture does not penetrate the OLED.

According to an embodiment, if the display 301 is implemented as a flexible display, the TFT substrate 1012 of the display panel 1010 may be flexible. In this case, the TFT substrate 1012 may include a flexible base film and a TFT film disposed in the base film, for example. The base film may include a flexible film made of a material, such as polyimide or polyester (PET). The base film may function to support and protect the display panel 1010. In an embodiment, the base film may be denoted as a protective film, a back film or a back plate. The TFT film may denote a structure in which at least one TFT is disposed in the base film using a series of processes such as deposition, patterning, and etching. In various embodiments, at least one additional polymer layer (e.g., a layer including PI, PET or TPU) may be further disposed on the back of the display panel 1010 in addition to the base film. If the display 301 is implemented as a flexible display, the encapsulation layer 1013 may include thin-film encapsulation (TFE).

According to an embodiment, the lower panel 1020 may include a plurality of layers for various functions. The lower panel 1020 may include a shade layer 1021, a buffering layer 1022 and/or a lower layer 1023. The shade layer 1021 may be disposed between the TFT substrate 1012 and the buffering layer 1022. The buffering layer 1022 may be disposed between the shade layer 1021 and the lower layer 1023. The shade layer 1021 can block light incident from the outside. For example, the shade layer 1021 may include an embo layer. The embo layer may be a black layer including an uneven pattern. The buffering layer 1022 can buffer an external impact applied to the display 301. For example, the buffering layer 1022 may include a sponge layer or a cushion layer. The lower layer 1023 may diffuse, distribute or dissipate heat generated from the electronic device 200 (refer to FIG. 2) or the display 301. The lower layer 1023 may absorb or shield an electromagnetic wave. The lower layer 1023 may reduce an external impact applied to the electronic device 200 or the display 301. In an embodiment, the lower layer 1023 may include a complex sheet 1024 and/or a conductive sheet 1025. The complex sheet 1024 may be a sheet processed by combining layers or sheets having different properties. The complex sheet 1024 may include at least one of polyimide or graphite, for example. The complex sheet 1024 may be replaced with a single sheet including one material (e.g., polyimide or graphite). The complex sheet 1024 may be disposed between the buffering layer 1022 and the conductive sheet 1025. The conductive sheet 1025 (e.g., a copper sheet) may play an electromagnetic interference (EMI) shielding role for the display 301, and may form the back 3011 of the display 301. In an embodiment, at least a part of the lower layer 1023 may be used to reinforce the stiffness of the display 301 or the electronic device 200, shield surrounding noise, and distribute heat discharged from a surrounding heat dissipation part (e.g., the display driving circuit 710) as a conductive member (e.g., a metal plate). The conductive member may include at least one of copper (CU), aluminum (Al), stainless steel (SUS) or CLAD (e.g., a stack member in which SUS and Al are alternately disposed), for example. The lower layer 1023 may include various layers for other various functions. In an embodiment, at least one of a plurality of layers (e.g., the shade layer 1021, the buffering layer 1022, the complex sheet 1024, and the conductive sheet 1025) included in the lower panel 1020 may be omitted. In an embodiment, an arrangement order of the plurality of layers included in the lower panel 1020 is not limited to the embodiment of FIG. 10, and may be variously changed.

In an embodiment, some of the plurality of layers included in the lower panel 1020 may include a digitizer for detecting a pen input device (e.g., a stylus pen). The digitizer may be an electromagnetic induction panel for detecting a pen input device using a magnetic field method, for example. In an embodiment, an electromagnetic induction panel may be omitted depending on a method of implementing the pen input device. For example, in an embodiment in which the pen input device generates a signal using power of a battery included in the pen input device, the electromagnetic induction panel may be omitted.

According to an embodiment, the first camera module 307 (refer to FIG. 2) may be disposed at the bottom of at least some of a display region (e.g., a screen display region or an active region) of the display 301, so that a location of the first camera module 154 may not be visually exposed. In this case, some of the plurality of layers included in the display panel 1010 may be formed of a designated pattern (black matrix) for reducing the diffraction of light introduced into the first camera module 307 or a buffer layer (e.g., an opaque metal layer) including designated patterns.

According to various embodiments, at least some of the plurality of layers included in the lower layer 1023 may include an opening formed in accordance with a sensor (e.g., a fingerprint sensor) disposed within the electronic device 200 (refer to FIG. 2). The sensor may overlap the opening or at least a part thereof may be inserted into the space of the opening. At least two layers may include an opening. The openings formed in the respective layers may overlap each other and may have substantially the same size and shape. In an embodiment, the sizes or shapes of the openings formed in the layers, respectively, may not be the same.

According to an embodiment, the optical layer 1040 may include a polarizing layer (or a polarizer) or a phase retardation layer (or retarder). The transparent adhesive member 1050 for optics may be disposed between the front plate 201 and the optical layer 1040. The polarizing layer and the phase retardation layer can improve outdoor visibility of a screen. The optical layer 1040 may selectively transmit light that is generated from the display panel 1010, for example, and is vibrated in a given direction. In an embodiment, one optical layer 1040 in which the polarizing layer and the phase retardation layer are combined may be provided. Such an optical layer 1040 may be denoted as a "circularly polarizing layer." In an embodiment, the polarizing layer (or the circularly polarizing layer) may be omitted. In this case, a black pixel define layer (PDL) and/or a color filter may be provided by replacing the polarizing layer.

According to an embodiment, the touch sensing circuit (e.g., a touch sensor) 1030 may include a transparent conductive layer (or film) based on various conductive materials, such as indium tin oxide (ITO). For example, the touch sensing circuit 1030 may be disposed between the optical layer 1040 and the display panel 1010 (e.g., an on-cell type). In an embodiment, the touch sensing circuit 1030 may be disposed between the front plate 201 and the optical layer 1040 (e.g., an add-on type). According to an embodiment, the display panel 1010 may include a touch sensing circuit or a touch sensing function (e.g., an in-cell type).

According to an embodiment (not illustrated), if the display 301 is implemented as a flexible display, the touch sensing circuit 1030 may include a conductive pattern, such as a metal mesh (e.g., an aluminum metal mesh). For example, in accordance with the bending of the display 301, a metal mesh may have durability greater than that of a transparent conductive layer implemented using ITO.

According to an embodiment, the display 301 may further include a pressure sensor capable of measuring the intensity (pressure) of a touch.

According to various embodiments, a plurality of layers included in the display panel 1010 or the lower panel 1020 or a stack structure or stack sequence thereof may be various. The display 301 may be implemented by omitting some of the elements or adding another element depending on a provided form or convergence trend thereof.

According to an embodiment, the display driving circuit 710 may be disposed in the display assembly 700 in a chip-on film (COF) manner. For example, the display driving circuit 710 may be disposed in a flexible film substrate 900 that connects the display panel 1010 and a first flexible printed circuit substrate 810. The display driving circuit 710 may include a display drive integrated (DDI) circuit or DDI chip, for example. The film substrate 900 may include a flexible plastic substrate or polymer substrate (e.g., a polyimide substrate) in which a circuit or wiring is formed, for example. One end of the film substrate 900 may be electrically connected to the display panel 1010 (or the TFT substrate 1012), and the other end of the film substrate 900 may be electrically connected to the first flexible printed circuit substrate 810. In an embodiment, the display driving circuit 710 may be disposed in the film substrate 900 using tape automated bonding (TAB). In an embodiment, the film substrate 900 may be electrically connected to the display panel 1010 and/or the first flexible printed circuit substrate 810 using anisotropic conductive film (ACF) bonding. The ACF may be an anisotropic conductive layer formed to have a film state by mixing fine conductive particles (e.g., Ni, carbon or solder balls) with adhesive resin (e.g., thermosetting resin), for example, so that electricity flows only in one direction. In an embodiment, the film substrate 900 may be electrically connected to the display panel 1010 or the first flexible printed circuit substrate 810 through other various methods (e.g., a connection between connectors).

According to an embodiment, the film substrate 900 may be bent on the side of an edge (not illustrated) of the display 301 on one side thereof, which corresponds to the first bezel unit 601 of the side surface bezel structure 203, and may be extended between the back 3011 of the display 301 and the first support member 410 of the front case 400. A part (hereinafter a first substrate area) ① (refer to FIGS. 8 and 9) of the film substrate 900 extended between the back 3011 of the display 301 and the first support member 410 of the front case 400 may be disposed on the back 3011 of the display 301. For example, an adhesive material may be disposed between the first substrate area ① and the back 3011 of the display 301. The display driving circuit 710 may be disposed in the first substrate area ① between the first substrate area ① and the first support member 410.

According to an embodiment, a part (hereinafter a second substrate area ②) of the first flexible printed circuit substrate 810, which is connected to the first substrate area ①, may be disposed on the back 3011 of the display 301 between the back 3011 of the display 301 and the first support member 410 of the front case 400. For example, an adhesive material may be disposed between the second substrate area ② and the back 3011 of the display 301. A third substrate area ③ of the first flexible printed circuit substrate 810, which extends from the second substrate area ②, may be disposed to penetrate an opening (not illustrated) formed in the first support member 410. The third substrate area ③ may include a first connector 811 (refer to FIGS. 8 and 9) for being electrically connected to a printed circuit substrate (e.g., the second printed circuit substrate 451) disposed between the first support member 410 and the rear plate 202 (refer to FIG. 4). In an embodiment, the first substrate area ① may be substantially rigid. In an embodiment, the first substrate area ① may be substantially flexible. In an embodiment, the second substrate area ② may be substantially flexible. The first flexible printed circuit substrate 810 may include a flexible PCB (FPCB) or a rigid-flexible PCB (RFPCB), for example.

According to an embodiment, the display driving circuit 710 may be disposed in the display assembly 700 in a chip-on panel (COP) manner. For example, the TFT substrate 1012 of the display panel 1010 may extend by replacing the film substrate 900, and may be electrically connected to the first flexible printed circuit substrate 810. The display driving circuit 710 may be disposed in the TFT substrate 1012. In an embodiment, the display driving circuit 710 may be disposed in the TFT substrate 1012 using TAB.

According to an embodiment, a signal instructed by a processor (e.g., the processor 120 in FIG. 1) may be delivered to the display driving circuit 710, disposed in the film substrate 900, through the first flexible printed circuit substrate 810. The display driving circuit 710 may control pixels through TFTs within the display 301 by playing a role as the passage of a signal between the display 301 and the processor. For example, the display driving circuit 710 has a function for turning on or off pixels included in the display 301, and may be electrically connected to a gate electrode of a TFT. The display driving circuit 710 has a function for generating a color difference by adjusting the amount of a red, green, blue (RGB) signal of a pixel, and may be electrically connected to a source electrode of the TFT. The TFT may include a gate line that electrically connects the display driving circuit 710 and the gate electrode of the TFT, and a source line (or a data line) that electrically connects the display driving circuit 710 and the source electrode of the TFT. In an embodiment, the display driving circuit 710 may operate in accordance with a red, green, blue, white (RGBW) method in which a white pixel has been added to an RGB pixel.

According to an embodiment, the display driving circuit 710 may include a DDI package. The DDI package may include a DDI (or a DDI chip), a timing controller T-CON, a graphic RAM (GRAM) or power generating circuits. In an embodiment, the graphic RAM may be omitted or a memory provided separately from the display driving circuit 710 may be used as the graphic RAM. The timing controller may convert a data signal, received from the processor, into a signal necessary for the DDI. The timing controller may play a role to adjust input data information to a signal suitable for a gate driver (or a gate IC) and source driver (or a source IC) of the DDI. The graphic RAM may play a role as a memory for temporarily storing data to be inputted to a driver (or IC) of the DDI. The graphic RAM may store an inputted signal and transmit the signal to the driver of the DDI again. In this case, the graphic RAM may process the signal through a mutual interaction with the timing controller. The power generating circuits may generate a voltage for driving the display 301, and may supply a voltage necessary for the gate driver and source driver of the DDI.

According to an embodiment, the second printed circuit substrate 820 may include a second connector 821 for electrically connecting one end thereof to the touch sensing circuit 1030 and electrically connecting the other end thereof to a printed circuit substrate (e.g., the second printed circuit substrate 451 in FIG. 4) disposed between the first support member 410 and the rear plate 202 (refer to FIG. 4). The second printed circuit substrate 820 may be bent on the side of an edge (not illustrated) of the display 301 on one side thereof, which corresponds to the first bezel unit 601 of the side surface bezel structure 203, and may extend between the back 3011 of the display 301 and the first support member 410 of the front case 400. In an embodiment, a part (hereinafter a fourth substrate area ④) of the second printed circuit substrate 820, which extends between the back 3011 of the display 301 and the first support member 410 of the front case 400, may overlap a part of the first substrate area ① and/or a part of the second substrate area ② when viewed over the back 3011 of the display 301 (e.g., when viewed in a +z axis direction). The fourth substrate area ④ may be disposed to face a part of the first substrate area ① and/or a part of the second substrate area ②, for example. In an embodiment, an adhesive material may be disposed between the fourth substrate area ④ and the first substrate area ① or the fourth substrate area ④ and the second substrate area ②.

According to an embodiment, a fifth substrate area ⑤ of the film substrate 900, which connects the first substrate area ① and the display panel 1010, may include a first bending area B1 that is bent and disposed on the side of an edge of the display 301 on one side thereof. A sixth substrate area ⑥ of the second printed circuit substrate 820, which connects the fourth substrate area ④ and the touch sensing circuit 1030, may include a second bending area B2 that is bent and disposed on the side of an edge of the display 301 on one side thereof. At least some of the fifth substrate area ⑤ and the sixth substrate area ⑥ may overlap and extend.

According to an embodiment, a part 822 of the fourth substrate area ④ may face the back 3011 of the display 301. In an embodiment, an adhesive material may be disposed between the part 822 of the fourth substrate area ④ and the back 3011 of the display 301. In an embodiment (not illustrated), when viewed over the back 3011 of the display 301, the entire part 822 of the fourth substrate area ④ may overlap the first substrate area ① or the second substrate area ②.

According to an embodiment, a touch controller IC 720 may be disposed in the fourth substrate area ④, and may be disposed between the fourth substrate area ④ and the first support member 410. In an embodiment, when viewed over the back 3011 of the display 301 (e.g., when viewed in the +z axis direction), at least a part of the touch controller IC 720 may overlap the second substrate area ②.

According to an embodiment, the fifth substrate area ⑤ of the second flexible printed circuit substrate 820, which extends from the fourth substrate area ④, may be disposed to penetrate an opening (not illustrated) formed in the first support member 410. The second connector 821 may be disposed in the fifth substrate area ⑤. In an embodiment, the fourth substrate area ④ and the fifth substrate area ⑤ may be substantially flexible. In an embodiment, some area of the fourth substrate area ④ in which the touch controller IC 720 is disposed may be substantially rigid. The second flexible printed circuit substrate 820 may include an FPCB or an RFPCB, for example. For another example, the second flexible printed circuit substrate 820 may be implemented as a flexible film substrate (e.g., a flexible plastic substrate or a polymer substrate) in which a circuit or wiring is formed.

According to an embodiment, the touch controller IC 720 may generate an electrical signal relating to coordinates detected through the touch sensing circuit 1030. The touch sensing circuit 1030 may generate an electric field (e.g., a fringing field) in response to a voltage applied by the touch controller IC 720. For example, when a finger touches a screen of the electronic device 200 (refer to FIG. 2) or arrives within a critical distance from a screen, a change in a capacitance value may be equal to or greater than a threshold. When the change in a capacitance value is equal to or greater than the threshold, the touch controller IC 720 electrically connected to the touch sensing circuit 1030 may generate an electrical signal relating to coordinates as a valid touch input or hovering input, and may output the electrical signal to a processor (e.g., the processor 120 in FIG. 1). The processor may recognize coordinates based on an electrical signal received from a sensor. In an embodiment, the touch controller IC 720 may convert, into a digital signal, an analog signal obtained through the touch sensing circuit 1030. For example, the touch controller IC 720 may convert the analog signal of the touch sensing circuit 1030 in the form of coordinates capable of being indicated on a screen by changing the analog signal into the digital signal. In various embodiments, the touch controller IC 720 may perform various functions, such as noise filtering, noise removal, or sensing data extraction, in relation to the touch sensing circuit 1030. In an embodiment, the touch controller IC 720 may include various circuits, such as an analog-digital converter (ADC), a digital signal processor (DSP) and/or a micro control unit (MCU).

According to an embodiment, the display 301 may include at least one of the display driving circuit 710, the touch controller IC 720, the first flexible printed circuit substrate 810, the second flexible printed circuit substrate 820, and the film substrate 900.

Figure 11:
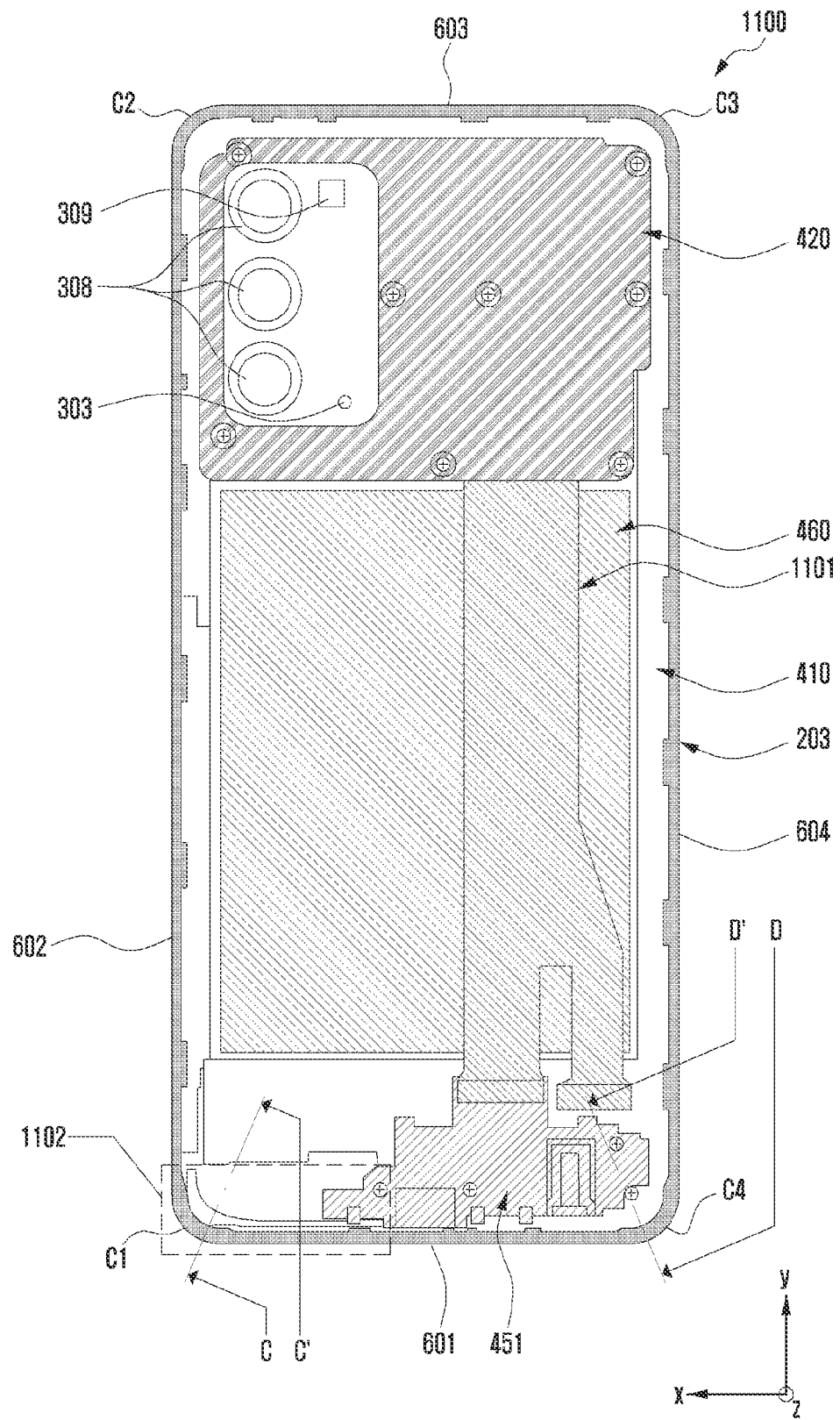
FIG. 11 is a diagram illustrating a part of the electronic device according to various embodiments.
Figure 12:
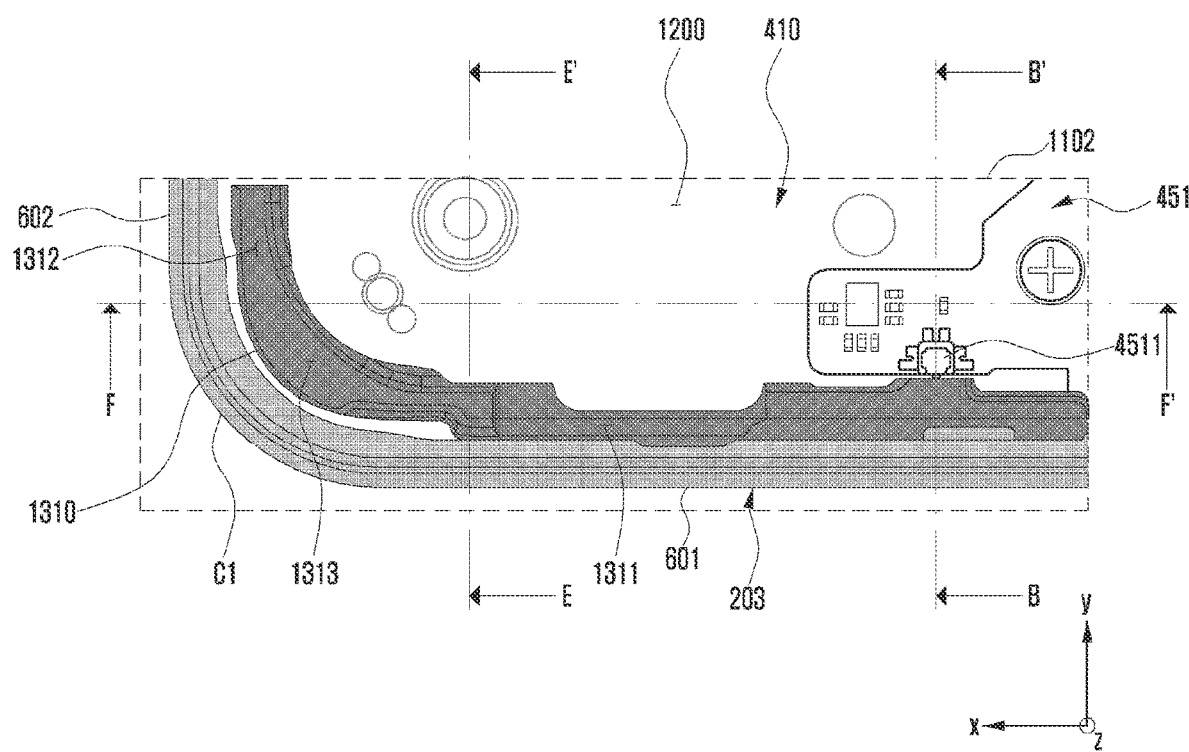
FIG. 12 is a diagram illustrating an enlarged view of a part indicated by reference numeral "1102" illustrated in FIG. 11 according to various embodiments.
Figure 13:
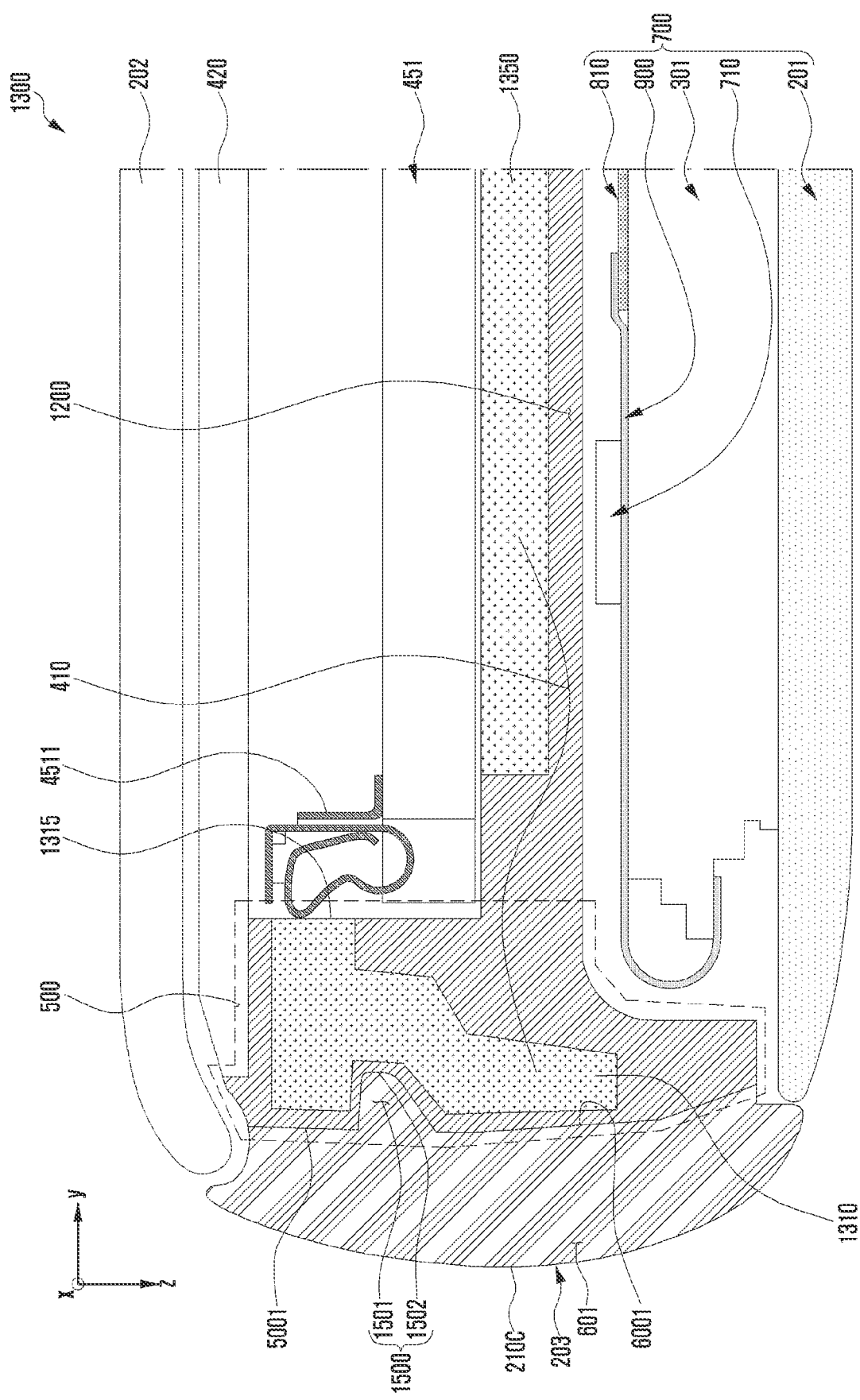
FIG. 13 is a cross-sectional view illustrating a part of the electronic device taken along line B-B' in FIG. 12 according to various embodiments.
Figure 14:
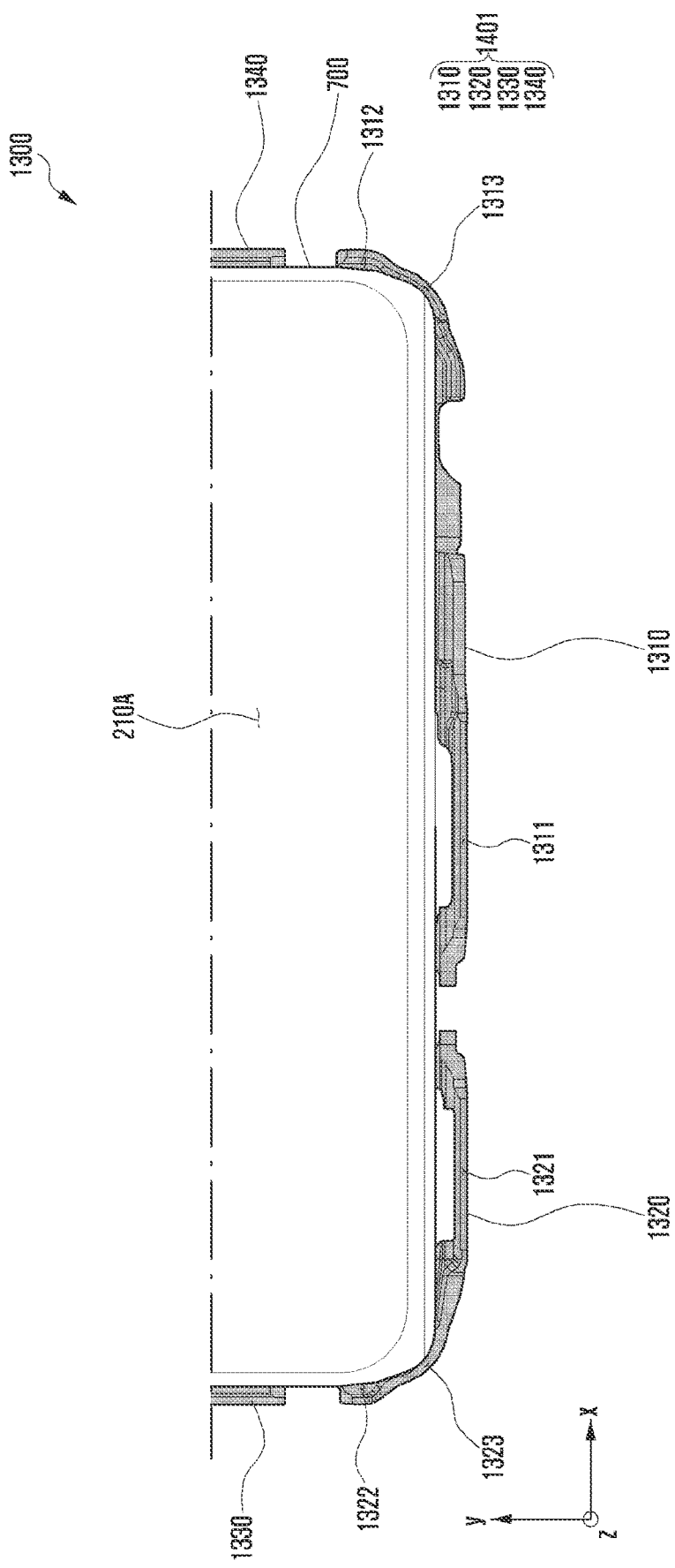
FIG. 14 is a diagram illustrating a part of the electronic device according to various embodiments.
Figure 15:
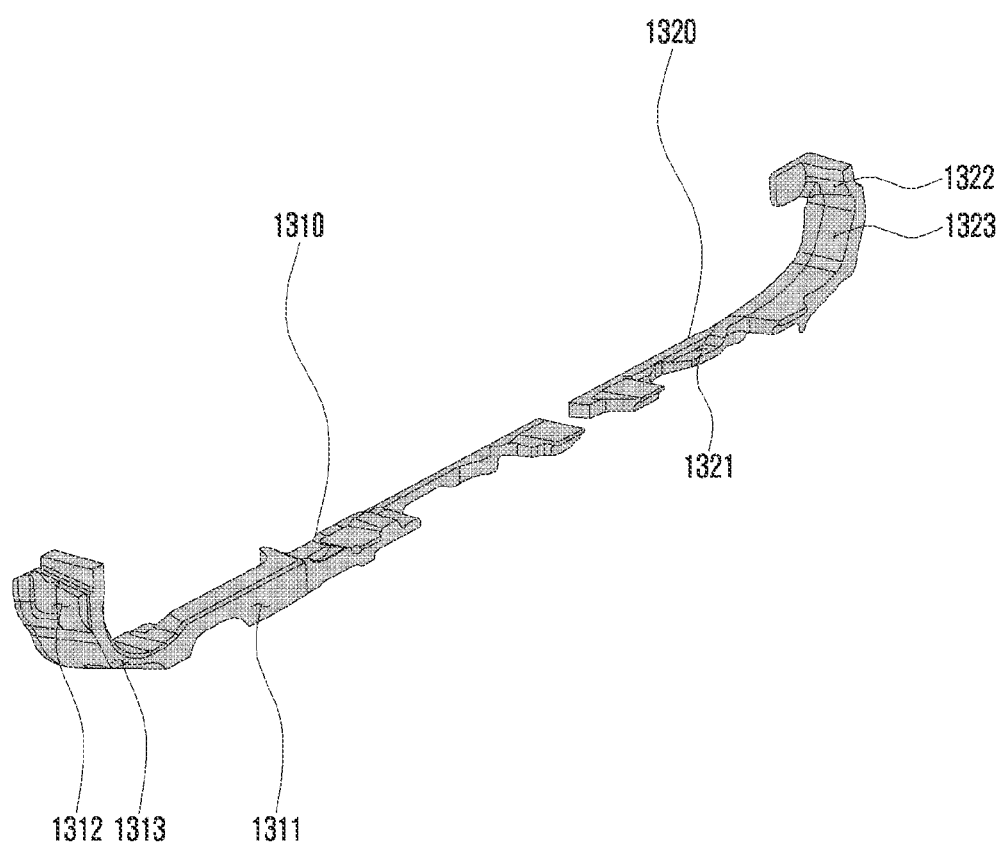
FIG. 15 is a diagram illustrating examples of the first conductive unit and the second conductive unit disposed in the first support of FIG. 11 according to various embodiments.

FIG. 11 is a diagram illustrating a part 1100 of the electronic device 200 according to various embodiments. FIG. 12 is an enlarged view of a part indicated by reference numeral "1102" illustrated in FIG. 11 according to various embodiments. FIG. 13 is a cross-sectional view 1300 of a y-z plane related to a part of the electronic device 200 taken along line B-B' in FIG. 12 according to various embodiments. FIG. 14 is a diagram illustrating a part 1400 of the electronic device 200 according to various embodiments. FIG. 15 is a partial perspective view illustrating a first conductive unit 1310 and a second conductive unit 1320 disposed in the first support member 410 of FIG. 11 according to various embodiments.

With reference to FIG. 11, for example, the side surface bezel structure 203, the first support member 410, the second support member 420, the second printed circuit substrate 451, an electrical path 1101, the battery 460, the second audio module 303, the plurality of second camera modules 308 and the light-emitting module 309 are illustrated. The second printed circuit substrate 451 may be electrically connected to the first printed circuit substrate 441 (refer to FIG. 4) disposed between the first support member 410 and the second support member 420 using the electrical path 1101 (e.g., a flexible printed circuit substrate).

With reference to FIGS. 12 and 13, in an embodiment, the cross-section structure 1300 may include the side surface bezel structure 203, the first support member 410, the front plate 201, the display 301, the display driving circuit 710, the film substrate 900, the first flexible printed circuit substrate 810, the second printed circuit substrate 451 and/or a flexible conductive member 4511.

According to an embodiment, the first support member 410 may include a non-conductive unit 1200 made of a non-metallic material (e.g., polymer) and a plurality of conductive units 1310, 1320, 1330, 1340, and 1350 (refer to FIGS. 12, 13, 14, and 15) made of a metal material and combined with the non-conductive unit 1200. The plurality of conductive units 1310, 1320, 1330, 1340, and 1350 may be physically separated from one another. The non-conductive unit 1200 may be formed in a form combined with the plurality of conductive units 1310, 1320, 1330, 1340, and 1350 using insert molding.

According to an embodiment, the non-conductive unit 1200 may include the same material as the side surface bezel structure 203. In an embodiment, the non-conductive unit 1200 may include a material different from that of the side surface bezel structure 203. The non-conductive unit 1200 may include polymer such as engineering plastic (e.g., PC or PMMA), for example. For another example, the non-conductive unit 1200 may include a material (e.g., fiber-reinforced plastic (FRP)) in which various reinforcing materials such as glass fiber or carbon fiber are mixed with engineering plastic. In an embodiment, the non-conductive unit 1200 may include polymer resin, such as polyether ether keton, polyphenylene sulfide, polybutylene terephtalate, polyimide or polycarbonate.

According to an embodiment, the non-conductive unit 1200 may include a first side surface edge unit (not illustrated) extending between the side surface bezel structure 203 and the front plate 201 and forming a part of the side surface 210C. The first side surface edge unit may be disposed in a ring shape along an edge of the front plate 201. In an embodiment, the non-conductive unit 1200 may include a second side surface edge unit (not illustrated) extending between the side surface bezel structure 203 and the rear plate 202 and forming a part of the side surface 210C. The second side surface edge unit may be disposed in a ring shape along an edge of the rear plate 202. If the non-conductive unit 1200 includes a side surface edge unit (e.g., the first side surface edge unit or the second side surface edge unit), the side surface bezel structure 203 may be changed in a form corresponding to the side surface edge unit. In an embodiment, the first side surface edge unit and/or the second side surface edge unit may be implemented as another non-conductive structure separated from the non-conductive unit 1200, and may be disposed in or combined with the side surface bezel structure 203.

According to an embodiment, at least two of the plurality of conductive units 1310, 1320, 1330, 1340, and 1350 may include the same metal material. In an embodiment, any two of the plurality of conductive units 1310, 1320, 1330, 1340, and 1350 may include different metal materials. For example, at least some of the plurality of conductive units 1310, 1320, 1330, 1340, and 1350 may include magnesium, a magnesium alloy, aluminum, an aluminum alloy, a zinc alloy or a copper alloy. For another example, at least some of the plurality of conductive units 1310, 1320, 1330, 1340, and 1350 may include titanium, an amorphous alloy, a metal-ceramic complex material (e.g., cermet) or stainless steel. The plurality of conductive units 1310, 1320, 1330, 1340, and 1350 may include other various different metal materials.

According to an embodiment (not illustrated), an adhesive material or sealant including various polymers may be disposed between the non-conductive unit 1200 and the plurality of conductive units 1310, 1320, 1330, 1340, and 1350.

According to an embodiment, some (e.g., the first conductive unit 1310, the second conductive unit 1320, the third conductive unit 1330, or the fourth conductive unit 1340) of the plurality of conductive units 1310, 1320, 1330, 1340, and 1350 may be disposed near the side surface bezel structure 203, and may form an outside conductive structure 1401 including a form extending along a part of the side surface bezel structure 203. For example, the first conductive unit 1310 may include a first part 1311 corresponding to a part of the first bezel unit 601, a second part 1312, corresponding to a part of the second bezel unit 602, and a third part 1313 connecting the first part 1311 and the second part 1312 and corresponding to the first corner unit C1. For example, the second conductive unit 1320 may include a fourth part 1321 corresponding to a part of the first bezel unit 601, a fifth part 1322 corresponding to a part of the fourth bezel unit 604, and a sixth part 1323 connecting the fourth part 1321 and the fifth part 1322 and corresponding to the fourth corner unit C4. In FIG. 14, a part of the outside conductive structure 1401 has been illustrated, but the outside conductive structure 1401 may further include another conductive unit extending along a part of the side surface bezel structure 203.

According to an embodiment, some (e.g., the fifth conductive unit 1350) of the plurality of conductive units 1310, 1320, 1330, 1340, and 1350 may form an inside conductive structure. When viewed over the rear plate 202 (e.g., when viewed in a +z axis direction), for example, the inside conductive structure may be disposed in an inner area surrounded by the outside conductive structure 1401. The inside conductive structure may play an electromagnetic shielding role for electronic parts (e.g., the display 301, the first printed circuit substrate 441 (refer to FIG. 4) or the second printed circuit substrate 451). For example, the inside conductive structure may be electrically connected to a ground included in the first printed circuit substrate 441 and/or a ground included in the second printed circuit substrate 451. At least a part of the inside conductive structure may play a role as an electromagnetic shielding structure (or a ground structure) for reducing an electromagnetic influence (e.g., for reducing electromagnetic interference (EMI)) for elements included in the electronic device 200 (refer to FIG. 2). In an embodiment, a part of the inside conductive structure may play a role as an electrical path between elements.

According to an embodiment, at least a part of the first conductive unit 1310 may be disposed in the connection structure 500 of the first support member 410. At least a part of the first conductive unit 1310 may be disposed to be surrounded by the non-conductive unit 1200, for example. In an embodiment, the first conductive unit 1310 may not expand to a first internal surface 5001 of the connection structure 500 that faces a second internal surface 6001 of the side surface bezel structure 203. For example, the first internal surface 5001 may include a non-conductive surface by the non-conductive unit 1200. In an embodiment, the first conductive unit 1310 may be expanded to form a part of the first internal surface 5001 of the connection structure 500. Some of the outside conductive structure 1401, such as the second conductive unit 1320, the third conductive unit 1330 or the fourth conductive unit 1340, may be disposed using at least an identical or similar method as that of the first conductive unit 1310.

According to an embodiment, the electronic device 200 (refer to FIG. 2) may include at least one antenna, and wireless communication circuitry (e.g., the wireless communication module 192 in FIG. 1) electrically connected to the at least one antenna. The wireless communication circuitry may be disposed in the first printed circuit substrate 441 (refer to FIG. 4). The antenna may include at least one antenna radiator, a ground and/or a transmission line, for example. The at least one antenna radiator may form an electromagnetic field capable of transmitting and/or receiving a signal having at least one frequency in a selected or designated frequency band by being connected to the wireless communication circuitry. The at least one antenna radiator may include a conductive pattern disposed or included in the housing 210 (refer to FIG. 2) or a conductive pattern (e.g., a laser direct structuring (LDS) form, a flexible printed circuit board (FPCB) form, a form implemented as plating or printing, or a microstrip disposed in the first printed circuit substrate 441) disposed within the electronic device 200. The wireless communication circuitry may process a transmission signal and/or a reception signal in at least one designated frequency band through at least one antenna radiator. The designated frequency band may include at least one of a low band (LB) (about 600 MHz to about 1 GHz), a middle band (MB) (about 1 GHz to about 2.3 GHz), a high band (HB) (about 2.3 GHz to about 2.7 GHz) or an ultra-high band (UHB) (about 2.7 GHz to about 6 GHz), for example. The designated frequency band may include other various different frequency bands. The transmission line may electrically connect the wireless communication circuitry and the at least one antenna radiator, and may deliver a signal (voltage, current) having a radio frequency (RF). The transmission line may include an electrical path implemented as various forms of conductive structures or wiring that connect the wireless communication circuitry and the at least one antenna radiator, for example. The ground (or an antenna ground) may include a ground (e.g., a ground plane or a ground layer) disposed or included in the first printed circuit substrate 441, for example. The antenna may include a frequency adjustment circuit (e.g., a matching circuit) connected to a transmission line between the at least one antenna radiator and the wireless communication circuitry. The frequency adjustment circuit may include an electrical element having a component, such as inductance, capacitance or conductance that acts on the transmission line. In an embodiment, at least a part (e.g., the first conductive unit 1310, the second conductive unit 1320, the third conductive unit 1330 or the fourth conductive unit 1340) of the outside conductive structure 1401 included in the first support member 410 may be used as an antenna radiator. In an embodiment, the connection structure 500 may be an element included in the side surface bezel structure 203, not an element included in the first support member 410. In an embodiment, the side surface bezel structure 203 may be formed to include the connection structure 500. At least a part of the outside conductive structure 1401 used as the antenna radiator may be disposed or included in the side surface bezel structure 203.

According to an embodiment, the first conductive unit 1310 may operate as an antenna radiator by being electrically connected to the wireless communication circuitry (e.g., the wireless communication module 192 in FIG. 1) included in the electronic device 200 (refer to FIG. 2). For example, the flexible conductive member 4511 may be disposed in the second printed circuit substrate 451. The flexible conductive member 4511 may be electrically connected to the wireless communication circuitry disposed in the first printed circuit substrate 441 (refer to FIG. 4) through the electrical path 1101. The flexible conductive member 4511 may be electrically connected to the first conductive unit 1310. For example, the first conductive unit 1310 may include a conductive area 1315 not covered by the non-conductive unit 1200. The flexible conductive member 4511 may elastically come into contact with the conductive area 1315. The flexible conductive member 4511 may be various like a conductive clip (e.g., a conductive member including an elastic structure), a pogo pin, a spring, conductive poron, conductive rubber, a conductive tape or a conductive connector, for example. In an embodiment, although not illustrated, the first conductive unit 1310 may be electrically connected to a ground (e.g., a ground plane or a ground layer) included in the second printed circuit substrate 451 substantially in the same manner.

According to an embodiment, the second conductive unit 1320 may operate as an antenna radiator by being electrically connected to wireless communication circuitry (e.g., the wireless communication module 192 in FIG. 1) substantially in the same manner as the first conductive unit 1310. The wireless communication circuitry may transmit or receive a signal in a frequency band at least a part of which is identical with or different from that of the first conductive unit 1310 and the second conductive unit 1320, for example.

According to an embodiment, the wireless communication circuitry (e.g., the wireless communication module 192 in FIG. 1) may be configured to transmit, to the outside, a signal that passes through at least a part of the side surface bezel structure 203 or to receive a signal from the outside through the first conductive unit 1310 or the second conductive unit 1320.

According to an embodiment (refer to FIG. 13), the first conductive unit 1310 operating as an antenna radiator may be formed in a form corresponding to a first fastening structure 1500, including a hook 1501 and a hook fastening unit 1502. The hook 1501 in FIG. 13 may be a hook corresponding to line A-A' in FIG. 12 among the plurality of hooks 630 in FIG. 6. The hook fastening unit 1502 in FIG. 13 may be a hook fastening unit corresponding to line A-A' in FIG. 12 among the plurality of hook fastening units 530 in FIG. 6. The first conductive unit 1310 used as an antenna radiator may be formed in a form corresponding to the first fastening structure 1500 in a limited design area (e.g., the connection structure 500). For example, as a location of the first fastening structure 1500 isolated from the display 301 in a first direction (e.g., a −z axis direction) from the front plate 201 to the rear plate 202 becomes distant, it may be easy to implement the first conductive unit 1310 used as an antenna radiator in a limited design area (e.g., the connection structure 500) in a way to have a form isolated from the display 301. As at least a part of the first conductive unit 1310 is far away from the display 301, antenna radiation performance can be secured because an electromagnetic influence (e.g., an antenna gain loss, noise, electromagnetic interference or crosstalk attributable to a close conductor) of the display 301 on the first conductive unit 1310 is reduced. For example, the illustrated first fastening structure 1500 is a first fastening structure having a first height, and may be disposed at the first height in a first direction (e.g., the −z axis direction) from the front plate 201 to the rear plate 202 (refer to FIG. 4). The first fastening structure 1500 having the first height may contribute to easily implementing the first conductive unit 1310 so that the first conductive unit 1310 can have a form isolated from the display 301 in a limited design area (e.g., the connection structure 500), compared to a comparison example in which the first fastening structure 1500 is implemented as a first fastening structure having a second height smaller than the first height. The size of the first conductive unit 1310 may be reduced in a limited design area (e.g., the connection structure 500), but this may make it difficult to form durability or a desired resonant frequency. The first fastening structure having the first height may facilitate an implementation of the first conductive unit 1310 by securing the size or durability of the first conductive unit 1310. The first fastening structure 1500 having the first height may contribute to securing coupling durability between the connection structure 500 and the side surface bezel structure 203, compared to a comparison example in which the first fastening structure 1500 having the first height is omitted. If all of the plurality of first fastening structures is implemented as the first fastening structure 1500 having the first height, coupling durability between the connection structure 500 and the side surface bezel structure 203 may be degraded. Accordingly, the first fastening structure having the second height may be applied to a first fastening structure at a location that does not substantially affect antenna radiation performance. For example, referring to FIG. 14, when viewed over the front 210A (e.g., when viewed in the −z axis direction), the outside conductive structure 1401 may partially overlap the display assembly 700. Upon such overlap, the first fastening structure having the first height can facilitate an implementation of an antenna radiator (e.g., the first conductive unit 1310 or the second conductive unit 1320) included in the outside conductive structure 1401 so that an electromagnetic influence from the display assembly 700 can be reduced. If a screen visible through the front 210A is further expanded compared to the illustrated example, when viewed over the front 210A, an area where the outside conductive structure 1401 and the display assembly 700 overlap may be further increased. Even in this case, the first fastening structure having the first height can facilitate an implementation of an antenna radiator included in the outside conductive structure 1401 so that an electromagnetic influence from the display assembly 700 can be reduced. The first height may be various values greater than the second height.

Figure 16:
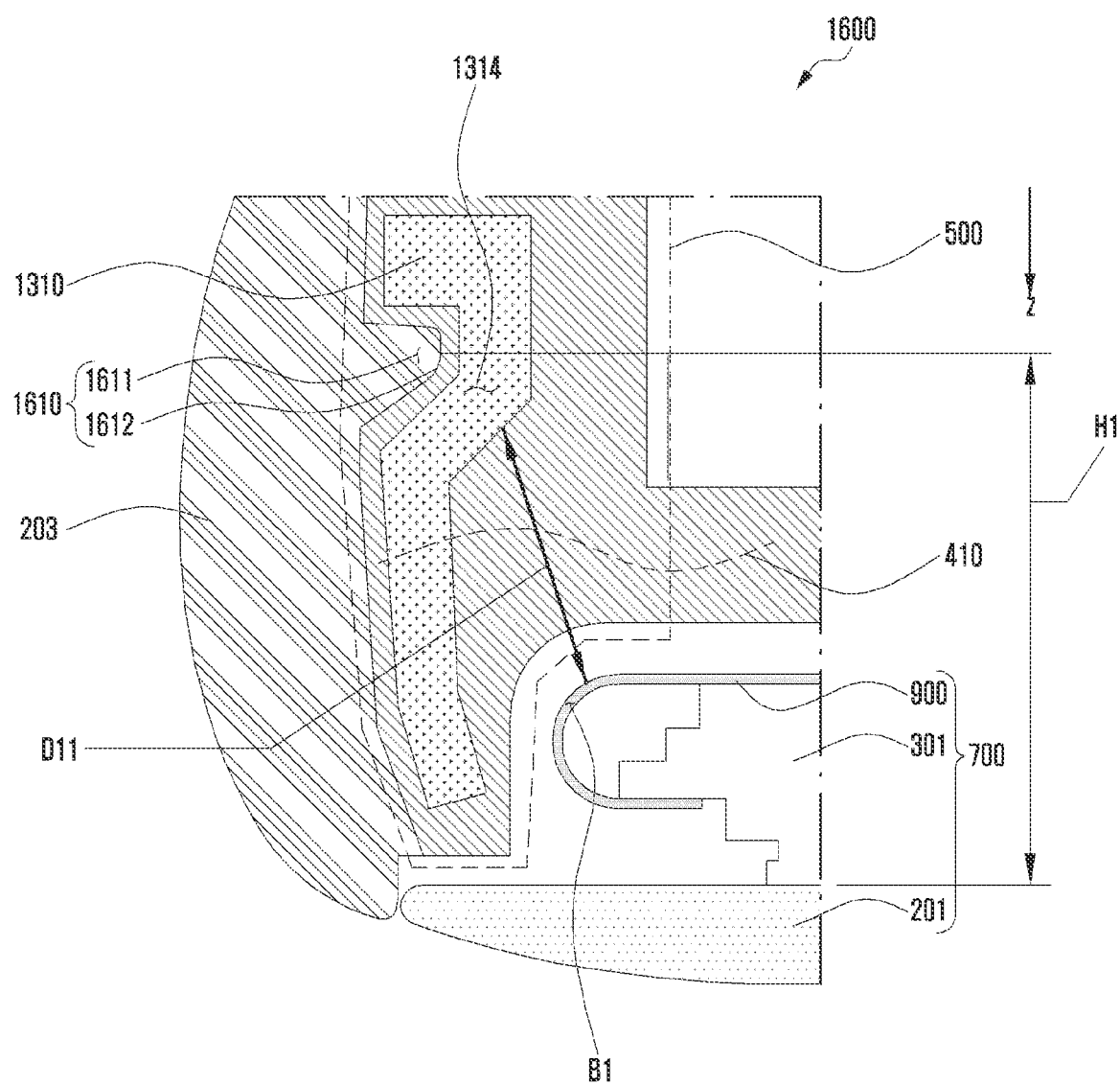
FIG. 16 is a cross-sectional view taken along line D-D' in FIG. 11 according to various embodiments.
Figure 17:
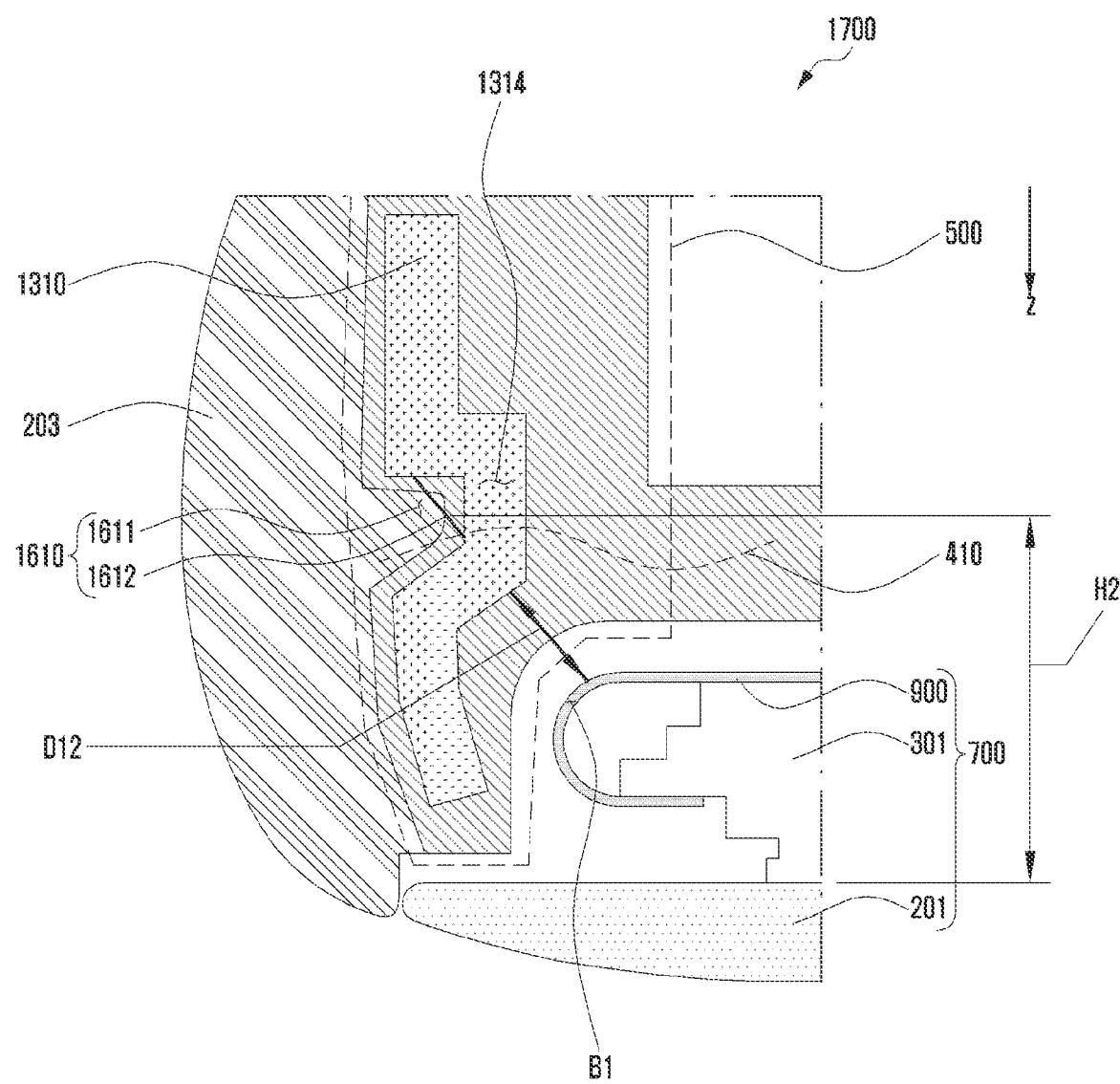
FIG. 17 is a cross-sectional view taken along line D-D' in FIG. 11 according to various embodiments.
Figure 18:
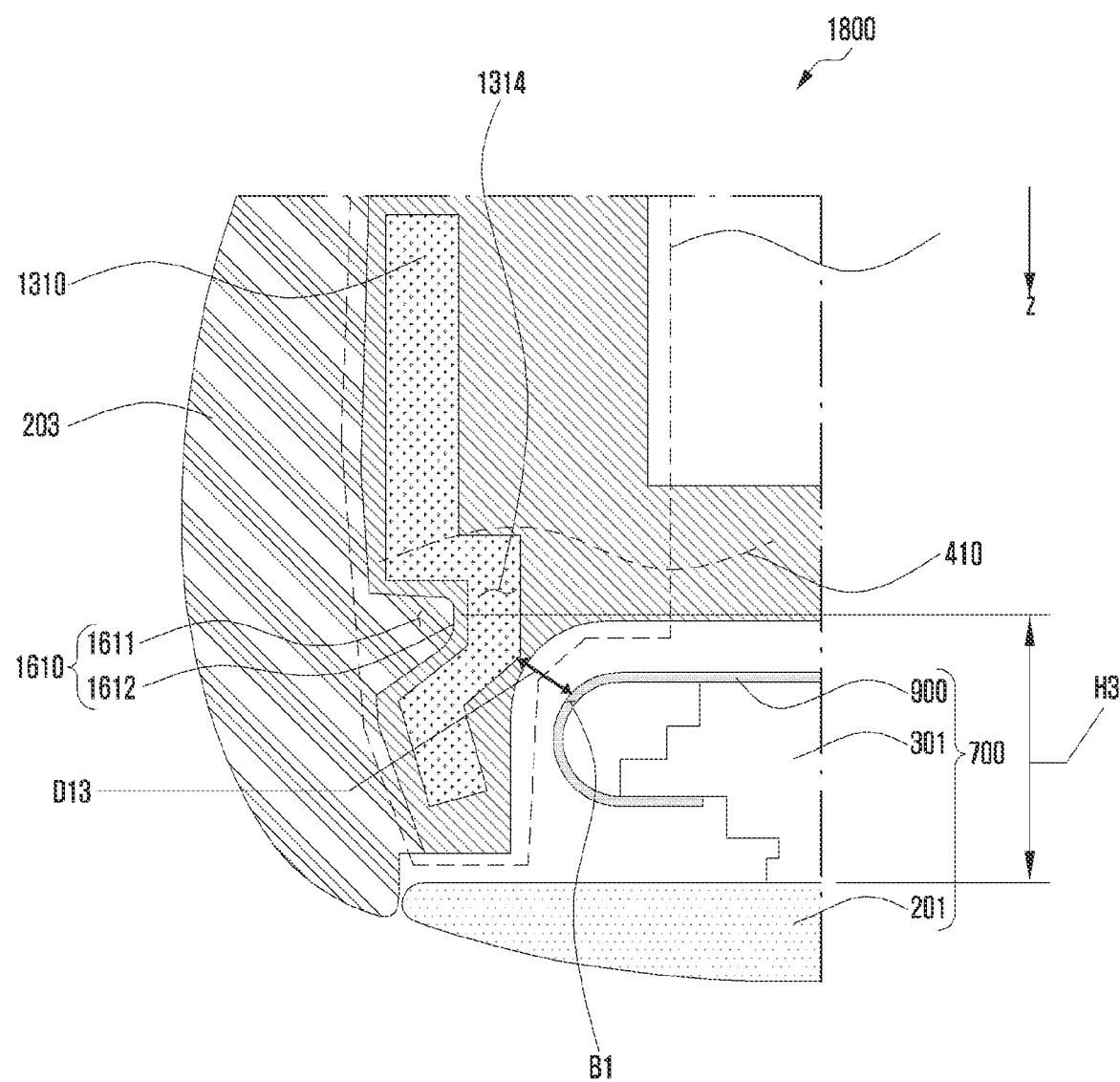
FIG. 18 is a cross-sectional view taken along line D-D' in FIG. 11 according to various embodiments.

FIG. 16 is a cross-sectional view 1600 taken along line D-D' in FIG. 11 according to various embodiments. FIG. 17 is a cross-sectional view 1700 taken along line D-D' in FIG. 11 according to various embodiments. FIG. 18 is a cross-sectional view 1800 taken along line D-D' in FIG. 11 according to various embodiments.

The cross-section structure 1600 in FIG. 16 illustrates a case where a first fastening structure 1610 disposed in accordance with the fourth corner unit C4 and including a hook 1611 and a hook fastening unit 1612 is formed at a first height H1 from the front plate 201 (or a surface where the display 301 is disposed in the front plate 201) to a −z axis direction, for example. The cross-section structure 1700 in FIG. 17 illustrates a case where the first fastening structure 1610 disposed in accordance with the fourth corner unit C4 is formed at a second height H2 less than the first height H1 from the front plate 201 to the −z axis direction, for example. The cross-section structure 1800 in FIG. 18 illustrates a case where the first fastening structure 1610 disposed in accordance with the fourth corner unit C4 is formed at a third height H3 less than the second height H2 from the front plate 201 to the −z axis direction, for example. In an embodiment, as the height by which the first fastening structure 1610 is isolated from the front plate 201 is increased, a part 1324 of the second conductive unit 1320, which corresponds to the first fastening structure 1610, can be easily implemented in a form isolated from the film substrate 900 (or the first bending area B1 of the film substrate 900) included in the display assembly 700 at a long distance. For example, an isolation distance indicated by reference numeral "D11" is the shortest distance by which the part 1324 of the second conductive unit 1320 corresponding to the first fastening structure 1610 has been isolated from the first bending area B1, and may be about 0.4 mm to about 0.6 mm. For example, an isolation distance indicated by reference numeral "D12" is the shortest distance by which the part 1324 of the second conductive unit 1320 corresponding to the first fastening structure 1610 has been isolated from the first bending area B1, and may be about 0.3 mm to about 0.2 mm. For example, an isolation distance indicated by reference numeral "D13" is the shortest distance by which the part 1324 of the second conductive unit 1320 corresponding to the first fastening structure 1610 has been isolated from the first bending area B1, and may be about 0.1 mm to about 0.05 mm. As the height by which the first fastening structure 1610 is isolated from the front plate 201 is increased, it may be easy to implement the second conductive unit 1320 in a limited design area (e.g., the connection structure 500) in a way to have a form isolated from the display assembly 700. As at least a part of the second conductive unit 1320 is far away from the display assembly 700, antenna radiation performance can be secured because an electromagnetic influence (e.g., an antenna gain loss, noise, electromagnetic interference (EMI) or crosstalk attributable to a close conductor) of the display assembly 700 on the second conductive unit 1320 is reduced.

Figure 19:
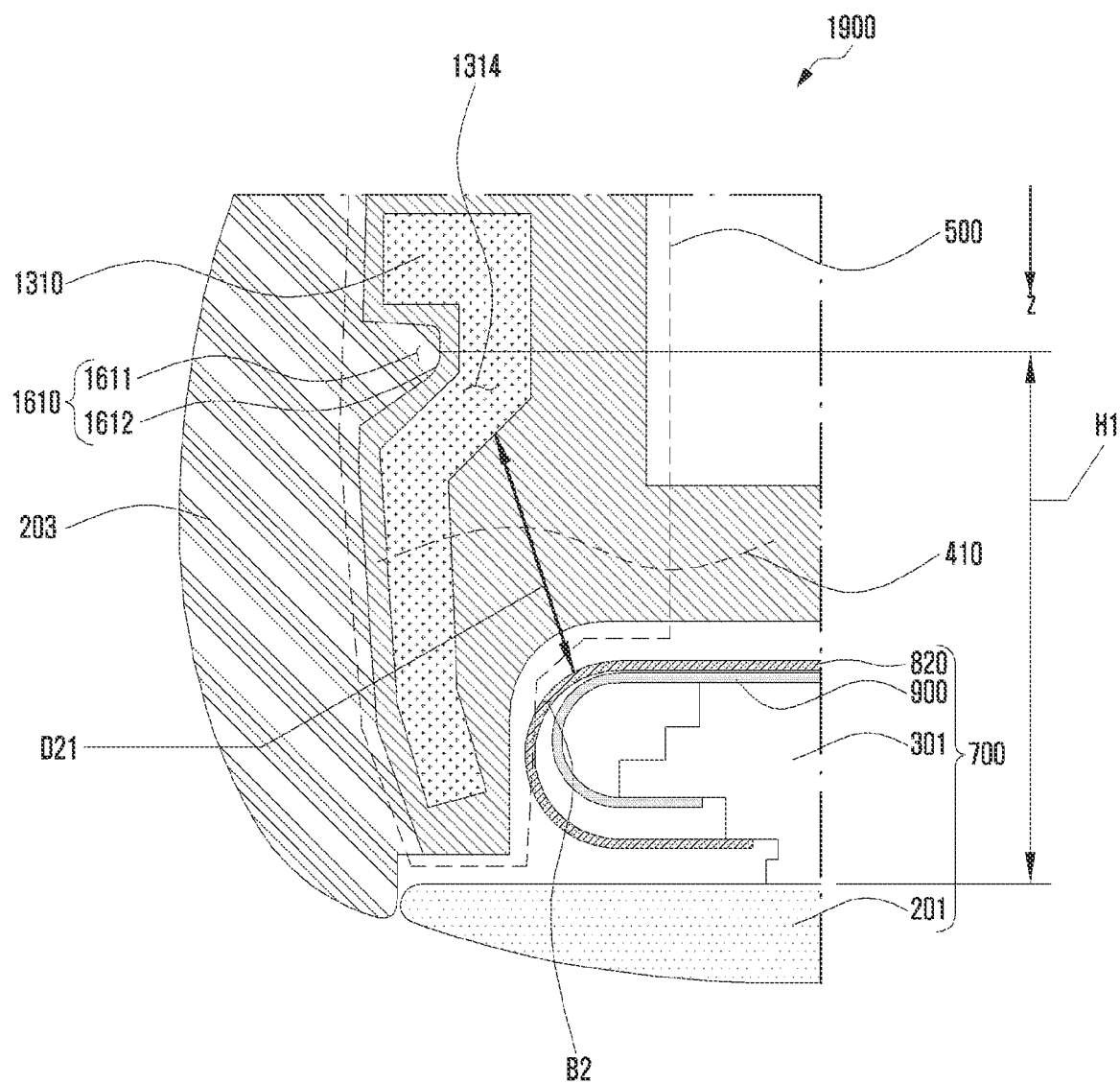
FIG. 19 is a cross-sectional view taken along line C-C' in FIG. 11 according to various embodiments.
Figure 20:
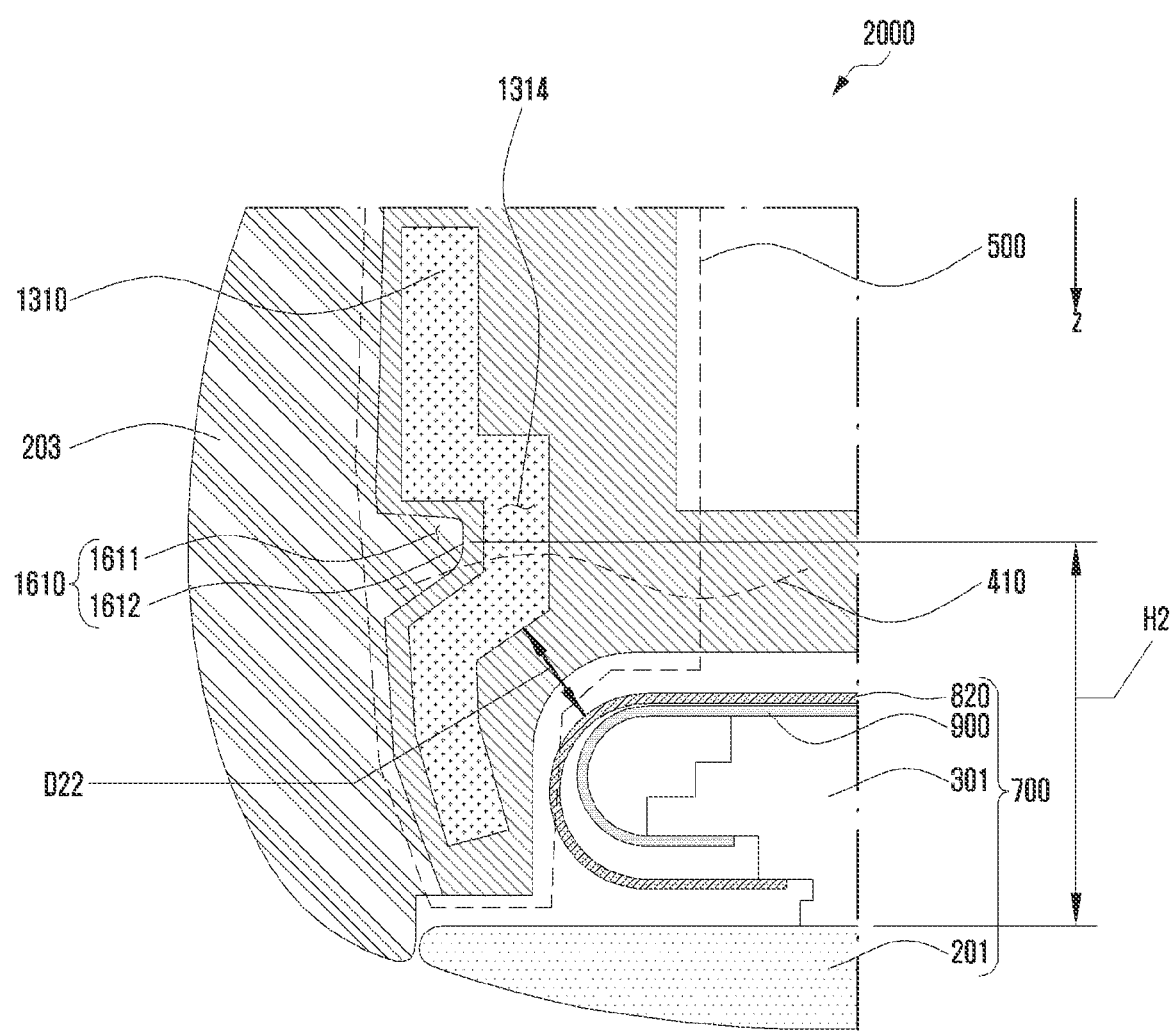
FIG. 20 is a cross-sectional view taken along line C-C' in FIG. 11 according to various embodiments.
Figure 21:
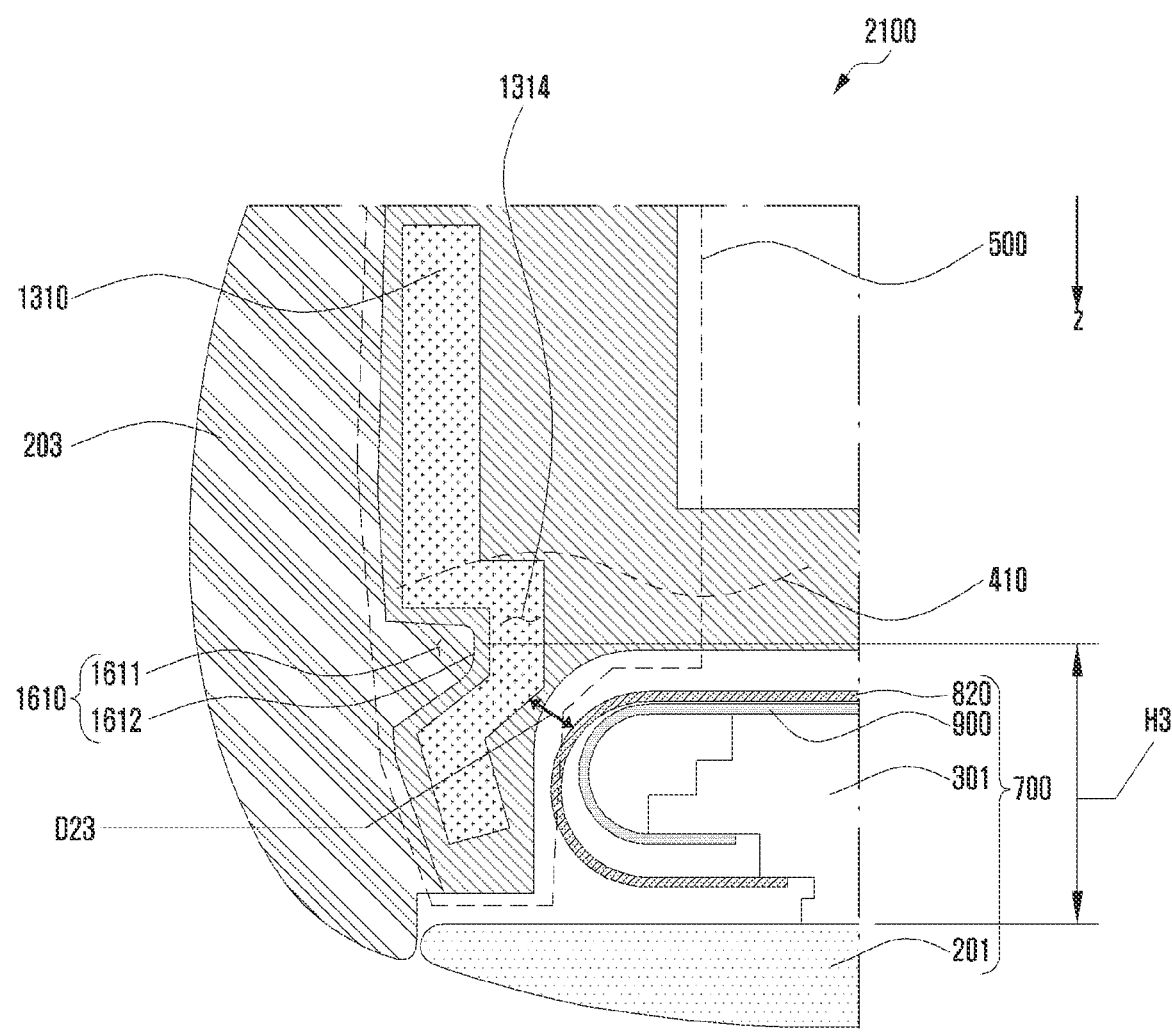
FIG. 21 is a cross-sectional view taken along line C-C' in FIG. 11 according to various embodiments.

FIG. 19 is a cross-sectional view 1900 taken along line C-C' in FIG. 11 according to various embodiments. FIG. 20 is a cross-sectional view 2000 taken along line C-C' in FIG. 11 according to various embodiments. FIG. 21 is a cross-sectional view 2100 taken along line C-C' in FIG. 11 according to various embodiments.

The cross-section structure 1900 in FIG. 19 illustrates a case where a first fastening structure 1610 disposed in accordance with the first corner unit C1 and including a hook 1611 and a hook fastening unit 1612 has been formed at a first height H1 from the front plate 201 to a –z axis direction, for example. The cross-section structure 2100 of FIG. 20 illustrates a case where the first fastening structure 1610 disposed in accordance with the first corner unit C1 has been formed at a second height H2 less than the first height H1 from the front plate 201 to the –z axis direction, for example. The cross-section structure 2100 in FIG. 21 illustrates a case where the first fastening structure 1610 disposed in accordance with the first corner unit C1 has been formed at a third height H3 less than the second height H2 from the front plate 201 to the –z axis direction, for example. In an embodiment, as the height by which the first fastening structure 1610 has been isolated from the front plate 201 is increased, it may be easy to implement a part 1314 of the first conductive unit 1310, which corresponds to the first fastening structure 1610, in a form isolated from the second printed circuit substrate 820 (or the second bending area B2 of the second printed circuit substrate 820) included in the display assembly 700 at a long distance. For example, an isolation distance indicated by reference numeral "D21" is the shortest distance by which the part 1314 of the first conductive unit 1310 corresponding to the first fastening structure 1610 has been isolated from the first bending area B1, and may be about 0.4 mm to about 0.6 mm. For example, an isolation distance indicated by reference numeral "D22" is the shortest distance by which the part 1314 of the first conductive unit 1310 corresponding to the first fastening structure 1610 has been isolated from the first bending area B1, and may be about 0.3 mm to about 0.2 mm. For example, an isolation distance indicated by reference numeral "D23" is the shortest distance by which the part 1314 of the first conductive unit 1310 corresponding to the first fastening structure 1610 has been isolated from the first bending area B1, and may be about 0.1 mm to about 0.05 mm. As the height by which the first fastening structure 1610 has been isolated from the front plate 201 is increased, it may be easy to implement the first conductive unit 1310 in a limited design area (e.g., the connection structure 500) in a way to have a form isolated from the display assembly 700. As at least a part of the first conductive unit 1310 is far away from the display assembly 700, antenna radiation performance can be secured because an electromagnetic influence (e.g., an antenna gain loss, noise, electromagnetic interference (EMI) or crosstalk attributable to a close conductor) of the display assembly 700 on the first conductive unit 1310 is reduced.

Figure 22:
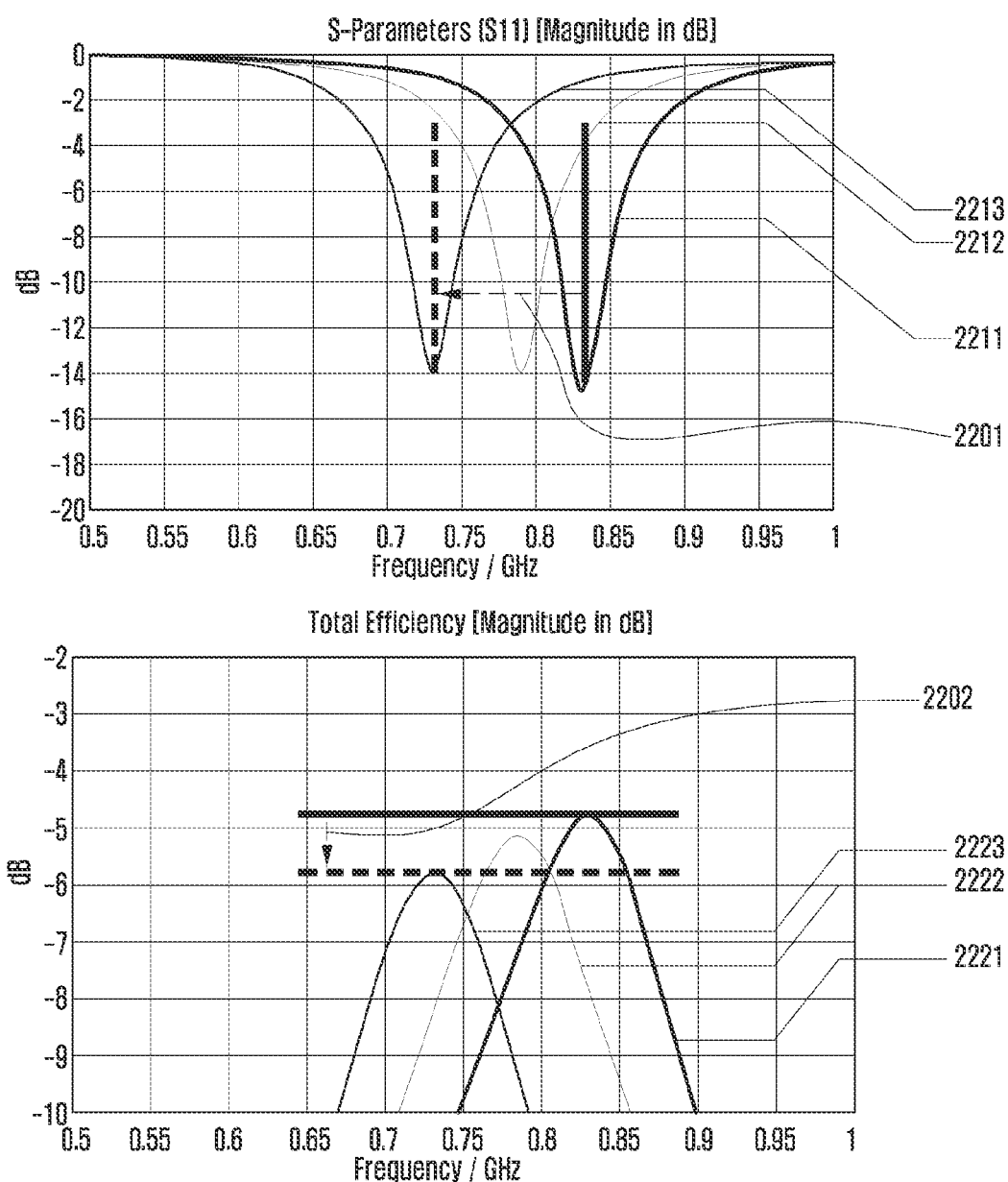
FIG. 22 is a graph illustrating reflection coefficients and a graph illustrating radiation efficiency in a frequency distribution of a low band (LB) in relation to a second antenna including a second conductive unit in the examples illustrated in FIGS. 16, 17, and 18 or a first antenna including a first conductive unit in the examples illustrated in FIGS. 19, 20, and 21 according to various embodiments.

FIG. 22 is a graph illustrating reflection coefficients S11 and a graph illustrating radiation efficiency in a frequency distribution of the low band (LB) in relation to the second antenna including the second conductive unit 1320 in the examples illustrated in FIGS. 16, 17, and 18 or the first antenna including the first conductive unit 1310 in the examples illustrated in FIGS. 19, 20, and 21 according to various embodiments.

With reference to FIG. 22, in the graph illustrating the reflection coefficients, reference numeral "2211" illustrates reflection coefficients about the example of FIG. 16 or the example of FIG. 19, reference numeral "2212" illustrates reflection coefficients about the example of FIG. 17 or the example of FIG. 20, and reference numeral "2213" illustrates reflection coefficients about the example of FIG. 18 or the example of FIG. 21. In the graph illustrating the radiation efficiency, reference numeral "2221" illustrates reflection coefficients about the example of FIG. 16 or the example of FIG. 19, reference numeral "2222" illustrates reflection coefficients about the example of FIG. 17 or the example of FIG. 20, and reference numeral "2223" illustrates reflection coefficients about the example of FIG. 18 or the example of FIG. 21.

In an embodiment, referring to FIGS. 16, 17, 18, and 22, when the second conductive unit 1320 is implemented in a form isolated from the film substrate 900 (or the first bending area B1 of the film substrate 900) included in the display assembly 700 at a long distance based on the first fastening structure 1610, in the LB, a resonant frequency may be adjusted to be upward moved by about 100 MHz and included in a configured or designated resonant frequency band (refer to reference numeral "2201"). Radiation efficiency of the second antenna including the second conductive unit 1320 can be improved about 1 dB (refer to reference numeral "2202").

In an embodiment, referring to FIGS. 19, 20, 21, and 22, when the first conductive unit 1310 is implemented in a form isolated from the second flexible printed circuit substrate 820 (or the second bending area B2 of the second flexible printed circuit substrate 820) included in the display assembly 700 at a long distance based on the first fastening structure 1610, in the LB, a resonant frequency may be adjusted to be upward moved by about 100 MHz and included in a configured or designated resonant frequency band (refer to reference numeral "2201"). Radiation efficiency of the first antenna including the first conductive unit 1310 can be improved about 1 dB (refer to reference numeral "2202").

Figure 23:
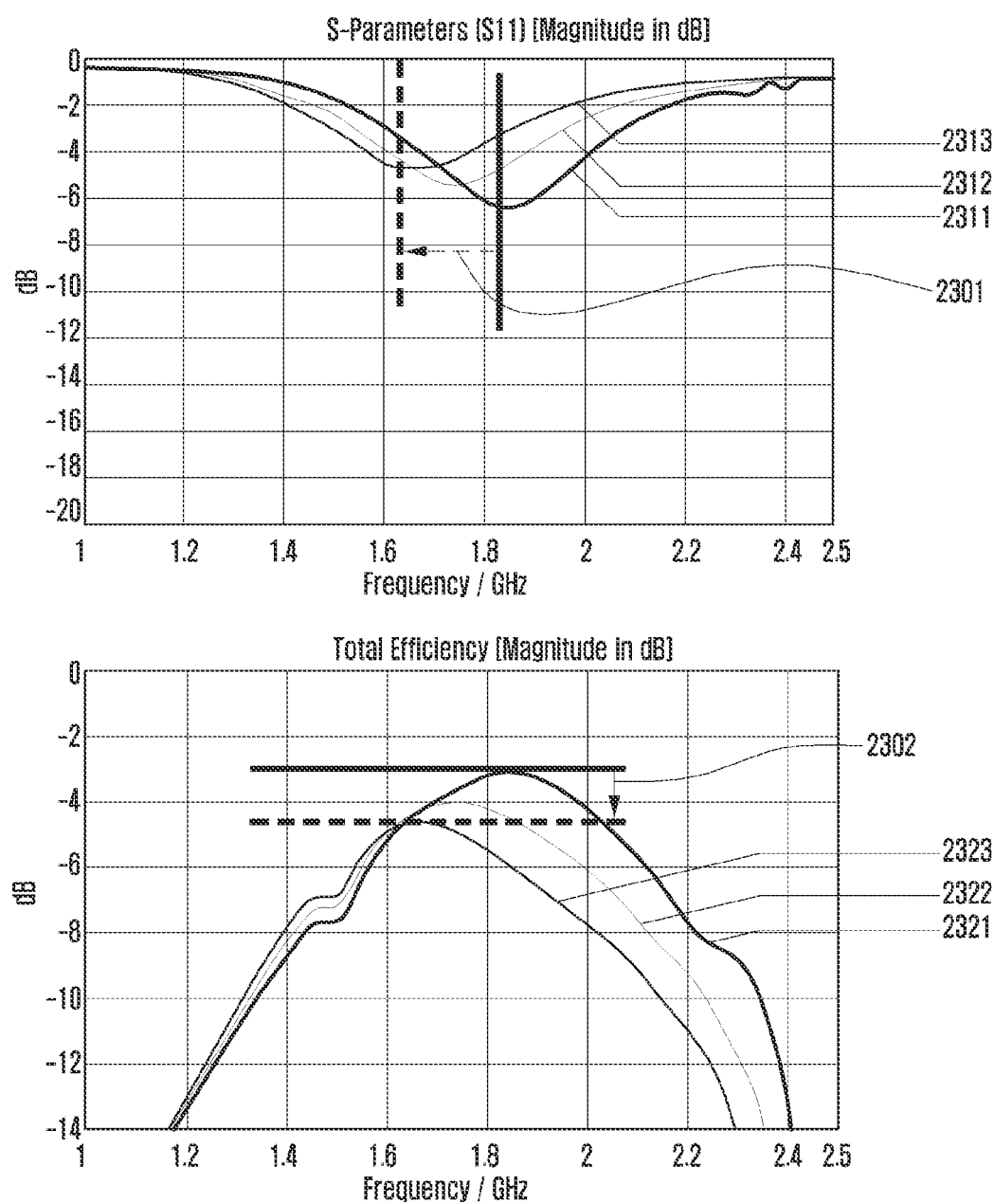
FIG. 23 is a graph illustrating reflection coefficients and a graph illustrating radiation efficiency in a frequency distribution of a middle band (MB) in relation to the second antenna including the second conductive unit in the examples illustrated in FIGS. 16, 17, and 18 or the first antenna including the first conductive unit in the examples illustrated in FIGS. 19, 20, and 21 according to various embodiments.

FIG. 23 is a graph illustrating reflection coefficients Sl1 and a graph illustrating radiation efficiency in a frequency distribution of the middle band (MB) in relation to the second antenna including the second conductive unit 1320 in the examples illustrated in FIGS. 16, 17, and 18 or the first antenna including the first conductive unit 1310 in the examples illustrated in FIGS. 19, 20, and 21 according to various embodiments.

With reference to FIG. 23, in the graph illustrating reflection coefficients, reference numeral "2311" illustrates reflection coefficients about the example of FIG. 16 or the example of FIG. 19, reference numeral "2312" illustrates reflection coefficients about the example of FIG. 17 or the example of FIG. 20, and reference numeral "2313" illustrates reflection coefficients about the example of FIG. 18 or the example of FIG. 21. In the graph illustrating radiation efficiency, reference numeral "2321" illustrates reflection coefficients about the example of FIG. 16 or the example of FIG. 19, reference numeral "2322" illustrates reflection coefficients about the example of FIG. 17 or the example of FIG. 20, and reference numeral "2323" illustrates reflection coefficients about the example of FIG. 18 or the example of FIG. 21.

In an embodiment, referring to FIGS. 16, 17, 18, and 23, when the second conductive unit 1320 is implemented in a form isolated from the film substrate 900 (or the first bending area B1 of the film substrate 900) included in the display assembly 700 at a long distance based on the first fastening structure 1610, in the MB, a resonant frequency may be adjusted to be upward moved by about 100 MHz and included in a configured or designated resonant frequency band (refer to reference numeral "2301"). Radiation efficiency of the second antenna including the second conductive unit 1320 can be improved about 1.5 dB (refer to reference numeral "2302").

In an embodiment, referring to FIGS. 19, 20, 21, and 23, when the first conductive unit 1310 is implemented in a form isolated from the second flexible printed circuit substrate 820 (or the second bending area B2 of the second flexible printed circuit substrate 820) included in the display assembly 700 at a long distance based on the first fastening structure 1610, in the MB, a resonant frequency may be adjusted to be upward moved by about 100 MHz and included in a configured or designated resonant frequency band (refer to reference numeral "2301"). Radiation efficiency of the first antenna including the first conductive unit 1310 can be improved about 1.5 dB (refer to reference numeral "2302").

Figure 24:
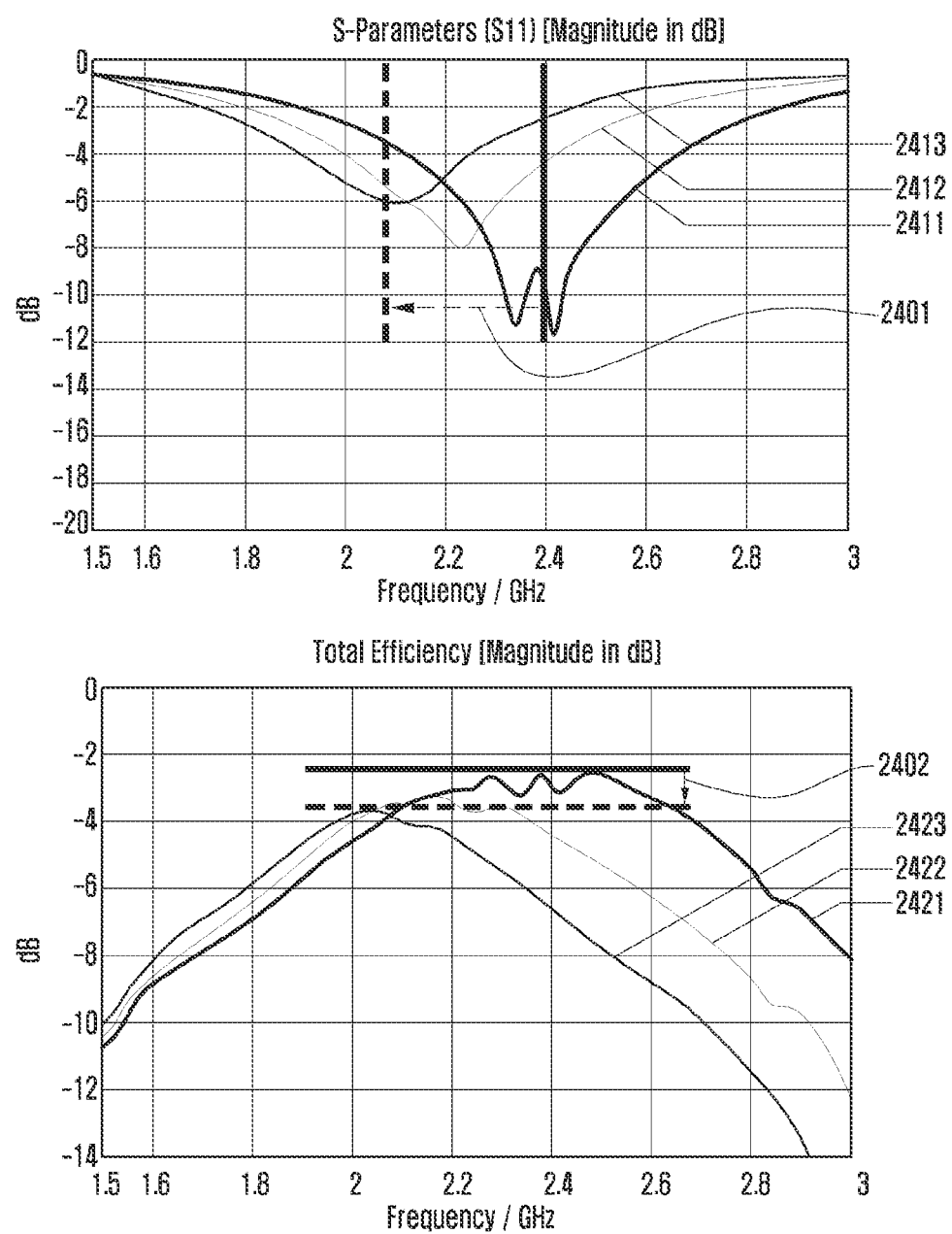
FIG. 24 is a graph illustrating reflection coefficients and a graph illustrating radiation efficiency in a frequency distribution of a high band (HB) in relation to the second antenna including the second conductive unit in the examples illustrated in FIGS. 16, 17, and 18 or the first antenna including the first conductive unit in the examples illustrated in FIGS. 19, 20, and 21 according to various embodiments.

FIG. 24 is a graph illustrating reflection coefficients S11 and a graph illustrating radiation efficiency in a frequency distribution of a high band (HB) in relation to the second antenna including the second conductive unit 1320 in the examples illustrated in FIGS. 16, 17, and 18 or the first antenna including the first conductive unit 1310 in the examples illustrated in FIGS. 19, 20, and 21 according to various embodiments.

With reference to FIG. 24, in the graph illustrating reflection coefficients, reference numeral "2411" illustrates reflection coefficients about the example of FIG. 16 or the example of FIG. 19, reference numeral "2412" illustrates reflection coefficients about the example of FIG. 17 or the example of FIG. 20, and reference numeral "2413" illustrates reflection coefficients about the example of FIG. 18 or the example of FIG. 21. In the graph illustrating radiation efficiency, reference numeral "2421" illustrates reflection coefficients about the example of FIG. 16 or the example of FIG. 19, reference numeral "2422" illustrates reflection coefficients about the example of FIG. 17 or the example of FIG. 20, and reference numeral "2423" illustrates reflection coefficients about the example of FIG. 18 or the example of FIG. 21.

In an embodiment, referring to FIGS. 16, 17, 18, and 24, when the second conductive unit 1320 is implemented in a form isolated from the film substrate 900 (or the first bending area B1 of the film substrate 900) included in the display assembly 700 at a long distance based on the first fastening structure 1610, in the HB, a resonant frequency may be adjusted to be upward moved by about 270 MHz and included in a configured or designated resonant frequency band (refer to reference numeral "2401"). Radiation efficiency of the second antenna including the second conductive unit 1320 can be improved about 1 dB (refer to reference numeral "2402").

In an embodiment, referring to FIGS. 19, 20, 21, and 24, when the first conductive unit 1310 is implemented in a form isolated from the second flexible printed circuit substrate 820 (or the second bending area B2 of the second flexible printed circuit substrate 820) included in the display assembly 700 at a long distance based on the first fastening structure 1610, in the HB, a resonant frequency may be adjusted to be upward moved by about 270 MHz and included in a configured or designated resonant frequency band (refer to reference numeral "2401"). Radiation efficiency of the first antenna including the first conductive unit 1310 can be improved about 1 dB (refer to reference numeral "2402").

Figure 25:
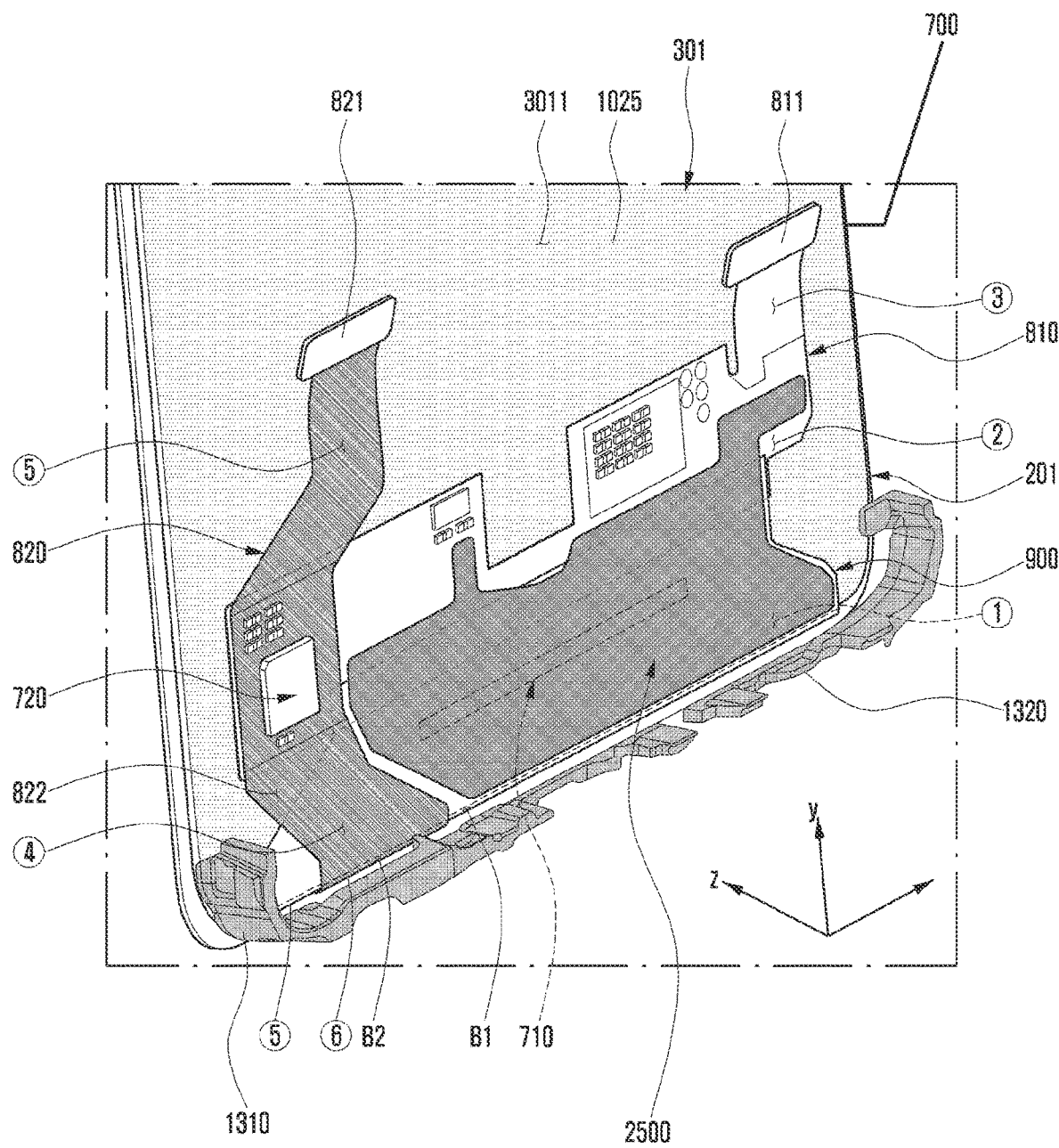
FIG. 25 is a partial perspective view illustrating a display assembly, a first conductive unit, and a second conductive unit according to various embodiments.

FIG. 25 is a partial perspective view illustrating the display assembly 700, the first conductive unit 1310, and the second conductive unit 1320 according to various embodiments.

With reference to FIG. 25, in an embodiment, the display assembly 700 may further include a first conductive sheet 2500 compared to the example of FIG. 8. The first conductive sheet 2500 may face and overlap the first substrate area ① and may be disposed in the first substrate area ①. The display driving circuit 710 disposed in the first substrate area ① may be covered by the first conductive sheet 2500. In an embodiment, the first conductive sheet 2500 may extend to the second substrate area ② and may be combined with the second substrate area ②. In an embodiment, the first conductive sheet 2500 may not extend to the second substrate area ②.

According to an embodiment, the first conductive sheet 2500 may play an EMI shielding role. For example, the first conductive sheet 2500 can reduce a loss or deformation of a signal delivered through the film substrate 900 and the first flexible printed circuit substrate 810 by shielding noise. For example, the first conductive sheet 2500 may contribute to preventing noise from being delivered to the display driving circuit 710. For example, the first conductive sheet 2500 can reduce an electromagnetic influence of a signal, delivered through the film substrate 900, on the first conductive unit 1310 or the second conductive unit 1320 operating as an antenna radiator. The first conductive sheet 2500 may include various conductive materials for electromagnetic shielding or absorption.

According to an embodiment, the first conductive sheet 2500 may not be electrically connected to the film substrate 900 or the first printed circuit substrate 810.

According to an embodiment, the first conductive sheet 2500 may be electrically connected to a ground (e.g., a ground plane or a ground layer) included in the film substrate 900. For example, the film substrate 900 may include a first conductive pattern (not illustrated) formed on a surface of the first substrate area ①. The first conductive pattern may be electrically connected to the ground plane included in the film substrate 900 through wiring included in the film substrate 900. In an embodiment, the first conductive pattern may be a part of the ground plane included in the film substrate 900. A part of the first conductive sheet 2500, which is disposed in the first substrate area ① of the film substrate 900, may be electrically connected to the second conductive pattern.

According to an embodiment, the first conductive sheet 2500 may be electrically connected to a ground (e.g., a ground plane or a ground layer) included in the first flexible printed circuit substrate 810. For example, the first flexible printed circuit substrate 810 may include a second conductive pattern (not illustrated) formed on a surface of the second substrate area ②. The second conductive pattern may be electrically connected to the ground plane included in the first flexible printed circuit substrate 810 through wiring, such as a conductive via included in the first flexible printed circuit substrate 810. In an embodiment, the second conductive pattern may be a part of the ground plane included in the first flexible printed circuit substrate 810. A part of the first conductive sheet 2500, which is disposed in the second substrate area ② of the first flexible printed circuit substrate 810, may be electrically connected to the second conductive pattern.

According to an embodiment, the first conductive sheet 2500 may include a conductive tape. In an embodiment, an adhesive material (e.g., a non-conductive adhesive material or a conductive adhesive material) may be disposed between the first conductive sheet 2500 and the first substrate area ① and between the first conductive sheet 2500 and the second substrate area ②. In an embodiment, a conductive layer that replaces the first conductive sheet 2500 may be implemented using various methods, such as printing, coating or deposition. In an embodiment, the first conductive sheet 2500 may have a form in which a plurality of conductive layers is stacked.

According to an embodiment, when viewed over the back 3011 of the display 301 (e.g., in a +z axis direction), the first conductive sheet 2500 may not overlap the fourth substrate area ④ and fifth substrate area ⑤ of the second printed circuit substrate 820.

Figure 26:
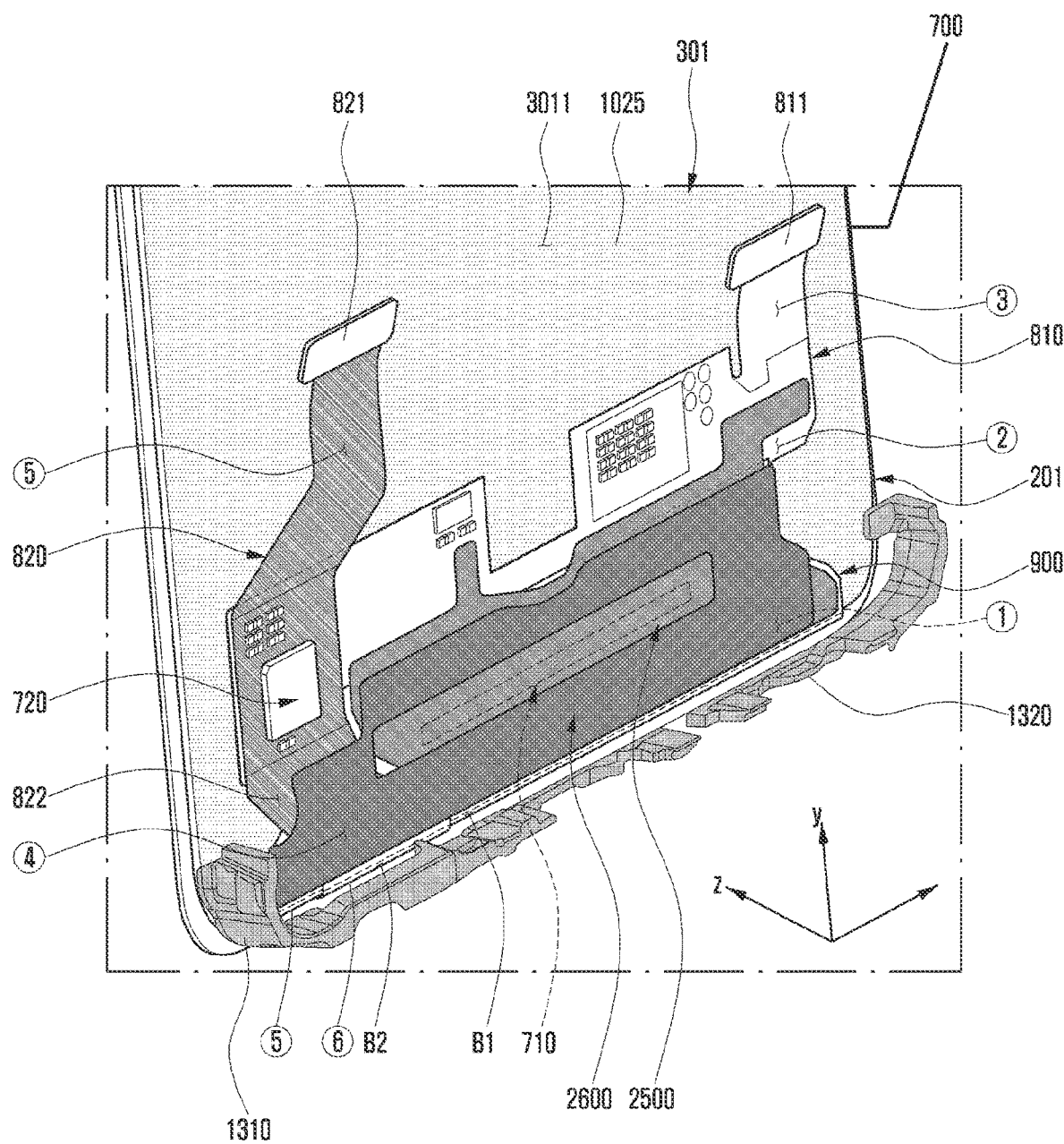
FIG. 26 is a partial perspective view illustrating the display assembly, a second conductive sheet, the first conductive unit, and the second conductive unit according to various embodiments.
Figure 27:
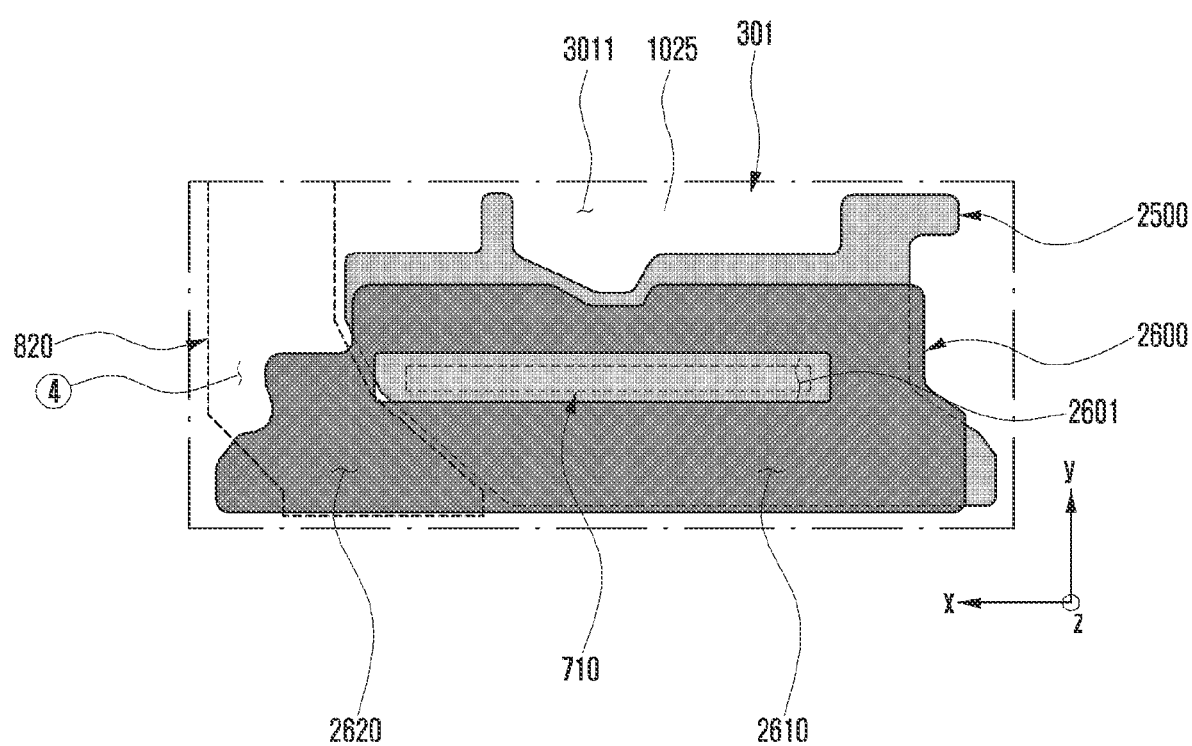
FIG. 27 is a diagram illustrating a part of the electronic device when viewed over a rear plate in FIG. 3 according to various embodiments.

FIG. 26 is a partial perspective view illustrating the display assembly 700, a second conductive sheet 2600, the first conductive unit 1310, and the second conductive unit 1320 according to various embodiments. FIG. 27 is a diagram illustrating a part of the electronic device 200 when viewed over the rear plate 202 in FIG. 3 according to various embodiments.

With reference to FIGS. 26 and 27, in an embodiment, the second conductive sheet 2600 (refer to FIG. 26) may be disposed in the first support member 410 (refer to FIG. 7). When viewed over the front plate 201 (e.g., when viewed in a −z axis direction), the second conductive sheet 2600 may include a first conductive area 2610 at least some of which overlaps the first conductive sheet 2500. When viewed over the front plate 201, the second conductive sheet 2600 may include a second conductive area 2620 extending from the first conductive area 2610 and having at least some thereof overlapping the fourth substrate area ④ of the second printed circuit substrate 820. In an embodiment, when viewed over the front plate 201, at least a part of the second conductive area 2620 may overlap the touch controller IC 720.

According to an embodiment, the second conductive sheet 2600 may include an opening 2601 corresponding to the display driving circuit 710 when viewed over the front plate 201 (e.g., when viewed in a −z axis direction). The display driving circuit 710 may have a height protruding with respect to the first substrate area ①. The opening 2601 may contribute to reducing a gap between the display assembly 700 and the first support member 410 (refer to FIG. 7).

Figure 28:
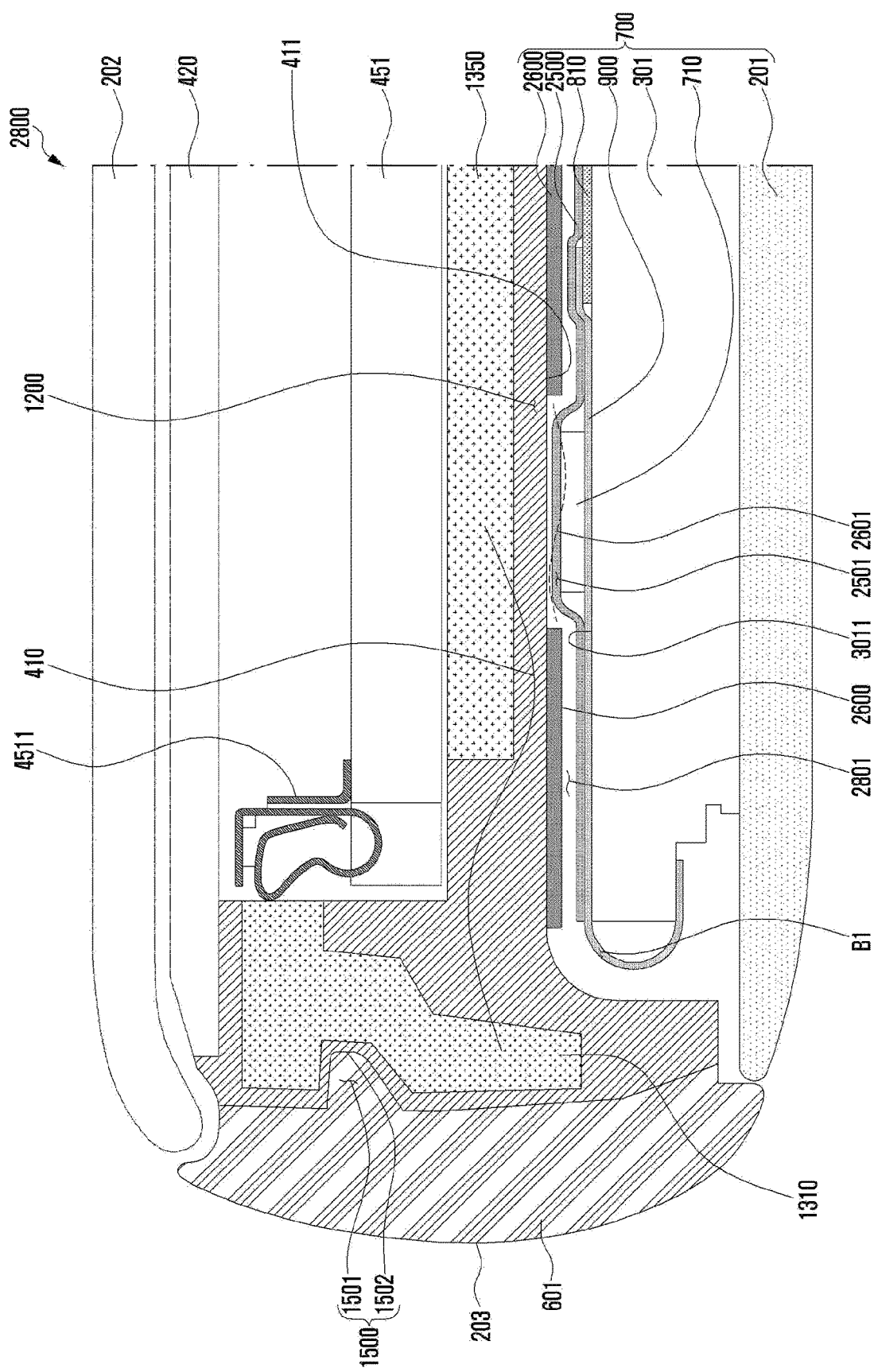
FIG. 28 is a cross-sectional view of a y-z plane illustrating a part of the electronic device taken along line B-B' in FIG. 12 according to various embodiments.
Figure 29:
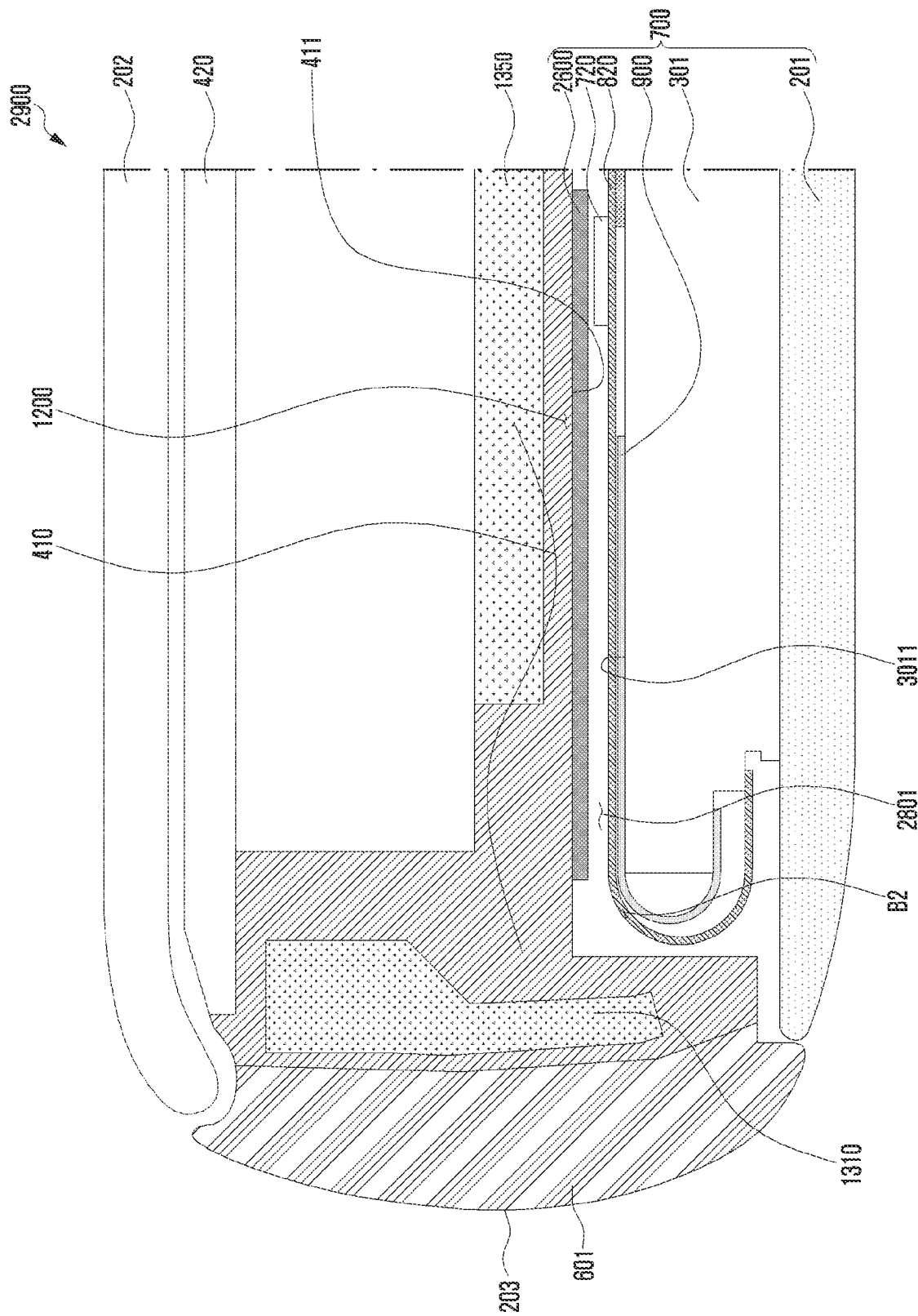
FIG. 29 is a cross-sectional view illustrating a part of the electronic device taken along line E-E' in FIG. 12 according to various embodiments.
Figure 30:
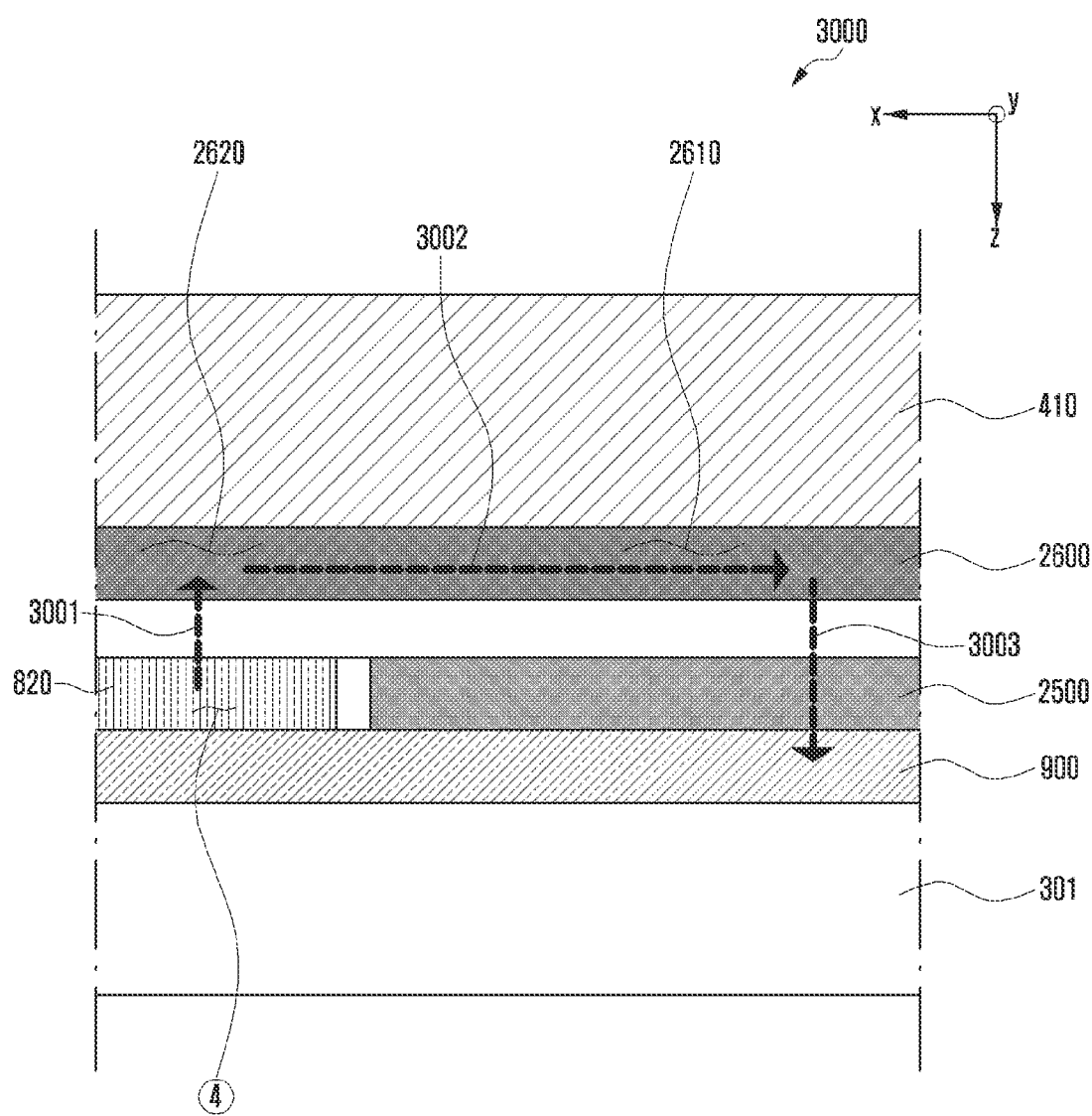
FIG. 30 is a cross-sectional view illustrating a part of the electronic device taken along line F-F' in FIG. 12 according to various embodiments.
Figure 31:
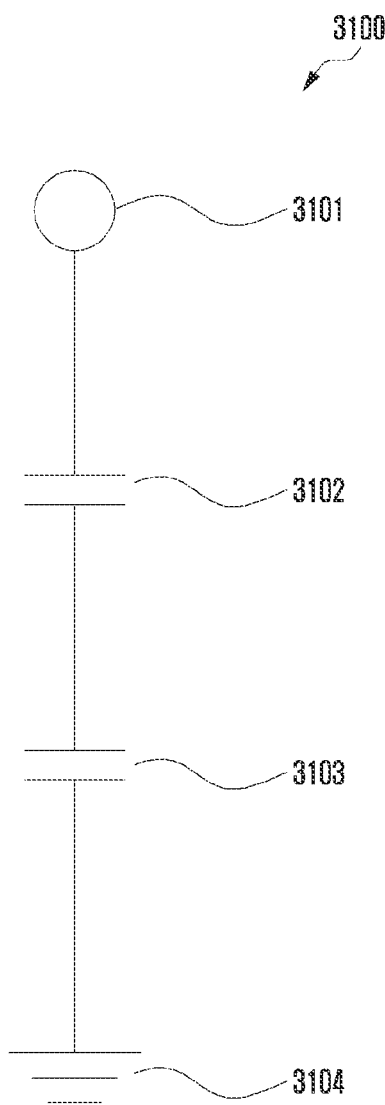
FIG. 31 is a diagram illustrating an equivalent circuit of a noise shielding structure in relation to the example of FIG. 30 according to various embodiments.

FIG. 28 is a cross-sectional view 2800 illustrating a part of the electronic device 200 taken along line B-B' in FIG. 12 according to various embodiments. FIG. 29 is a cross-sectional view 2900 illustrating a part of the electronic device 200 taken along line E-E' in FIG. 12 according to various embodiments. FIG. 30 is a cross-sectional view 3000 illustrating a part of the electronic device 200 taken along line F-F' in FIG. 12 according to various embodiments. FIG. 31 is a diagram illustrating an equivalent circuit 3100 relating to a noise shielding structure in relation to the example of FIG. 30 according to various embodiments.

With reference to FIGS. 28, 29, and 30, in an embodiment, the side surface bezel structure 203, the first support member 410, the front plate 201, the display 301, the display driving circuit 710, the touch controller IC 720, the first flexible printed circuit substrate 810, the second flexible printed circuit substrate 820, the film substrate 900, the second printed circuit substrate 451, the flexible conductive member 4511, the first conductive sheet 2500 and/or the second conductive sheet 2600 are illustrated.

According to an embodiment, the first conductive sheet 2500 and the second conductive sheet 2600 may be disposed between the first support member 410 and the display 301. The first conductive sheet 2500 may be disposed in the first substrate area ① (refer to FIG. 25) of the film substrate 900, which is disposed in the back 3011 of the display 301. The display driving circuit 710 may be disposed between the first substrate area ① and the first conductive sheet 2500. The second conductive sheet 2600 may be disposed on one surface 411 of the first support member 410, which faces the back 3011 of the display 301. A part 2501 of the first conductive sheet 2500, which covers the display driving circuit 710, may be disposed at a height protruding due to the display driving circuit 710, and may be inserted into the opening 2601 of the second conductive sheet 2600.

According to an embodiment, the first conductive sheet 2500 may be disposed to be adjacent to the first bending area B1 of the film substrate 900. In an embodiment, the first conductive sheet 2500 may extend to the first bending area B1.

According to an embodiment, the first conductive sheet 2500 and the second conductive sheet 2600 may be isolated from each other and disposed. For example, an air gap 2801 may be present between the first conductive sheet 2500 and the second conductive sheet 2600. In an embodiment, an insulator or a dielectric may be disposed between the first conductive sheet 2500 and the second conductive sheet 2600. An adhesive material may be disposed between the first conductive sheet 2500 and the second conductive sheet 2600.

According to an embodiment, the one surface 411 of the first support member 410 in which the second conductive sheet 2600 is disposed may be formed by the non-conductive unit 1200.

According to an embodiment, the second conductive sheet 2600 may include an adhesive surface for a combination with the first support member 410. In an embodiment, a separate adhesive material may be disposed between the second conductive sheet 2600 and the first support member 410. In an embodiment, a conductive layer that replaces the second conductive sheet 2600 may be formed on the one surface 411 of the first support member 410 using various methods, such as printing, coating or deposition. In an embodiment, the second conductive sheet 2600 may have a form in which a plurality of conductive layers is stacked.

According to an embodiment, the first support member 410 may include a conductive layer or a conductive surface disposed on the one surface 411 by replacing the second conductive sheet 2600. In an embodiment, the first support member 410 may include a conductive layer at least a part of which is disposed within the non-conductive unit 1200 by replacing the second conductive sheet 2600.

According to an embodiment, the first conductive sheet 2500 and the second conductive sheet 2600 may be physically brought into contact with each other in at least some area thereof. For example, the first conductive area 2610 of the second conductive sheet 2600 may be physically brought into contact with the first conductive sheet 2500 and electrically connected thereto. In an embodiment, a conductive material or a flexible conductive member that electrically connects the first conductive sheet 2500 and the second conductive sheet 2600 may be disposed between the first conductive sheet 2500 and the second conductive sheet 2600.

According to an embodiment, the second conductive sheet 2600 may be electrically connected to a conductive unit (e.g., the fifth conductive unit 1350) included in the first support member 410. For example, the one surface 411 of the first support member 410 in which the second conductive sheet 2600 is disposed may be formed by the fifth conductive unit 1350. A conductive adhesive material may be disposed between the second conductive sheet and the one surface 411.

According to an embodiment, a shielding structure including the first conductive sheet 2500 and the second conductive sheet 2600 can reduce an electromagnetic influence (e.g., an antenna gain loss, noise, electromagnetic interference or crosstalk attributable to a close conductor) of the display assembly 700 on an antenna including an antenna radiator (e.g., the first conductive unit 1310). With reference to FIG. 30, in an embodiment, the fourth substrate area ④ of the second printed circuit substrate 820 in which the touch controller IC 720 (refer to FIG. 29) is disposed may face and overlap the second conductive area 2620 of the second conductive sheet 2600. The first conductive sheet 2500 disposed in the film substrate 900 may face and overlap the first conductive area 2610 of the second conductive sheet 2600. When a signal about a touch is delivered through the second flexible printed circuit substrate 820, noise 3101 may be moved from the fourth substrate area ④ to the second conductive area 2620 through electromagnetic coupling (3102) between the fourth substrate area ④ and the second conductive area 2620 (refer to reference numeral "3001"). The noise may be moved from the second conductive area 2620 to the first conductive area 2610 (refer to reference numeral "3002"). The noise may be moved from the first conductive area 2610 to the first conductive sheet 2500 through electromagnetic coupling (3103) between the first conductive area 2610 and the first conductive sheet 2500 (refer to reference numeral "3003"). The noise may be moved from the first conductive sheet 2500 to a ground (or a ground plane) 3104 included in the film substrate 900. In an embodiment, the first conductive sheet 2500 may be electrically connected to the film substrate 900. In an embodiment, the first conductive sheet 2500 may not be electrically connected to the film substrate 900. In this case, noise may be moved from the first conductive sheet 2500 to the film substrate 900 through electromagnetic coupling between the first conductive sheet 2500 and the film substrate 900. In an embodiment, the first conductive area 2610 of the second conductive sheet 2600 may be electrically connected to the first conductive sheet 2500 through a physical contact or a conductive material between the first conductive area 2610 and the first conductive sheet 2500. The shielding structure according to the example of FIG. 30 can reduce an electromagnetic influence (e.g., an antenna gain loss, noise, electromagnetic interference or crosstalk attributable to a close conductor) on an antenna when a signal about a touch is delivered through the second flexible printed circuit substrate 820. In the example of FIG. 30, the film substrate 900 has been illustrated, but may be understood as a circuit substrate including the film substrate 900 and the first flexible printed circuit substrate 810. In an embodiment, both the film substrate 900 and the first flexible printed circuit substrate 810 may be denoted as "first circuit substrate", and the second flexible printed circuit substrate 820 may be denoted as a "second circuit substrate."

Figure 32:
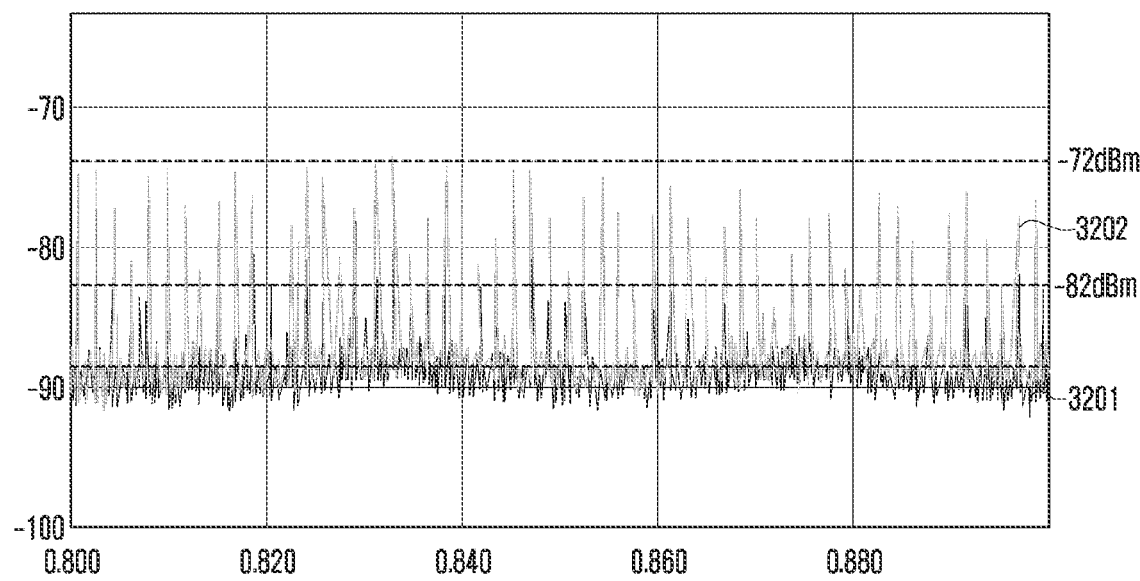
FIG. 32 is a graph illustrating electromagnetic interference (EMI) that a second flexible printed circuit substrate having a touch controller IC disposed thereon affects an antenna if the second conductive sheet is omitted, as a comparison example for the case where the shielding structure according to the embodiment of FIG. 30 is applied according to various embodiments.

FIG. 32 is a graph illustrating electromagnetic interference (EMI) that the second flexible printed circuit substrate 820 having the touch controller IC 720 disposed thereon affects an antenna if the second conductive sheet 2600 is omitted, as a comparison example for the case where the shielding structure according to the embodiment of FIG. 30 is applied according to various embodiments.

With reference to FIG. 32, reference numeral "3201" indicates noise about the shielding structure according to the embodiment of FIG. 30. Reference numeral "3202" indicates noise about the comparison example in which the second conductive sheet 2600 is omitted. In an embodiment, the shielding structure according to the embodiments of FIGS. 30 and 31 may have a noise value of about −82 dBm, and can reduce noise of about 10 dBm compared to a noise value of about −72 dBm of the comparison example in which the second conductive sheet 2600 is omitted.

According to an example embodiment of the disclosure, an electronic device (e.g., the electronic device 200 in FIG. 2) may include: a front plate (e.g., the front plate 201 in FIG. 2). The electronic device may include a rear plate (e.g., the rear plate 202 in FIG. 3) disposed on a side opposite to the front plate. The electronic device may include a side surface part (e.g., the side surface member 203 in FIG. 5) surrounding at least a part of a space between the front plate and the rear plate. The electronic device may include a support (e.g., the first support member 410 in FIG. 5) disposed in the space. The support may be laterally surrounded by the side surface part. The electronic device may include communication circuitry (e.g., the wireless communication module 192 in FIG. 1). The communication circuitry may be configured to transmit and/or receive a signal having a selected or designated frequency band through a conductive unit comprising a conductive material (e.g., the first conductive unit 1310 in FIG. 13) at least a part of which is included in the side surface part. The electronic device may include a display (e.g., the display 301 in FIG. 13) disposed between the support and the front plate. The display may be visible through the front plate. The electronic device may include a first circuit substrate (e.g., the film substrate 900 and the first flexible printed circuit substrate 810 in FIG. 28) electrically connected to the display. The first circuit substrate may be disposed between the display and the support member. A display driving circuit (e.g., the display driving circuit 710 in FIG. 28) may be disposed on the first circuit substrate. The electronic device may include a second circuit substrate (e.g., the second flexible printed circuit substrate 820 in FIG. 29) electrically connected to the display. The second circuit substrate may be disposed between the display and the support. A touch controller integrated circuit (IC) (e.g., the touch controller IC 720 in FIG. 29) may be disposed on the second circuit substrate. The electronic device may include a first conductive sheet (e.g., the first conductive sheet 2500 in FIG. 28) at least a part of which is disposed between the support and the first circuit substrate. The electronic device may include a second conductive sheet (e.g., the second conductive sheet 2600 in FIG. 28) disposed between the display and the support. When viewed over the rear plate, the second conductive sheet may include a first conductive area (e.g., the first conductive area 2610 in FIG. 27) overlapping the first conductive sheet and a second conductive area (e.g., the second conductive area 2620 in FIG. 27) extending from the first conductive area and overlapping the second circuit substrate.

According to an example embodiment of the disclosure, the second conductive sheet (e.g., the second conductive sheet 2600 in FIG. 26 or 27) may include an opening (e.g., the opening 2601 in FIG. 26 or 27) corresponding to the display driving circuit (e.g., the display driving circuit 710 in FIG. 26 or 27).

According to an example embodiment of the disclosure, an air gap (e.g., the air gap 2801 in FIG. 28) may be provided between the first conductive sheet (e.g., the first conductive sheet 2500 in FIG. 28) and the second conductive sheet (e.g., the second conductive sheet 2600 in FIG. 28).

According to an example embodiment of the disclosure, the first conductive area (e.g., the first conductive area 2610 in FIG. 30) and the first conductive sheet (e.g., the first conductive sheet 2500 in FIG. 30) may be physically in contact with each other and electrically connected.

According to an example embodiment of the disclosure, the electronic device may further include a conductive material or a flexible conductive member disposed between the first conductive area (e.g., the first conductive area 2610 in FIG. 30) and the first conductive sheet (e.g., the first conductive sheet 2500 in FIG. 30) and electrically connecting the first conductive area and the first conductive sheet.

According to an example embodiment of the disclosure, the first conductive sheet (e.g., the first conductive sheet 2500 in FIG. 30) may be electrically connected to a ground included in the first circuit substrate (e.g., the film substrate 900 in FIG. 30).

According to an example embodiment of the disclosure, the side surface part (e.g., the side surface bezel structure 203 in FIG. 5) and the support (e.g., the first support member 410 in FIG. 5) may be integrally formed.

According to an example embodiment of the disclosure, the electronic device may further include: a plurality of hook fastening units comprising at least one hook fastener (e.g., the plurality of hook fastening units 530 in FIG. 5) provided in a part (e.g., the connection structure 500 in FIG. 5) of the support (e.g., the first support member 410 in FIG. 5), which is connected to the side surface part (e.g., the side surface bezel structure 203 in FIG. 5). The electronic device may further include a plurality of hooks (e.g., the plurality of hooks 630 in FIG. 5) provided in the side surface part and fastened to the plurality of hook fastening units. At least a part of the conductive unit (e.g., the first conductive unit 1310 in FIG. 13) may be disposed in the part (e.g., the connection structure 500) of the support, which is connected to the side surface part.

According to an example embodiment of the disclosure, the electronic device may include a first hook fastening unit comprising at least one hook fastener (e.g., one of the plurality of hook fastening units 530 in FIG. 5) and a second hook fastening unit comprising at least one hook fastener (e.g., the other of the plurality of hook fastening units 530 in FIG. 5) provided in one surface of the support laterally surrounded by the side surface part. The electronic device may include a first hook (e.g., one of the plurality of hooks 630 in FIG. 5) provided in the side surface part and fastened to the first hook fastening unit. The electronic device may include a second hook (e.g., the other of the plurality of hooks 630 in FIG. 5) formed in the side surface part and fastened to the second hook fastening unit. The first hook fastening unit may be disposed to be more isolated from the display (e.g., the display 301 in FIG. 16) than the second hook fastening unit.

According to an example embodiment of the disclosure, the first hook fastening unit (e.g., the hook fastening unit 1612 in FIG. 16) may be disposed in accordance with the conductive unit (e.g., the first conductive unit 1310 in FIG. 16).

According to an example embodiment of the disclosure, the side surface part (e.g., the side surface bezel structure 203 in FIG. 5) may include a corner unit comprising a curved or bent portion (e.g., the first corner unit C1, the second corner unit C2, the third corner unit C3 or the fourth corner unit C4) that connects two bezel portions that are not parallel to each other. The first hook may be disposed in the corner unit.

According to an example embodiment of the disclosure, when viewed over the front plate, the corner unit (e.g., the first corner unit C1, the second corner unit C2, the third corner unit C3 or the fourth corner unit C4) may be formed to be thicker than the two bezel portions.

According to an example embodiment of the disclosure, the display driving circuit (e.g., the display driving circuit 710 in FIG. 9) may be disposed on the first circuit substrate (e.g., the film substrate 900 in FIG. 9) in a chip-on film (COF) manner.

According to an example embodiment of the disclosure, the display driving circuit may be disposed on the first circuit substrate in a chip-on panel (COP) manner.

According to an example embodiment of the disclosure, the side surface part (e.g., the side surface bezel structure 203 in FIG. 5) may include a ceramic material.

According to an example embodiment of the disclosure, when viewed over the front plate, at least a part of the conductive unit (e.g., the first conductive unit 1310 or the second conductive unit 1320 in FIG. 14) may overlap the display.

According to an example embodiment of the disclosure, an electronic device (e.g., the electronic device 200 in FIG. 2) may include a front plate (e.g., the front plate 201 in FIG. 2). The electronic device may include a rear plate disposed on a side opposite to the front place (e.g., the rear plate 202 in FIG. 3). The electronic device may include a side surface part (e.g., the side surface bezel structure 203 in FIG. 5) at least partially surrounding a space between the front plate and the rear plate. The side surface part may include a non-conductive material. The electronic device may include a support (e.g., the first support member 410 in FIG. 5) disposed in the space. The support may be laterally surrounded by the side surface part. The electronic device may include a display (e.g., the display 301 in FIG. 16) disposed between the support and the front plate. The display may be visible through the front plate. The electronic device may include a conductive unit comprising a conductive material (e.g., the first conductive unit 1310 in FIG. 16) at least a part of which is disposed in the support in proximity to the side surface part or at least a part of which is disposed in the side surface part. The electronic device may include communication circuitry (e.g., the wireless communication module 192 in FIG. 1) configured to transmit and/or receive a signal having a selected or designated frequency band through the conductive unit. The electronic device may include a first hook fastening unit including at least one hook fastener (e.g., one of the plurality of hook fastening units 530 in FIG. 5) and a second hook fastening unit including at least one hook fastener (e.g., the other of the plurality of hook fastening units 530 in FIG. 5) provided in one surface (e.g., the first internal surface 5001 in FIG. 5) of the support laterally surrounded by the side surface part. The electronic device may include a first hook (e.g., one of the plurality of hooks 630 in FIG. 5) provided in the side surface part and fastened to the first hook fastening unit. The electronic device may include a second hook (e.g., the other of the plurality of hooks 630 in FIG. 5) provided in the side surface part and fastened to the second hook fastening unit. The first hook fastening unit may be disposed to be more isolated from the display than the second hook fastening unit.

According to an example embodiment of the disclosure, the first hook fastening unit (e.g., the hook fastening unit 1612 in FIG. 16) may be disposed in accordance with the conductive unit (e.g., the first conductive unit 1310 in FIG. 16).

According to an example embodiment of the disclosure, the side surface part (e.g., the side surface bezel structure 203 in FIG. 5) may include a corner unit comprising a curved or bent portion (e.g., the first corner unit C1, the second corner unit C2, the third corner unit C3 or the fourth corner unit C4 in FIG. 5) that connects two bezel portions that are not parallel to each other. The first hook may be disposed in the corner unit.

According to an example embodiment of the disclosure, when viewed over the front plate, the corner unit (e.g., the first corner unit C1, the second corner unit C2, the third corner unit C3 or the fourth corner unit C4 in FIG. 5) may be thicker than the two bezel portions.

According to an example embodiment of the disclosure, the electronic device may include a first circuit substrate (e.g., the film substrate 900 and the first flexible printed circuit substrate 810 in FIG. 28) electrically connected to the display. The first circuit substrate may be disposed between the display and the support. A display driving circuit (e.g., the display driving circuit 710 in FIG. 28) may be disposed on the first circuit substrate. The electronic device may include a second circuit substrate (e.g., the second flexible printed circuit substrate 820 in FIG. 29) electrically connected to the display. The second circuit substrate may be disposed between the display and the support. A touch controller IC (e.g., the touch controller IC 720 in FIG. 29) may be disposed on the second circuit substrate. The electronic device may include a first conductive sheet (e.g., the first conductive sheet 2500 in FIG. 28) at least a part of which is disposed between the support and the first circuit substrate. The electronic device may include a second conductive sheet (e.g., the second conductive sheet 2600 in FIG. 28) disposed on the support between the display and the support. When viewed over the rear plate, the second conductive sheet may include a first conductive area (e.g., the first conductive area 2610 in FIG. 27) overlapping the first conductive sheet and a second conductive area (e.g., the second conductive area 2620 in FIG. 27) extending from the first conductive area and overlapping the second circuit substrate.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:
1. An electronic device comprising:
a front plate;
a rear plate disposed opposite the front plate;
a side surface part surrounding at least a part of a space between the front plate and the rear plate;
a bracket disposed in the space and laterally surrounded by the side surface part;
communication circuitry configured to transmit and/or receive a signal having a selected or designated frequency band through a conductive unit comprising a conductive material having at least a part thereof included in the side surface part;
a display disposed between the bracket and the front plate and visible through the front plate;
a first circuit substrate, disposed between the display and the bracket, the first circuit substrate being electrically connected to the display and having a display driving circuit disposed thereon;
a second circuit substrate, disposed between the display and the bracket, the second circuit substrate being electrically connected to the display and having a touch controller integrated circuit (IC) disposed thereon;
a first conductive sheet having at least a part thereof disposed between the bracket and the first circuit substrate; and
a second conductive sheet disposed between the display and the bracket and including a first conductive area overlapping the first conductive sheet when viewed over the rear plate and a second conductive area extending from the first conductive area and overlapping the second circuit substrate,
wherein the first conductive sheet is configured so as to not overlap the second circuit substrate when viewed over the rear plate.
2. The electronic device of claim 1, wherein the second conductive sheet includes an opening corresponding to the display driving circuit.
3. The electronic device of claim 1, further comprising an air gap between the first conductive sheet and the second conductive sheet.
4. The electronic device of claim 1, wherein the first conductive area and the first conductive sheet are physically in contact with each other and electrically connected.
5. The electronic device of claim 1, further comprising a conductive material disposed between the first conductive area and the first conductive sheet to electrically connect the first conductive area and the first conductive sheet.
6. The electronic device of claim 1, wherein the first conductive sheet is electrically connected to a ground included in the first circuit substrate.
7. The electronic device of claim 1, wherein the side surface part and the bracket are integrally formed.
8. The electronic device of claim 1, further comprising:
a plurality of hook fastening units comprising at least one hook fastener provided in a part of the bracket connected to the side surface part; and
a plurality of hooks provided in the side surface part and fastened to the plurality of hook fastening units, wherein at least a part of the conductive unit is disposed in the part of the bracket connected to the side surface part.

9. The electronic device of claim 1, further comprising:
a first hook fastening unit comprising at least one hook fastener and a second hook fastening unit comprising at least one hook fastener provided in one surface of the bracket laterally surrounded by the side surface part; and
a first hook provided in the side surface part and fastened to the first hook fastening unit and a second hook fastened to the second hook fastening unit,
wherein the first hook fastening unit is disposed to be more isolated in distance from the display than the second hook fastening unit.

10. The electronic device of claim 9, wherein the first hook fastening unit is disposed in correspondence with a position of the conductive unit.

11. The electronic device of claim 10, wherein:
the side surface part comprises a corner portion comprising a curved or bent portion connecting two bezel portions not parallel to each other, and
the first hook is disposed in the corner portion.

12. The electronic device of claim 11, wherein the corner portion is thicker than the two bezel portions when viewed over the front plate.

13. The electronic device of claim 1, wherein the display driving circuit is disposed on the first circuit substrate as a chip-on film (COF).

14. The electronic device of claim 1, wherein the display driving circuit is disposed on the first circuit substrate as a chip-on panel (COP).

15. The electronic device of claim 1, wherein the side surface part comprises a ceramic material.

16. The electronic device of claim 1, wherein at least a part of the conductive unit overlaps the display when viewed over the front plate.

17. An electronic device comprising:
a front plate;
a rear plate disposed opposite the front plate;
a side surface part surrounding at least a part of a space between the front plate and the rear plate and comprising a non-conductive material;
a support disposed in the space and laterally surrounded by the side surface part;
a display disposed between the support and the front plate and visible through the front plate;
communication circuitry configured to transmit and/or receive a signal having a selected or designated frequency band through a conductive unit comprising a conductive material having at least a part thereof disposed in the support in proximity to the side surface part or at least a part thereof disposed in the side surface part;
a first hook fastening unit comprising at least one hook fastener and a second hook fastening unit comprising at least one hook fastener provided in one surface of the support laterally surrounded by the side surface part; and
a first hook provided in the side surface part and fastened to the first hook fastening unit and a second hook fastened to the second hook fastening unit,
wherein the first hook fastening unit is disposed to be more isolated in distance from the display than the second hook fastening unit, and
wherein the first hook fastening unit is disposed in correspondence with a position of the conductive unit.

18. The electronic device of claim 17, wherein:
the side surface part comprises a corner portion comprising a curved or bent portion connecting two bezel portions not parallel to each other, and
the first hook is disposed in the corner portion.

19. The electronic device of claim 18, wherein the corner portion is thicker than the two bezel portions when viewed over the front plate.

20. The electronic device of claim 17, further comprising:
a first circuit substrate, disposed between the display and the support, the first circuit substrate being electrically connected to the display and having a display driving circuit disposed thereon;
a second circuit substrate, disposed between the display and the support, the second circuit substrate being electrically connected to the display and having a touch controller integrated circuit (IC) disposed thereon;
a first conductive sheet having at least a part thereof disposed between the support and the first circuit substrate; and
a second conductive sheet disposed between the display and the support and comprising a first conductive area overlapping the first conductive sheet when viewed over the rear plate and a second conductive area extending from the first conductive area and overlapping the second circuit substrate.

* * * * *